(12) United States Patent
Ohsawa et al.

(10) Patent No.: US 10,700,345 B2
(45) Date of Patent: Jun. 30, 2020

(54) ELECTRODE FOR LITHIUM ION SECONDARY BATTERY AND PRODUCTION METHOD THEREFOR

(71) Applicant: NISSAN MOTOR CO., LTD., Yokohama-shi, Kanagawa (JP)

(72) Inventors: Yasuhiko Ohsawa, Kanagawa (JP); Yuki Kusachi, Kanagawa (JP); Hajime Satou, Kanagawa (JP); Hiroshi Akama, Kanagawa (JP); Hideaki Horie, Kanagawa (JP); Naofumi Shoji, Kyoto (JP); Masatoshi Okura, Kyoto (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 0 days.

(21) Appl. No.: 16/079,392

(22) PCT Filed: Feb. 14, 2017

(86) PCT No.: PCT/JP2017/005375
§ 371 (c)(1),
(2) Date: Aug. 23, 2018

(87) PCT Pub. No.: WO2017/145874
PCT Pub. Date: Aug. 31, 2017

(65) Prior Publication Data
US 2019/0067680 A1 Feb. 28, 2019

(30) Foreign Application Priority Data
Feb. 24, 2016 (JP) ................................. 2016-033622

(51) Int. Cl.
*H01M 4/139* (2010.01)
*H01M 4/04* (2006.01)
(Continued)

(52) U.S. Cl.
CPC ......... *H01M 4/139* (2013.01); *H01M 4/0404* (2013.01); *H01M 4/13* (2013.01);
(Continued)

(58) Field of Classification Search
CPC ....... H01M 4/667; H01M 4/668; H01M 4/666
See application file for complete search history.

(56) References Cited

U.S. PATENT DOCUMENTS

| 5,565,284 A | 10/1996 | Koga et al. |
| 9,077,040 B2 | 7/2015 | Honda et al. |

(Continued)

FOREIGN PATENT DOCUMENTS

| CN | 102511098 A | 6/2012 |
| CN | 103548190 A | 1/2014 |

(Continued)

*Primary Examiner* — Ula C Ruddock
*Assistant Examiner* — Matthew W Van Oudenaren
(74) *Attorney, Agent, or Firm* — Foley & Lardner LLP

(57) ABSTRACT

To provide an electrode for a lithium ion secondary battery capable of enhancing a charge and discharge cycle durability of an electrode that uses a resin current collector. An electrode for a lithium ion secondary battery provided with a resin current collector including a polyolefin resin matrix and a conductive filler A, and an electrode active material layer provided on the resin current collector, in which a crosslinked resin thin-film layer, which contains an Ni filler as a conductive filler B that does not alloy with Li and which has impermeability to the electrolyte solution, is arranged between the resin current collector and a negative electrode active material layer.

9 Claims, 14 Drawing Sheets

(51) Int. Cl.
 *H01M 4/62* (2006.01)
 *H01M 4/66* (2006.01)
 *H01M 10/0525* (2010.01)
 *H01M 4/13* (2010.01)

(52) U.S. Cl.
 CPC ........... *H01M 4/622* (2013.01); *H01M 4/625* (2013.01); *H01M 4/66* (2013.01); *H01M 4/667* (2013.01); *H01M 4/668* (2013.01); *H01M 10/0525* (2013.01)

(56) References Cited

U.S. PATENT DOCUMENTS

| | | | |
|---|---|---|---|
| 9,537,152 B2 | 1/2017 | Tanaka et al. | |
| 10,230,112 B2 | 3/2019 | Kato et al. | |
| 2008/0220330 A1 | 9/2008 | Hosaka et al. | |
| 2012/0189912 A1* | 7/2012 | Honda | H01M 4/667 429/211 |
| 2014/0147746 A1 | 5/2014 | Tanaka | |
| 2015/0221449 A1* | 8/2015 | Saito | H01M 4/667 429/245 |
| 2015/0318555 A1* | 11/2015 | Oku | B32B 15/085 429/245 |
| 2016/0149223 A1* | 5/2016 | Fukumoto | H01B 1/22 524/440 |
| 2016/0322641 A1 | 11/2016 | Saito et al. | |

FOREIGN PATENT DOCUMENTS

| | | | |
|---|---|---|---|
| CN | 103703595 A | | 4/2014 |
| EP | 2 717 367 A1 | | 4/2014 |
| EP | 2 892 097 A1 | | 7/2015 |
| JP | 6-243896 A | | 9/1994 |
| JP | 11-250916 A | | 9/1999 |
| JP | 2000-100441 A | | 4/2000 |
| JP | 2006-190649 A | | 7/2006 |
| JP | 2010-238588 A | | 10/2010 |
| KR | 10-2012-0043104 A | | 5/2012 |
| WO | WO2014034758 | * | 3/2014 |
| WO | WO2014046112 | * | 3/2014 |
| WO | WO 2014/077366 A1 | | 5/2014 |
| WO | WO2015005116 | * | 1/2015 |

\* cited by examiner (a)

(b)

(a)

PRESSURIZATION

DEPRESSURIZATION (b)

(a)

(b)

ELECTRODE FOR LITHIUM ION SECONDARY BATTERY AND PRODUCTION METHOD THEREFOR

TECHNICAL FIELD

The present invention relates to an electrode for a lithium ion secondary battery and a production method therefor.

BACKGROUND ART

In recent years, the use of various electric vehicles has been promoted with the expectation of solving environmental/energy issues. Secondary batteries are being developed intensively as a vehicle-mounted power source, such as a motor drive power source, which holds the key to the practical application of these electric vehicles. However, in order to ensure widespread use, it is necessary to increase the performance and reduce the cost of batteries. In addition, with an electric vehicle, it is necessary to bring the single-charge driving range closer to that of a gasoline engine vehicle and batteries with higher energy are in demand.

In order for batteries to have a high energy density, it is necessary to reduce as much as possible battery members that are not directly related to a battery reaction. As a battery which allows saving of current collecting tab of a battery single cell or bus bar for connection between single cells, has very high volume efficiency, and is suitable for mounting in vehicles, a bipolar type secondary battery has been suggested. In a bipolar type secondary battery, a bipolar type electrode in which a positive electrode is formed on one surface of a single current collector and a negative electrode is formed on the other surface of the same current collector is used. Furthermore, it has a structure in which plural bipolar type electrodes are laminated such that the positive electrode and negative electrode can face each other having a separator containing an electrolyte layer interposed therebetween. Accordingly, the bipolar type secondary battery forms one battery cell (i.e., single battery) consisting of a current collector, a positive electrode and a negative electrode, and a separator (i.e., electrolyte layer) present between current collectors.

Furthermore, for the purpose improving the output density per weight of a bipolar type secondary battery, use of a current collector (so-called resin current collector) containing polyolefin resin (polymer material) and carbon-based conductive filler is suggested in Patent Literature 1. Namely, it is described that the output density per weight of a secondary battery can be increased because this resin current collector has less weight than a metal foil current collector.

CITATION LIST

Patent Literatures

Patent Literature 1: JP 2006-190649 A

SUMMARY OF INVENTION

Technical Problem

However, according to the technique described in Patent Literature 1, if the resin current collector is used as it is, in a resin current collector in contact with a negative electrode active material layer, problems lie in that lithium is inserted to a carbon-based conductive filler included in the resin current collector (hereinbelow, referred to as "lithiation") and the negative electrode (in particular, resin current collector in contact with a negative electrode active material layer) is deteriorated. Due to such reasons, an electrode using such resin current collector has insufficient durability of an electrode (battery), in particular, insufficient charge and discharge cycle durability of an electrode (battery), and thus a new improvement of the durability is required.

Accordingly, object of the present invention is to provide an electrode for a lithium ion secondary battery capable of improving durability of an electrode (battery) using the above resin current collector, in particular, charge and discharge cycle durability of an electrode (battery), and a method for producing the electrode.

Solution to Problem

The inventors of the present invention conducted intensive studies. As a result, they found that the problems can be solved by an electrode for a lithium ion secondary battery in which a crosslinked resin thin-film layer, which contains an Ni filler as a conductive filler that does not alloy with lithium (hereinbelow, it may be also described as "Li") and which has impermeability to an electrolyte solution, is arranged between a resin current collector and a negative electrode active material layer, and a method for producing the electrode.

BRIEF DESCRIPTION OF DRAWINGS

FIG. 3($b$) is a schematic cross-sectional view which diagrammatically illustrates a constitution that, as a bipolar type electrode of the bipolar type battery illustrated in FIG. 2, a thin-film layer is provided on the negative electrode side of a resin current collector (bipolar type current collector).

FIG. 4($b$) is a schematic cross-sectional view which diagrammatically illustrates a constitution that, as a bipolar type electrode of the bipolar type battery of the present embodiment, a thin-film layer and an intermediate layer are provided on the negative electrode side of a resin current collector (bipolar type current collector).

DESCRIPTION OF EMBODIMENTS

Figure 1:
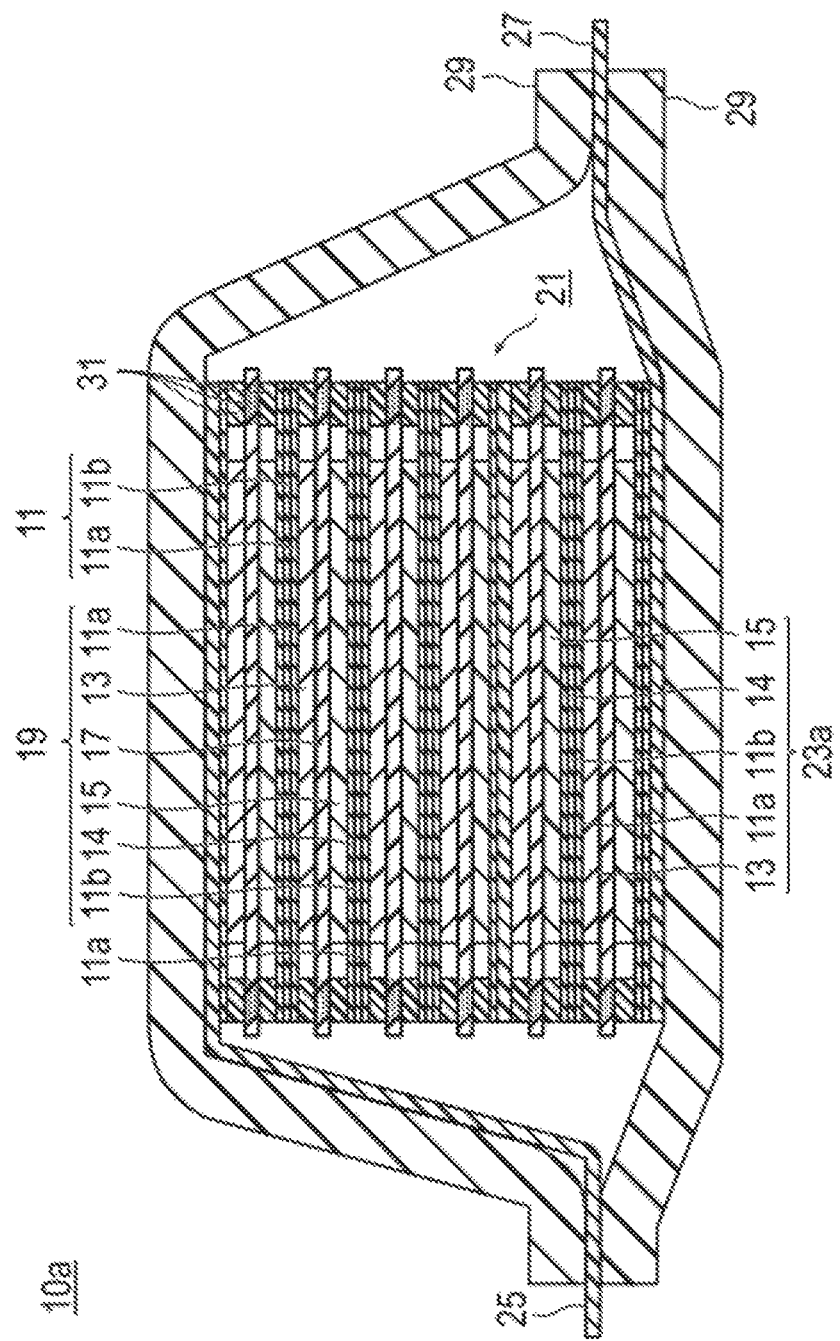
FIG. 1 is a schematic cross-sectional view which diagrammatically illustrates the basic constitution of a pseudo bipolar type nonaqueous electrolyte lithium ion secondary battery suitable for a thick-film electrode as one preferred aspect of the present embodiment.

According to the representative embodiment of the electrode for a lithium ion secondary battery of the present invention, a resin current collector containing a polyolefin resin matrix and a conductive filler A, and an electrode active material layer provided on the resin current collector are included. The present embodiment is characterized in that, in the electrode, a crosslinked resin thin-film layer, which contains an Ni filler as a conductive filler B that does not alloy with Li and which has impermeability to the electrolyte solution, is arranged between a resin current collector on the negative electrode side and an electrode active material layer. By having the above constitution, a constitution in which a crosslinked resin thin-film layer which has Ni filler dispersed as a conductive filler that does not alloy with Li and which has impermeability to the electrolyte solution is arranged on an interface between the resin current collector and negative electrode active material layer, and a production method therefor are achieved, and thus lithiation of carbon-based conductive filler in the current collector can be suppressed. Accordingly, the cycle deterioration of an electrode can be improved. As a result, the durability of an electrode (battery), in particular, the charge and discharge cycle durability of an electrode (battery) can be enhanced.

Furthermore, the expression "electrode active material layer provided on top of the resin current collector" means the form in which, from the viewpoint of the negative electrode side, an active material layer is arranged on top of the resin current collector via a suitable layer (thin-film layer or intermediate layer to be described later).

Furthermore, it can be also the form in which, from the viewpoint of the positive electrode side, an active material layer is arranged on top of the resin current collector via a suitable layer, or the form in which an active material layer is arranged directly on (right above) the resin current collector.

According to the present embodiment, the lithiation of a carbon-based conductive filler in the current collector can be suppressed by having the above constitution. Accordingly, the cycle deterioration of an electrode (in particular, a negative electrode or bipolar type electrode) can be improved. As a result, the durability of an electrode (battery), in particular, the charge and discharge cycle durability of an electrode (battery) can be enhanced. Although the detailed reaction mechanism (mechanism) exhibiting the effect of the invention remains unclear, it is believed as follows. Furthermore, it is evident that the present invention is not limited to the following reaction mechanism (mechanism).

For the purpose of enhancing the output density per weight of a secondary battery, it is suggested by a conventional technique (for example, Patent Literature 1) to use a resin current collector which contains a polyolefin resin (polymer material) and a carbon-based conductive filler. However, it is found that there is a problem in the durability of a lithium ion secondary battery using that resin current collector, in particular, a problem in terms of the charge and discharge cycle durability of an electrode. Thus, as a result of examining intensively those problems, the inventors of the present invention found that the carbon-based conductive filler contained in the resin current collector has an excellent performance whereas the above problems occur on the negative electrode side of the current collector due to the problems that are described below. Namely, when the potential is brought to be close to Li potential, all the carbon particles such as graphite, soft carbon, or hard carbon are at least partially reduced in an electrolyte solution (electrolyte) for a lithium ion secondary battery, yielding simultaneously insertion of lithium ions (hereinbelow, also described as $Li^+$) (the insertion is also referred to as "lithiation). Slight expansion (~10%) of carbon particles also occurs accompanied with the lithiation. Acetylene black (AB), which is a carbon-based conductive filler in the resin current collector, also undergoes the same reaction. Namely, as the volume expansion and shrinking occurs accompanied with insertion and release of $Li^+$ in acetylene black, acetylene black on surface of the resin current collector is shaken to yield poor contact with other acetylene black, and depending on a case, it is simultaneously released from a surface of the current collector. Subsequently, acetylene black present in the inside also undergoes the same reaction. Accordingly, it was found (recognized) that, at least the contact with a negative electrode active material layer deteriorates to yield lower reactivity and higher electrode resistance so that the electric capacity usable at constant conditions is reduced. Furthermore, in a battery in which a common positive electrode is used as a counter electrode, the lithium ions reacted with acetylene black are irresistibly taken and thus not released, and consequently, lithium ions that can contribute to the reaction (i.e., activated portion derived from positive electrode) are consumed off. Due to these reasons, reduced electric capacity of a battery is also found (recognized) from them.

Based on the findings that are described above, it was found in the present invention that, by arranging a crosslinked resin thin-film layer which contains an Ni filler as a conductive filler that does not alloy with Li and which has impermeability to the electrolyte solution on a surface of the resin current collector, the aforementioned mechanism for accelerating deterioration can be prevented. Namely, it was recognized that the cycle deterioration of an electrode (in particular, negative electrode or bipolar type electrode) can be improved as the lithiation of a carbon-based conductive filler in the resin current collector is suppressed. Namely, in the present invention, as the permeation of an electrolyte solution can be blocked by arranging on a surface of the resin current collector a crosslinked resin thin-film layer like a crosslinked epoxy resin which has impermeability to the electrolyte solution, the progress of the above mechanism for accelerating deterioration which occurs in the electrolyte solution can be suppressed. When an electrolyte solution containing diethyl carbonate (DEC) is used as an electrolyte solution, in particular, permeation of an electrolyte solution can easily occur. Thus, by arranging a crosslinked resin thin-film layer which has impermeability to the electrolyte solution, the effect of preventing the progress of the mechanism for accelerating deterioration is more significant. In addition, when a conductive filler added to a thin-film layer to ensure the conductivity of a thin-film layer provided between the current collector and active material layer causes the insertion/release of lithium ions accompanied with reduction described above or causes alloying with Li, it becomes difficult to maintain the impermeability of the thin-film layer to the electrolyte solution due to the aforementioned mechanism for accelerating deterioration. In this regard, it is found that (lithiation resistant) Ni having no occurrence of the insertion/release of lithium ions accompanied with reduction described above or having no alloying with Li (i.e., alloying with Li occurs for Al or the like) is effective as a conductive filler to be added to the thin-film layer. Namely, a thin-film layer (i.e., surface layer) which is arranged between the resin current collector and active material layer and obtained by containing a crosslinked resin impermeable to the electrolyte solution and an Ni filler as a (lithiation resistant) conductive filler that does not alloy with Li can block the permeation of the electrolyte solution containing lithium ions to the inside. Accordingly, it is found that the lithiation of a carbon-based conductive filler inside the resin current collector can be greatly improved. Furthermore, the above is just an assumption, and the present invention is not limited by the above. Furthermore, the effect of preventing permeation of the electrolyte solution into the resin current collector can be confirmed by observing the presence or absence of the permeability of an electrolyte solution into the resin current collector of Examples, for example. By arranging the crosslinked resin thin-film layer which has impermeability to the electrolyte solution, permeation of the electrolyte solution into the resin current collector can be blocked. Thus, disrupted electric connection at an electrode interface or a significant increase in resistance, which is caused by an occurrence of swelling of the resin current collector with an electrolyte solution or permeation of the electrolyte solution into the resin current collector, can be effectively prevented.

Hereinbelow, explanations are given for the lithium ion secondary battery in which the aforementioned negative electrode according to the present embodiment is suitably used, but it is not limited to the following embodiments. Furthermore, the same reference numerals are assigned to the same elements in the description of the drawings, and duplicate explanations are omitted. In addition, the dimensional ratio of the drawings includes some exaggeration for descriptive reasons, and may thus be different from the actual dimensional ratio.

The lithium ion secondary battery as a subject of the present embodiment is desirably obtained by using the electrode that is explained below, and requirements for other constitutions are not particularly limited.

For example, when the lithium ion secondary battery is classified in terms of the shape and structure, it can be applied to any conventionally known shape and structure including lamination type (flat type) battery, wound type (cylinder type) battery, or the like. When a lamination type (flat type) battery structure is employed, long-term reliability can be securely obtained based on a sealing technique like simple thermal compression, and it is advantageous in terms of the cost and workability.

Furthermore, from the viewpoint of the electric connection state inside a lithium ion secondary battery (i.e., electrode structure), it can be applied to any of non-bipolar type (parallel connection type in the inside) battery and bipolar type (serial connection type in the inside) battery. A bipolar type (serial connection type in the inside) battery is preferable in that it has very good volume efficiency and is suitable for mounting in a vehicle as described above.

When the classification is made in terms of the type of the electrolyte layer inside a lithium ion secondary battery, an application can be mated to any electrolyte layer type that is conventionally known such as a solution electrolyte type battery in which a solution electrolyte like nonaqueous electrolyte solution is used for the electrolyte layer, a polymer battery in which a polymer electrolyte is used for the electrolyte layer, or the like. The polymer battery is further classified into a gel electrolyte type battery in which a polymer gel electrolyte (also simply described as a "gel electrolyte") is used and a polymer solid (all-solid) type battery in which a polymer solid electrolyte (also simply described as a "polymer electrolyte) is used, and an application can be made to any of them.

Furthermore, as described herein, the resin current collector containing a polyolefin resin matrix and a conductive filler A to constitute the electrode for a lithium ion secondary battery of the present embodiment is also simply referred to as a "resin current collector". A crosslinked resin thin-film layer which contains an Ni filler as a conductive filler B that does not alloy with Li and which has impermeability to the electrolyte solution is also simply referred to as a "thin-film layer". The electron conductive intermediate layer is also simply referred to as an "intermediate layer." Furthermore, the crosslinked epoxy resin layer A containing a carbon-based conductive filler, which is a suitable embodiment of the intermediate layer, is also simply referred to as an "epoxy resin layer A."

In a case of a pseudo bipolar type electrode in which the resin current collector includes a resin current collector on the negative electrode side and a resin current collector on the positive electrode side, the crosslinked epoxy resin layer B containing a carbon-based conductive filler, which is provided on a surface opposite to the surface of the resin current collector on the negative electrode side having the negative electrode active material layer formed thereon, is also simply referred to as an "epoxy resin layer B."

FIG. 1 is a schematic cross-sectional view which diagrammatically illustrates the basic constitution of a pseudo bipolar type nonaqueous electrolyte lithium ion secondary battery (hereinbelow, also referred to as a "pseudo bipolar type laminate battery") which is suitable for a thick-film electrode as one preferred aspect of the present embodiment.

Figure 6:
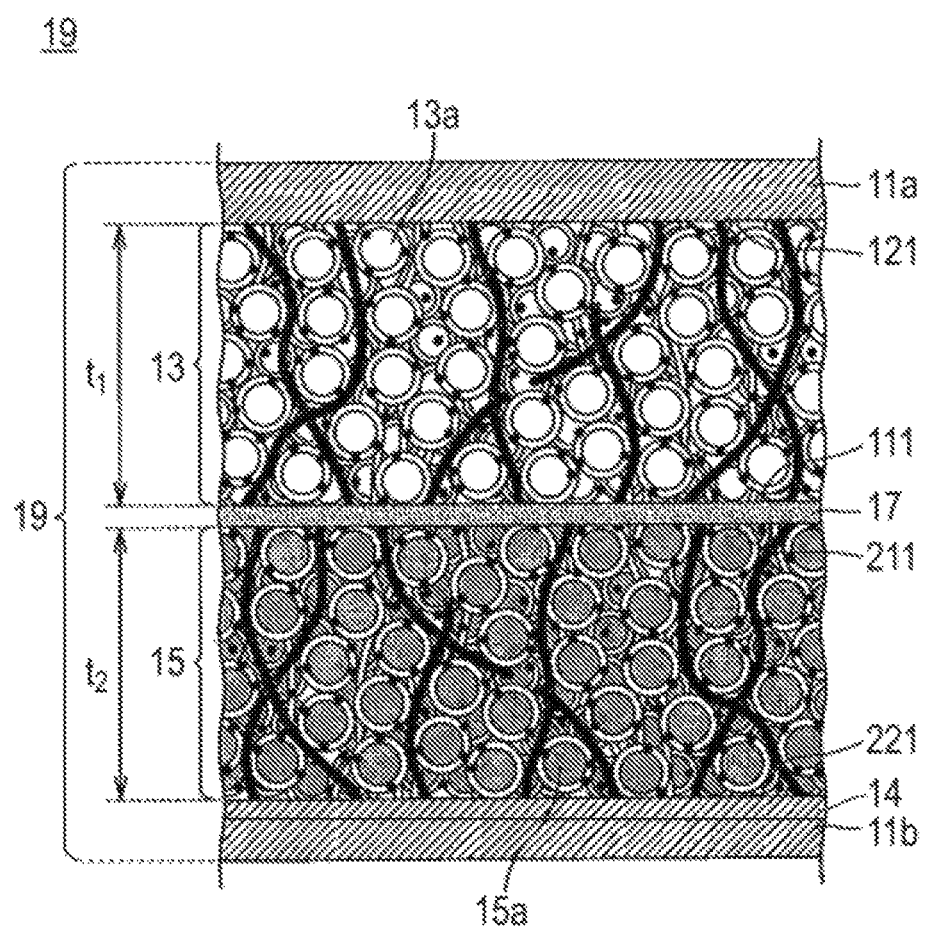
FIG. 6 is a partial schematic cross-sectional view which illustrates enlarged partial constitution of a single battery layer constituting the pseudo bipolar type laminate battery of FIG. 1, in particular, a partial schematic cross-sectional view which illustrates more specifically the internal constitution of the active material layer.

The pseudo bipolar type laminate battery indicates that, according to lamination of plural single battery layers as illustrated in FIG. 6, a bipolar type battery can be constituted. Namely, instead of applying a single resin current collector for both a positive electrode and a negative electrode to be a bipolar type current collector, it has a constitution having lamination of plural single battery layers in which a (resin) current collector on the positive electrode side having a positive electrode active material layer formed on a single surface of the collector and a resin current collector on the negative electrode side having a negative electrode active material layer formed on a single surface of the collector are laminated via a separator. Pseudo bipolar type laminate battery 10*a* illustrated in FIG. 1 is one aspect of the bipolar type battery, and it has a structure that power generating element 21 with almost rectangular shape in which an actual charge and discharge reaction progresses is enclosed inside laminate film 29 as a battery outer casing material.

As illustrated in FIG. 1, the power generating element 21 of the pseudo bipolar type laminate battery 10*a* has plural pseudo bipolar type electrode 23*a*. Each resin current collector (also referred to as a pseudo bipolar type current collector) 11 constituting the each pseudo bipolar type electrode 23*a* has a structure in which a resin current collector 11*a* on the positive electrode side and a resin current collector 11*b* on the negative electrode side are laminated (i.e., integrated by adhesion). Furthermore, in each pseudo bipolar type electrode 23*a*, a positive electrode active material layer 13 is provided on top of the resin current collector 11*a* on the positive electrode side which constitutes the pseudo bipolar type current collector 11. In addition, on top of a resin current collector 11*b* on the negative electrode side which constitutes the pseudo bipolar type current collector 11, a thin-film layer 14 and a negative electrode active material layer 15 are provided in the order. Namely, in one pseudo bipolar type electrode 23*a*, the positive electrode active material layer 13, the resin current collector 11*a* on the positive electrode side+the resin current collector 11*b* on the negative electrode side (i.e., pseudo bipolar type current collector 11), the thin-film layer 14, and the negative electrode active material layer 15 are provided in the order. Herein, the resin current collector (pseudo bipolar type current collector) 11 which constitutes the each pseudo bipolar type electrode 23*a* is a resin current collector containing a polyolefin resin matrix and a conductive filter A. Furthermore, the thin-film layer 14 is a crosslinked resin thin-film layer which contains an Ni filler as conductive filler B that does not alloy with Li and which has impermeability to the electrolyte solution. Namely, in the power generating element 21 of the pseudo bipolar type laminate battery 10*a*, a positive electrode (resin current collector 11*a* on the positive electrode side, positive electrode active material layer 13), an electrolyte layer 17, and a negative electrode (negative electrode active material layer 15, thin-film layer 14, resin current collector 11*b* on the negative electrode side), that are adjacent to each other, form one single battery layer 19 (see, FIG. 3). Accordingly, the power generating element 21 of the pseudo bipolar type laminate battery 10*a* has a constitution that plural single battery layer 19 are laminated. Furthermore, the electrolyte layer 17 has a constitution that the electrolyte is maintained in a separator as a substrate (i.e., a part at least in contact with an active material layer, and preferably a center part in in-plane direction). In other words, in the pseudo bipolar type laminate battery 10*a*, each pseudo bipolar type electrode 23*a* is laminated via the electrolyte layer 17 to form the power generating element 21. In that case, the pseudo bipolar type electrode 23*a* and the electrolyte layer 17 are alternately arranged such that the positive electrode active material layer 13 of one pseudo bipolar type electrode 23*a* and the negative electrode active material layer 15 of other pseudo bipolar type electrode 23*a* that is adjacent to the one pseudo bipolar type electrode 23*a* above can face each other via the electrolyte layer 17. Namely, it can be also said that the electrolyte layer 17 is disposed by being sandwiched between the positive electrode active material layer 13 of one pseudo bipolar type electrode 23*a* and the negative electrode active material layer 15 of other pseudo bipolar type electrode 23*a* that is adjacent to the one pseudo bipolar type electrode 23*a* above.

The resin current collector present on the two outermost layers of the power generating element 21 can also have a constitution that one outermost layer consists only of the resin current collector 11*a* on the positive electrode side and the other outermost layer consists only of the resin current collector 11*b* on the negative electrode side, instead of the constitution of the pseudo bipolar type current collector (resin current collector 11*a* on positive electrode side+resin current collector 11*b* on negative electrode side) 11. It is also possible to have a constitution that the positive electrode active material layer 13 is arranged only on a single surface (positive electrode side) of the resin current collector 11*a* as the outermost layer on the positive electrode side, or a constitution that the thin-film layer 14 and the negative electrode active material layer 15 are arranged in the order only on a single surface (negative electrode side) of the resin current collector 11*b* as the outermost layer on the negative electrode side.

Furthermore, in the power generating element 21 of the pseudo bipolar type laminate battery 10*a*, a sealing part (insulating layer) 31 is arranged on an outer periphery of the single battery layer 19 for the purpose of preventing liquid junction that is caused by leakage of an electrolyte solution from the electrolyte layer 17. Furthermore, except that the sealing part (insulating layer) 31 is arranged on an outer periphery of the positive electrode active material layer 13 on the positive electrode side, the thin-film layer 14 on the negative electrode side, the negative electrode active material layer 15 of the single battery layer 19, the sealing member used for forming the sealing part (insulating layer) 31 is preferably impregnated (arranged) inside micropores (voids) of a separator of the electrolyte layer 17 which is present on an outer periphery of the single battery layer 19. Namely, in the pseudo bipolar type laminate battery 10*a* illustrated in FIG. 1, the sealing part 31 is provided around each single battery layer 19. The sealing part 31 is disposed for the purpose of preventing short circuit or the like which is caused by a contact between neighboring resin current collector 11 inside a battery or slight displacement of the end part of the single battery layer 19 in the power generating element 21. By disposing the sealing part 31, the long-term reliability and safety are secured so that the pseudo bipolar type laminate battery 10*a* with high quality can be provided.

Furthermore, with regard to the power generating element 21 of the pseudo bipolar type laminate battery 10*a*, the number of times of laminating the single battery layer 19 is adjusted depending on desired voltage. Even for the pseudo bipolar type laminate battery 10*a*, impact from outside and environmental deterioration need to be prevented at the time of use. As such, it is preferable to have a structure in which the power generating element 21 is sealed under reduced pressure in the laminate film 29 as a battery outer casing material, and a positive electrode current collecting plate 25 and a negative electrode current collecting plate 27 are drawn to the outside of the laminate film 29. In detail, in the pseudo bipolar type laminate battery 10*a* illustrated in FIG. 1, a positive electrode current collecting plate (working both as a positive electrode tab and a positive electrode lead) 25 is disposed such that it is adjacent to the resin current collector 11*a* as the outermost layer on the positive electrode side. Furthermore, it has a structure in which part of the positive electrode current collecting plate 25 is extended as a positive electrode lead (25) and drawn as a positive electrode tab (25) from the laminate film 29 as a battery outer casing material. Meanwhile, a negative electrode current collecting plate (working both as a negative electrode tab and a negative electrode lead) 27 is disposed such that it is adjacent to the resin current collector 11*b* as the outermost layer on the negative electrode side. Similarly, it has a structure in which part of the negative electrode current collecting plate 27 is extended as a negative electrode lead (27) and drawn as a negative electrode tab (27) from the laminate film 29 as a battery outer casing material.

Figure 4:
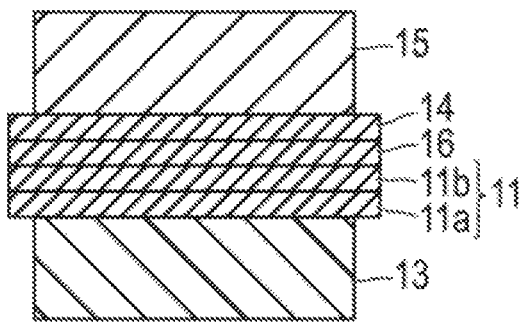
FIG. 4($a$) is a schematic cross-sectional view which diagrammatically illustrates a constitution that, as a pseudo bipolar type electrode of the pseudo bipolar type laminate battery of the present embodiment, a thin-film layer and an intermediate layer are provided on top of a resin current collector on the side of the negative electrode constituting the pseudo bipolar type current collector.
Figure 4:
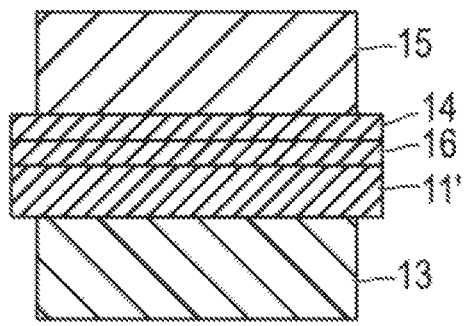

Furthermore, although it not illustrated in FIG. 1, each bipolar type electrode 23*a* may also have a structure in which, on the negative electrode side of the pseudo bipolar type current collector 11, specifically, on top of the resin current collector 11*b* on the negative electrode side which constitutes the pseudo bipolar type current collector 11, an intermediate layer with electron conductivity (not illustrated), the thin-film layer 14, and the negative electrode active material layer 15 are arranged in the order [see, FIG. 4(*a*)]. Furthermore, although it is not illustrated in FIG. 1, each bipolar type electrode 23*a* may also have a structure in which, on the negative electrode side of the pseudo bipolar type current collector 11, specifically, on top of a surface opposite to the surface on which the negative electrode active material layer 15 of the resin current collector 11*b* on the negative electrode side, which constitutes the pseudo bipolar type current collector 11, is formed, the epoxy resin layer B (not illustrated) is arranged (see, FIG. 5). In that case, a constitution having the epoxy resin layer B arranged between the resin current collector 11*a* on the positive electrode side and the resin current collector 11*b* on the negative electrode side is yielded. Preferably, it is a constitution that the resin current collector 11*a* on the positive electrode side and the resin current collector 11*b* on the negative electrode side are adhered (integrated) via the epoxy resin layer B.

With regard to the power generating element 21 having plural single battery layer 19 in the pseudo bipolar type laminate battery 10*a*, it is desirable that an intermediate layer is arranged on at least one resin current collector 11*b* on the negative electrode side. It is preferably a constitution that the intermediate layer is arranged on every resin current collector 11*b* on the negative electrode side. Similarly, it is desirable that the epoxy resin layer B is arranged on a surface of at least one resin current collector 11*b* on the negative electrode side, in which the surface is opposite to the surface having the negative electrode active material layer 15 formed thereon. It preferably is a constitution that the epoxy resin layer B is arranged on a surface of every resin current collector 11*b* on the negative electrode side, in which the surface is opposite to the surface having the negative electrode active material layer 15 formed thereon.

Figure 2:
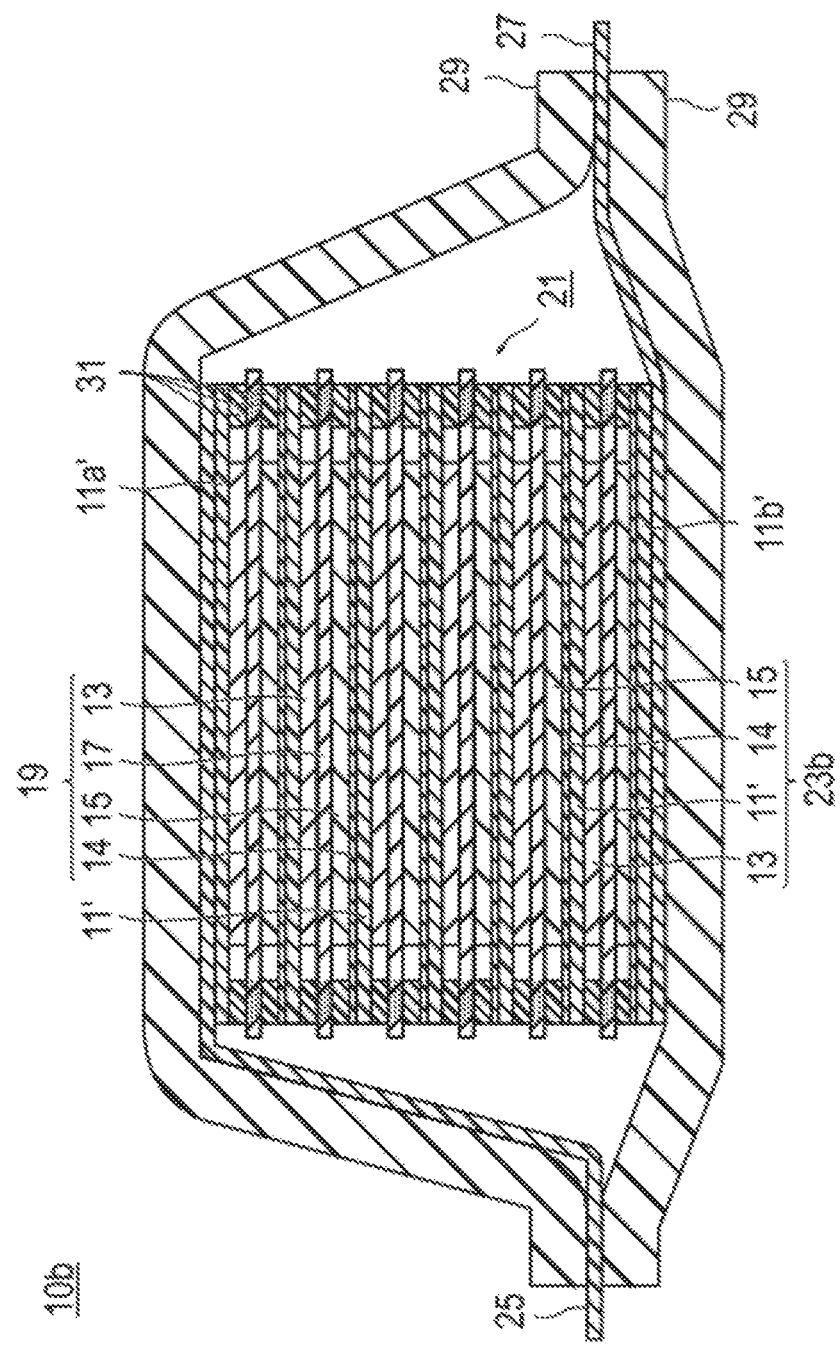
FIG. 2 is a schematic cross-sectional view which diagrammatically illustrates the basic constitution of a bipolar type nonaqueous electrolyte lithium ion secondary battery as another aspect of the present embodiment.

Next, FIG. 2 is a schematic cross-sectional view which diagrammatically illustrates the basic constitution of a bipolar type nonaqueous electrolyte lithium ion secondary battery as another aspect of the present embodiment (hereinbelow, also simply referred to as a "bipolar type battery").

The bipolar type battery 10*b* illustrated in FIG. 2 has a structure that the power generating element 21 with almost rectangular shape in which an actual charge and discharge reaction progresses is enclosed inside the laminate film 29 as a battery outer casing material.

As illustrated in FIG. 2, the power generating element 21 of the bipolar type battery 10*b* has plural bipolar type electrode 23*b*. In each bipolar type electrode 23*b*, the positive electrode active material layer 13 is formed on the positive electrode side (i.e., on one surface) of a bipolar type current collector 11' as a resin current collector, and the thin-film layer 14 and the negative electrode active material layer 15 are formed on the negative electrode side (i.e., on opposite surface) of a bipolar type current collector 11' in the order. Herein, the resin current collector used in the bipolar type current collector 11' is a resin current collector containing a polyolefin resin matrix and the conductive filter A. Furthermore, the thin-film layer 14 illustrated in FIG. 2 has the same constitution as the thin-film layer (14) illustrated in FIG. 1. Furthermore, although it not illustrated in FIG. 2, each bipolar type electrode 23*b* may also have a structure in which, on the negative electrode side of the bipolar type current collector 11' as a resin current collector, an intermediate layer with electron conductivity (not illustrated), the thin-film layer 14, and the negative electrode active material layer 15 can be arranged in the order. Via the electrolyte layer 17, each bipolar type electrode 23*b* is laminated to form the power generating element 21. Furthermore, the electrolyte layer 17 illustrated in FIG. 2 has the same constitution as an electrolyte layer (17) given in FIG. 1. In that case, each bipolar type electrode 23*b* and electrolyte layer 17 are laminated such that the positive electrode active material layer 13 of one bipolar type electrode 23*b* and the negative electrode active material layer 15 of other bipolar type electrode 23*b* that is adjacent to the one bipolar type electrode 23*b* above can face each other via the electrolyte layer 17. Namely, the electrolyte layer 17 is arranged by being sandwiched between the positive electrode active material layer 13 of one bipolar type electrode 23*b* and the negative electrode active material layer 15 of the other bipolar type electrode 23 that is adjacent to the one bipolar type electrode 23*b* above.

The positive electrode (bipolar type current collector 11', positive electrode active material layer 13), the electrolyte layer 17, and the negative electrode (negative electrode active material layer 15, thin-film layer 14, bipolar type current collector 11'), that are adjacent to one another, form one single battery layer 19. Furthermore, in the single battery layer 19 of FIG. 2, a constitution excluding the bipolar type current collector 11' is illustrated. As such, it can be also said that the bipolar type battery 10*b* has a constitution obtained by laminating the single battery layer 19. Furthermore, along the outer periphery of the single battery layer 19, the sealing part (insulating layer) 31 is arranged for the purpose of preventing liquid junction caused by leakage of an electrolyte solution from the electrolyte layer 17. Furthermore, the sealing part (insulating layer) 31 illustrated in FIG. 2 has the same constitution as the sealing part (insulating layer) (31) illustrated in FIG. 1.

Furthermore, on an outermost layer bipolar type current collector 11*a*' on the positive electrode side, which is a resin current collector present on the outermost layer of the power generating element 21, the positive electrode active material layer 13 is formed only on a single surface thereof. Furthermore, on an outermost layer bipolar type current collector 11*b*' on the negative electrode side, which is a resin current collector present on the outermost layer of the power generating element 21, the thin-film layer 14 and the negative electrode active material layer 15 are formed only on a single surface thereof.

Furthermore, also for the bipolar type battery 10b illustrated in FIG. 2, an impact from outside and environmental deterioration need to be prevented at the time of use. As such, it is preferable to have a structure in which the power generating element 21 is sealed under reduced pressure in the laminate film 29 as a battery outer casing material, and the positive electrode current collecting plate 25 and the negative electrode current collecting plate 27 are drawn to the outside of the laminate film 29. Namely, also in the bipolar type battery 10b, there is a structure in which the positive electrode current collecting plate 25 is disposed such that it is adjacent to the outermost layer bipolar type current collector 11a' on the positive electrode side as a resin current collector, and is extended to be drawn from the laminate film 29 as a battery outer casing material. Meanwhile, it is also a structure in which the negative electrode current collecting plate 27 is disposed such that it is adjacent to the outermost layer bipolar type current collector 11b' on the negative electrode side as a resin current collector, and is similarly extended to be drawn from the laminate film 29 as a battery outer casing material. The positive electrode current collecting plate 25 and the negative electrode current collecting plate 27 illustrated in FIG. 2, which prevent impact from outside and environmental deterioration at the time of use, have the same constitution as the positive electrode current collecting plate (25), and the negative electrode current collecting plate (27), respectively, which are illustrated in FIG. 1.

In the power generating element 21 having plural single battery layer 19 in the bipolar type battery 10b, it is favorable to dispose an intermediate layer on a negative electrode side surface of at least one resin current collector 11'. It preferably has a constitution that the intermediate layer is disposed on a negative electrode side surface of every resin current collector 11'. Furthermore, according to the present aspect, when use is made after the epoxy resin layer B is disposed on a surface of the resin current collector 11' that is opposite to a surface on which the negative electrode active material layer 15 is formed, and the positive electrode active material layer 13 is formed on top of the epoxy resin layer B, a problem of curling does not occur even during the manufacture of a battery, and thus the battery can be easily manufactured. If the problem of curling can be avoided by another method, that layer is unnecessary.

Figure 5:
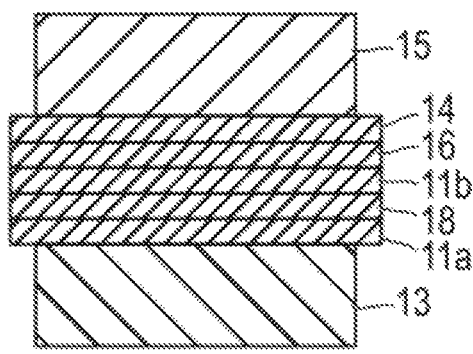
FIG. 5 is a schematic cross-sectional view which diagrammatically illustrates a constitution that, as a pseudo bipolar type electrode of the pseudo bipolar type laminate battery of the present embodiment, a thin-film layer and an intermediate layer are provided on top of a resin current collector on the side of the negative electrode constituting the pseudo bipolar type current collector, and a crosslinked epoxy resin layer is provided on the opposite surface of the resin current collector.

FIG. 3(a) is a schematic cross-sectional view which diagrammatically illustrates a constitution that, as a pseudo bipolar type electrode of the pseudo bipolar type laminate battery illustrated in FIG. 1, a thin-film layer is provided on top of a resin current collector on the side of the negative electrode constituting the pseudo bipolar type current collector. FIG. 3(b) is a schematic cross-sectional view which diagrammatically illustrates a constitution that, as a bipolar type electrode of the bipolar type battery illustrated in FIG. 2, a thin-film layer is provided on the negative electrode side of a resin current collector (bipolar type current collector). FIG. 4(a) is a schematic cross-sectional view which diagrammatically illustrates a constitution that, as a pseudo bipolar type electrode of the pseudo bipolar type laminate battery of the present embodiment, a thin-film layer and an intermediate layer are provided on top of a resin current collector on the side of the negative electrode constituting the pseudo bipolar type current collector. FIG. 4(b) is a schematic cross-sectional view which diagrammatically illustrates a constitution that, as a bipolar type electrode of the bipolar type battery of the present embodiment, a thin-film layer and an intermediate layer are provided on the negative electrode side of a resin current collector (bipolar type current collector). FIG. 5 is a schematic cross-sectional view which diagrammatically illustrates a constitution that, as a pseudo bipolar type electrode of the pseudo bipolar type laminate battery of the present embodiment, a thin-film layer and an intermediate layer are provided on top of a resin current collector on the side of the negative electrode constituting the pseudo bipolar type current collector and a crosslinked epoxy resin layer is provided on the opposite surface of the resin current collector.

In each pseudo bipolar type electrode 23a of the pseudo bipolar type laminate battery illustrated in FIG. 3(a), the resin current collector (pseudo bipolar type current collector) 11 which contains a polyolefin resin matrix and the conductive filler A has a structure in which the resin current collector 11a on the positive electrode side and the resin current collector 11b on the negative electrode side are laminated (i.e., integrated by adhesion). On top of the resin current collector 11a on the positive electrode side, the positive electrode active material layer 13 is disposed. On top of the resin current collector 11b on the negative electrode side, the thin-film layer 14 and the negative electrode active material layer 15 are disposed in the order. Namely, the pseudo bipolar type electrode 23a illustrated in FIG. 3(a) has a structure in which the positive electrode active material layer 13, the pseudo bipolar type current collector 11 (the resin current collector 11a on the positive electrode side, the resin current collector 11b on the negative electrode side), the thin-film layer 14, and the negative electrode active material layer 15 are provided in the order. Next, each pseudo bipolar type electrode 23a of the pseudo bipolar type laminate battery illustrated in FIG. 4(a) has a constitution that is obtained by disposing additionally an electron conductive intermediate layer (preferably, epoxy resin layer A) 16 in the electrode constitution of FIG. 3(a). In detail, it has a structure in which, on top of the resin current collector 11b on the negative electrode side, the intermediate layer 16, the thin-film layer 14, and the negative electrode active material layer 15 are disposed in the order. Namely, the pseudo bipolar type electrode 23a illustrated in FIG. 4(a) has a structure in which the positive electrode active material layer 13, the pseudo bipolar type current collector 11 (resin current collector 11a on the positive electrode side, resin current collector 11b on the negative electrode side), the thin-film layer 14, and the negative electrode active material layer 15 are disposed in the order. Furthermore, each pseudo bipolar type electrode 23a of the pseudo bipolar type laminate battery illustrated in FIG. 5 has a constitution that an epoxy resin layer B18 is additionally disposed in the electrode constitution of FIG. 4(a). In detail, on top of the resin current collector 11b on the negative electrode side, the intermediate layer 16, the thin-film layer 14, and the negative electrode active material layer 15 are disposed in the order, and on an opposite surface of the resin current collector 11b on the negative electrode side, the epoxy resin layer B18 is disposed. Namely, the pseudo bipolar type electrode 23a illustrated in FIG. 5 has a structure in which the positive electrode active material layer 13, the resin current collector 11a on the positive electrode side, the epoxy resin layer B18, the resin current collector 11b on the negative electrode side, the thin-film layer 14, and the negative electrode active material layer 15 are provided in the order. Thus, according to the electrode constitution of FIG. 5, the resin current collector (pseudo bipolar type current collector) 11 has a structure in which the resin current collector 11*a* on the positive electrode side and the resin current collector 11*b* on the negative electrode side are adhered to each other via the epoxy resin layer B18 (i.e., adhered and integrated via the epoxy resin layer B18).

Figure 3:
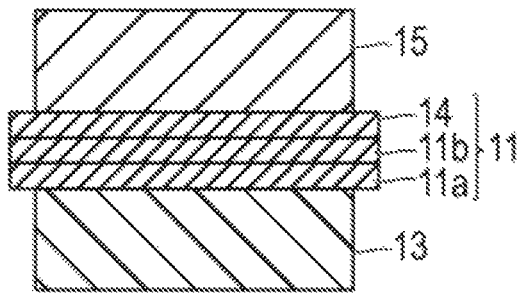
FIG. 3($a$) is a schematic cross-sectional view which diagrammatically illustrates a constitution that, as a pseudo bipolar type electrode of the pseudo bipolar type laminate battery illustrated in FIG. 1, a thin-film layer is provided on top of a resin current collector on the side of the negative electrode constituting the pseudo bipolar type current collector.
Figure 3:
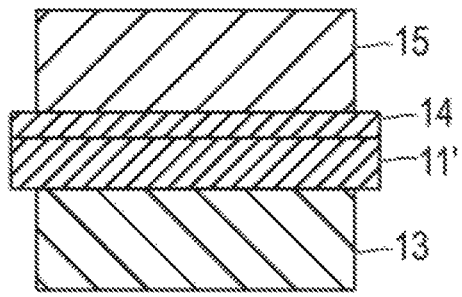

Meanwhile, in each bipolar type electrode 23*b* of the bipolar type battery illustrated in FIG. 3(*b*), the positive electrode active material layer 13 is disposed on the positive electrode side (one surface) of the resin current collector (bipolar type current collector) 11' which contains a polyolefin resin matrix and the conductive filler A. In addition, the thin-film layer 14 and the negative electrode active material layer 15 are disposed in the order on the negative electrode side (the other surface) of the resin current collector 11'. Namely, the bipolar type electrode 23*b* illustrated in FIG. 3(*b*) has a structure in which the positive electrode active material layer 13, the bipolar type current collector 11', the thin-film layer 14, and the negative electrode active material layer 15 are disposed in the order. Next, each bipolar type electrode 23*b* of the bipolar type battery illustrated in FIG. 4(*b*) has a constitution that an electron conductive intermediate layer [preferably crosslinked epoxy resin layer (1)] 16 is disposed in addition to the electrode constitution of FIG. 3(*b*). In detail, the intermediate layer 16, the thin-film layer 14 and the negative electrode active material layer 15 are disposed in the order on the negative electrode side of the resin current collector 11'. Namely, the bipolar type electrode 23*b* illustrated in FIG. 4(*b*) has a structure in which the positive electrode active material layer 13, bipolar type current collector 11, the intermediate layer 16, the thin-film layer 14, and the negative electrode active material layer 15 are disposed in the order.

Hereinbelow, more detailed explanations are given for the electrode for a lithium ion secondary battery of the present embodiment (in particular, pseudo bipolar type electrode and also bipolar type electrode) and a lithium ion secondary battery (pseudo bipolar type laminate battery and also bipolar type battery) using the electrode.

[I] Resin Current Collector

The electrode for a lithium ion secondary battery of the present embodiment (in particular, pseudo bipolar type electrode and also bipolar type electrode) has a resin current collector which contains a polyolefin resin matrix and the conductive filler A (pseudo bipolar type current collector and also bipolar type current collector) as illustrated in FIGS. 1 to 5. Accordingly, the weight can be significantly reduced compared to a conventional current collector made of metal. Herein, the pseudo bipolar type current collector has a resin current collector on the positive electrode side and a resin current collector on the negative electrode side as described above. The resin current collector on the positive electrode side and resin current collector on the negative electrode side may have the same constitution (for example, type, content, thickness or the like of each component), and thus they are explained hereinbelow without distinguishing them. Furthermore, it is preferable to have a resin current collector of which surface is corona-treated. The corona-treated resin current collector can have improved interface adhesion property as it is provided with a functional group. Accordingly, the surface wet tension of the resin current collector is greatly enhanced. Namely, the surface of a resin current collector having an oxygen-containing functional group formed the surface by a corona treatment has an excellent adhesion property to a crosslinked epoxy resin layer (i.e., intermediate layer, thin-film layer, and epoxy resin layer B).

The conductivity (electric conductivity) of the resin current collector (bulk) is preferably $1 \times 10^{-2}$ S/cm or higher. As for the measurement of the conductivity (electric conductivity), the electric conductivity can be measured by the four-terminal method after producing a sample with strip shape.

(1) Polyolefin Resin Matrix

The polyolefin resin matrix to be contained in the resin current collector (i.e., pseudo bipolar type current collector and also bipolar type current collector) consists of a polyolefin resin. For the polyolefin resin matrix, a single polyolefin resin may be used or a mixture of two or more them can be used. Furthermore, the polyolefin resin can be either a commercially available product or a synthesized product.

(1a) Materials of Polyolefin Resin

Examples of the polyolefin resin include polyethylene (PE) (high density polyethylene (HDPE), low density polyethylene (LDPE), ultra high molecular weight polyethylene, or the like), polypropylene (PP), polyisobutylene, polybutadiene, polymethylpentene (PMP), or polycycloolefin (PCO), and a copolymer and a mixture thereof, and also a modified polyolefin resin having polar functional group introduced to them. Furthermore, as those materials have a very broad electric potential window, are stable at any one of positive electrode potential and negative electrode potential, and have very light weight, they enable high output densification of a battery. They are also preferable in that they have an excellent durability against an electrolyte solution to be used.

As for the materials of the polyolefin resin, it is preferable to contain polyethylene (PE) and/or polypropylene (PP), and a modified polyolefin resin.

The modified polyolefin resin contained in the resin current collector functions as a dispersing agent to disperse the conductive filler A in the resin matrix, as the polar functional group interacts with the conductive filler A. When the modified polyolefin resin is contained, the content of the modified polyolefin resin is preferably used at 1 to 25% by mass relative to the total amount of the resin current collector.

Preferred examples of the modified polyolefin resin include polyethylene (PE), polypropylene (PP), or those obtained by introducing a polar functional group to those copolymers. Examples of the polar functional group include a carboxy group, a 1,3-dioxo-2-oxapropylene group, a hydroxyl group, an amino group, an amide group, and an imide group.

Polyethylene (PE), polypropylene (PP), or a modified polyolefin resin obtained by introducing a polar functional group to those copolymers are commercially available as a dispersing agent, a compatibilizing agent or the like for resin, and they can be obtained as UMEX series manufactured by Sanyo Chemical Industries, Ltd. and ADMER series manufactured by Mitsui Chemicals, Inc.

(1b) Content of Polyolefin Resin

The content of the polyolefin resin in the resin current collector (i.e., pseudo bipolar type current collector and also bipolar type current collector) is not particularly limited as long as the shape and thickness are maintained, and light weight, durability, and solvent resistance are provided within a range in which it has a resin matrix function and does not impair the current collecting function. Although it may vary also depending on the type of a conductive filler, when a carbon-based conductive filler is used, the content of the polyolefin resin is in a range of preferably 10 to 90% by mass, more preferably 15 to 85% by mass, and even more preferably 20 to 80% by mass relative to the total amount of the resin current collector (100% by mass) from the above points of view.

(2) Conductive Filler A

The conductive filler contained in the resin current collector (i.e., pseudo bipolar type current collector and also bipolar type current collector) (in view of the necessity of distinguishing it from the conductive filler which is used in the thin-film layer to be described later, it is also referred to as the conductive filler A in the specification and claims of the present invention) is selected from materials having conductivity. Preferred is use of a material having no conductivity with regard to ions from the viewpoint of suppressing ion permeation in the resin current collector (pseudo bipolar type current collector and also bipolar type current collector).

(2a) Materials of Conductive Filler A

Specific examples of the conductive filler A include, but should not be limited to, carbon materials (carbon-based filler), aluminum, gold, silver, copper, iron, platinum, chrome, tin, indium, antimony, titanium and nickel. The conductive filler A may be used either singly or in combination of two or more types thereof. Furthermore, an alloy material or a metal oxide thereof like stainless steel (SUS) may be used. From the viewpoint of the corrosion resistance (oxidation resistance), preferred is aluminum, stainless steel, carbon materials, and nickel. More preferably, it is carbon materials and nickel. Particularly preferably, it is carbon materials. That is because, the carbon materials have lower specific gravity, are more difficult to get oxidized, and have more excellent film forming property than metallic materials such as nickel. Furthermore, from the viewpoint of the electric stability, preferred is aluminum, stainless steel, carbon materials, silver, gold, copper, titanium and a mixture thereof. More preferred is silver, gold, aluminum, stainless steel, and carbon materials. From the viewpoint of having not so high contact resistance between fillers, carbon materials (carbon-based filler) are particularly preferred. Furthermore, it is also possible that the conductive filler A is a particulate ceramic material or a resin material coated with the metal described above by plating or the like.

(2a-1) Suitable Materials of Conductive Filler A; Carbon Materials

Examples of the carbon materials (carbon-based filler) that are suitable as the conductive filler A include at least one kind selected from a group consisting of acetylene black (AB), carbon black, Vulcan, Black Pearls, carbon nanofiber, Ketjen black, furnace black, channel black, thermal lamp black, carbon nanotube, carbon nanohorn, and carbon nanoballoon, hard carbon, graphite, and fullerene. These carbon materials have a very broad potential window, are stable in broad range against any of the positive electrode potential and negative electrode potential, and also have excellent conductivity. Furthermore, because the carbon materials have very light weight, a mass increase is kept at the minimum level. Furthermore, because the carbon materials are frequently used as a conductive aid of an electrode active material layer or a conductive filler of an intermediate layer (crosslinked epoxy resin layer) which will be described later, the contact resistance becomes very low even when they are in contact with those conductive aids or conductive filler as they are the same materials.

(2b) Shape of Conductive Filler A

Shape of the conductive filler A is not particularly limited, and a known shape such as particle shape, powder shape, fiber shape, plate shape, bulk shape, cloth shape, or mesh shape can be suitably selected. For example, if it is desired to have the conductivity over a broad range, it is preferable to use the conductive filler A with particle shape. Incidentally, if it is desired to further enhance the conductivity in a particular direction (for example, thickness direction or in-plane direction perpendicular to thickness reaction), it is preferable to use the conductive filler A which has a constant orientation property in a shape like fiber shape, or use in combination with particle shape (2c) Average Particle Diameter of Conductive Filler A An average particle diameter (i.e., average particle diameter of primary particles; mainly the case of particle shape, powder shape, or bulk shape) of the conductive filler A is not particularly limited; however, it is preferably 0.01 to 10 m, and more preferably 0.01 to 1 μm or so. Furthermore, in the present specification, the "particle diameter" represents the maximum length L between any two points on the circumference of the particle (powder, bulk material or the like) like the conductive filler A. As for the "average particle diameter" value, a value calculated as an average value of particle diameters of the particles observed in several to several tens of fields of view using an observation means like the scanning electron microscope (SEM) or the transmission electron microscope (TEM) is employed. The "particle diameter" and "average particle diameter" of particles other that the conductive filler A ((powder, bulk material or the like) can be also measured in the same manner as the "particle diameter" and "average particle diameter" of the conductive filler A described above.

In a case in which the conductive filler A has a fiber shape, average fiber length thereof is preferably 0.1 to 100 μm, although it is not particularly limited. Furthermore, in the present specification, the average fiber length represents a value calculated as an average value of fiber length of the fibers observed in several to several tens of fields of view using an observation means like the scanning electron microscope (SEM) or the transmission electron microscope (TEM). Furthermore, in a case in which the conductive filler A has a fiber shape, average diameter thereof is not particularly limited, either. However, it is preferably 0.01 to 1 μm. Furthermore, the "average fiber length" of fibers other than the conductive filler A (plate shape, cloth shape, or mesh shape) can be also measured in the same manner as the "average fiber length" of the conductive filler A described above. Furthermore, in a case in which the conductive filler A has a plate-shaped molded article and cloth-shaped or mesh-shaped processed product, the average fiber length in fiber shape corresponds to the average length of the longest side of a molded article or a processed product, and it can be measured in the same manner as the average fiber length.

(2d) Content of Conductive Filler A

The content of the conductive filler A in the resin current collector (i.e., pseudo bipolar type current collector and also bipolar type current collector) is not particularly limited, as long as it falls within a range in which the current collecting function is effectively exhibited and the function of the resin matrix is not impaired. From those points of view, the content of the conductive filler A is preferably 5 to 90 parts by mass, and more preferably 10 to 88 parts by mass relative to the total amount (100% by mass) of the resin current collector. By adding this amount of the conductive filler to the matrix component like the polyolefin resin or the like, the resin current collector can be provided with sufficient conductivity while an increase in mass of the resin current collector is suppressed.

(3) Other Additives in Resin Current Collector

The resin current collector (i.e., pseudo bipolar type current collector and also bipolar type current collector) may contain, other than the polyolefin resin matrix (and other optional resin matrix) and the conductive filler A, a resin other than the polyolefin resin and other additives within a range in which the current collecting function, resin matrix function, or the like are not impaired. Examples of other additives include a well-known additive for resin including a coloring agent, a UV absorbing agent, a flame retardant, and a plasticizing agent. The content of those additives can be adjusted depending on the function of additives or the like.

(4) Thickness of Resin Current Collector

Thickness of the resin current collector (i.e., pseudo bipolar type current collector and also bipolar type current collector) is preferably 5 to 200 µm, more preferably 10 to 150 µm, and even more preferably 20 to 100 µm.

(5) Resistance Value of Resin Current Collector

The resin current collector (i.e., pseudo bipolar type current collector and also bipolar type current collector) preferably has a resistance value such that the electron conductivity in the film thickness direction (lamination direction) that is required for the current collector for a pseudo bipolar type or a bipolar type secondary battery can sufficiently be ensured. The volume resistivity in the thickness direction (film thickness direction) is preferably within the range of $1 \times 10^2$ to $1 \times 10^5$ $\Omega \cdot cm$.

As for the method for measuring the volume resistivity in the in-plane direction, the measurement can be made according to JIS K 7194 (resistivity test method performed on conductive plastics by a four probe method). For example, a sheet (sample) cut into a predetermined dimension according to JIS standard is measured with a commercially available resistance measuring apparatus which complies with the JIS standard for determination.

(6) Method for Producing Resin Current Collector

Method for producing the resin current collector (pseudo bipolar type current collector and also bipolar type current collector) is not particularly limited, and examples thereof include a method in which the polyolefin resin matrix (and other optional resin matrix), the conductive filler A, and if necessary, each component of additives, are melt-kneaded using an extruder or the like and the materials after completing the melt-kneading are subjected to rolling using a heat press machine. Alternatively, the resin current collector may be obtained by molding of the polyolefin resin matrix (and other optional resin matrix), the conductive filler A, and if necessary, each component of additives. Examples of the molding method include injection molding, compression molding, calendar molding, slush molding, rotational molding, extrusion molding, blow molding, and film molding (such as casting, tentering, and inflation), and molding can be carried out by any method according to the purpose.

(7) Layer Constitution of Resin Current Collector

Furthermore, the resin current collector (resin current collector on the positive electrode side, and resin current collector and bipolar type current collector on the negative electrode side, to form pseudo bipolar type current collector) may have a single layer structure or a laminate structure in which layers using materials for forming a resin current collector (which may be the same or different from each other) are suitably combined. Alternatively, the resin current collector may have other layer. Examples of the other layer include a resin layer consisting of a resin with conductivity and a metal layer. The former is preferable from the viewpoint of reducing the weight of a current collector. Furthermore, the latter is preferable from the viewpoint of blocking a migration of lithium ions between single battery layers. Those other layers include a state in which they are laminated from both sides of a layer (i.e., single- or multi-layer resin current collector) using the materials for forming the resin current collector (which may be the same or different from each other). That is because, by arranging a thin-film layer on a single- or multi-layer resin current collector present on the external side, the working effects of the present invention can be effectively exhibited. Furthermore, it is intended that the layer constitution of the resin current collector as described herein does not include the thin-film layer (the epoxy resin layer A), the intermediate layer, and the epoxy resin layer B that will be described later.

Furthermore, according to this embodiment, as a material for resin current collector to constitute the resin current collector described above, a material obtained by using those containing the polyolefin resin matrix (B) including a modified polyolefin resin which functions as the dispersing agent (A) for resin current collector [hereinbelow, referred to as a "dispersing agent (A) for resin current collector" ] and the conductive filler A (C) can be used. With the dispersing agent (A) for resin current collector and a material for resin current collector, a resin current collector in which the conductive filler A (C) is homogeneously dispersed can be obtained, and a sufficient charge and discharge property as a battery can be exhibited. As a result, without impairing the enhanced output per weight of a battery which is caused by reducing the weight that is a characteristic of a resin current collector, the conductive filler A is homogeneously dispersed so that a sufficient charge and discharge property can be exhibited, and a resin current collector obtained by using a material for resin current collector which contains a dispersing agent for resin current collector can be provided.

As for the method for producing the materials for a resin current collector of this embodiment, a method in which a known resin is mixed, kneaded, and dispersed with powder, i.e., for producing a thermoplastic resin composition (i.e., composition containing a dispersing agent, a filler, and a thermoplastic resin, or a composition containing a master batch and a thermoplastic resin), carrying out mixing, kneading, and dispersing, is known, or a commonly-used known method is used. In general, production can be made by mixing components of pellets or powder with an appropriate mixer, such as a kneader, an internal mixer, a Banbury mixer, or a roll.

The components can be added in any order without particular limitations during kneading. The dispersing agent (A) for a resin current collector may be preliminarily mixed with the conductive filler A (C), and the premix may be compounded with the polyolefin resin matrix (B); or the dispersing agent (A) for a resin current collector, the conductive filler A (C), and the polyolefin resin matrix (B) may be simultaneously mixed.

The obtained materials for a resin current collector may be further formed into pellets using a pelletizer, or powder.

The materials for a resin current collector may be suitably added with, as other components, a crosslinking promoting agent, a crosslinking agent, and additives other than those described above, if necessary. When the materials for a resin current collector contain other components, the total amount thereof is preferably 0.0001 to 5% by mass, and more preferably 0.001 to 1% by mass relative to the total mass of the materials for a resin current collector.

The resin current collector of this embodiment can be also obtained by molding the materials for a resin current collector described above. Examples of the molding method include methods such as injection molding, compression molding, calendar molding, slush molding, rotational molding, extrusion molding, blow molding, and film molding (such as casting, tentering, and inflation), and molding can be carried out by any method according to the purpose.

The thickness of the resin current collector obtained by molding the materials for a resin current collector can be desirably within the range to keep shielding properties against the electrolyte solution and strength during the process. The thickness is preferably 5 to 200 μm, more preferably 10 to 150 μm, and particularly preferably 20 to 120 μm. As it is within this range, the output density of the battery due to a reduction in the weights of the battery can be enhanced after ensuring the shielding properties against the electrolyte solution, the strength during the process, and the conductivity.

Furthermore, the current collector on the positive electrode side of the pseudo bipolar type current collector is not limited to the resin current collector described above, and an existing current collector can be used. Materials constituting the current collector are not particularly limited. However, a known metallic current collector used for a lithium ion secondary battery, or a resin current collector described in JP 2012-150905 A, WO 2015/005116 A, or the like can be employed.

[II] Thin-Film Layer

According to the electrode of this embodiment, a crosslinked resin thin-film layer which contains an Ni filler as a conductive filler B that does not alloy with Li and which has impermeability to the electrolyte solution is arranged between the resin current collector (resin current collector and also bipolar type current collector on the negative electrode side of pseudo bipolar type current collector) and the negative electrode active material layer (see, FIG. 1 to FIG. 5).

Furthermore, the expression "has impermeability to the electrolyte solution" means that the crosslinked resin hardly absorbs any electrolyte solution, and the electrolyte solution that is used for a crosslinked resin which has impermeability to the electrolyte solution indicates an electrolyte solution used for a lithium ion battery in which the electrode for a lithium ion secondary battery of the present invention is used.

Furthermore, the crosslinked resin means a resin having three-dimensionally crosslinked structure. Determination of a crosslinked resin can be made based on the absence of thermal softening point or the like. In particular, a resin without any thermal softening point can be confirmed by carrying out thermal analysis of a crosslinked resin in view of a softening temperature test method based on thermomechanical analysis of thermoplastic plastic film and sheeting of JISK 7196-1991.

Impermeability to the electrolyte solution can be determined by evaluating the electrolyte solution absorbing property of a crosslinked resin. In the present invention, a resin showing a weight change of less than 1% by weight, relative to the weight before impregnation in an electrolyte solution, after impregnation of a resin film (for example, crosslinked resin film molded to 1×1×0.1 cm, for example) for 12 hours in an electrolyte solution adjusted to room temperature (23±5° C.) is a resin which exhibits the impermeability to the electrolyte solution. Furthermore, the impermeability to the electrolyte solution can be also confirmed by evaluation of an electrolyte solution absorbing property of (thin-film layer of) a crosslinked resin which contains an Ni filler as a conductive filler B that does not alloy with Li, and in the present invention, (thin-film layer of) a crosslinked resin showing weight change of less than 1% by weight, relative to the weight before impregnation in an electrolyte solution, after impregnation of a film of (thin-film layer of) a crosslinked resin containing the Ni filler (for example, resin film molded to 1×1×0.1 cm) for 12 hours in an electrolyte solution adjusted to room temperature (23±5° C.) is (thin-film layer of) a resin which exhibits the impermeability against the electrolyte solution.

As for the electrolyte solution used for the evaluation of the property of absorbing an electrolyte solution by the crosslinked resin, an electrolyte solution containing diethyl carbonate (DEC) is used, and in particular, an electrolyte solution having an electrolyte dissolved in nonaqueous mixing solvent in which ethylene carbonate (EC) and diethyl carbonate (DEC) are admixed with each other at volume ratio of 3:7 is used.

Furthermore, having the impermeability to the electrolyte solution by the crosslinked resin can be also confirmed by measuring a weight change of a whole bag after preparing a bag made of the crosslinked resin, adding the electrolyte solution to the inside of the bag, sealing the bag and letting the bad containing the electrolyte solution internally stand for 1 week. When the crosslinked resin has impermeability to the electrolyte solution, there is substantially no change in weight as the electrolyte solution added to the bag is not leaked to the outside (i.e., weight change is less than it before and after letting stand). Other than that, according to the same method as the method for testing swelling of a coated resin current collector of the Examples by an electrolyte solution, it can be confirmed that the crosslinked resin is not swollen by the electrolyte solution.

It is also preferable that the thin-film layer is characterized by containing a crosslinked epoxy resin mainly as the crosslinked resin and an Ni filler as the conductive filler B. By having this constitution, it is excellent in terms of blocking the electrolyte solution and providing the electron conductivity other than prevention of a resin current collector deterioration caused by lithiation. Furthermore, the reason for describing 'containing a crosslinked epoxy resin "mainly" as the crosslinked resin and an Ni filler as the conductive filler B' is that, as long as it is within a range in which the working effects of the present embodiment are not impaired, a suitable amount of a crosslinked resin other than the epoxy resin may be also contained. Herein, the content of the epoxy resin "mainly" as the crosslinked resin is 50% by mass or more, preferably 70% by mass or more, more preferably 80% by mass or more, and particularly preferably 90% by mass or more relative to the total amount of the crosslinked resin, and, in particular, it is preferably 100% by mass (i.e., whole amount is the crosslinked epoxy resin).

Conductivity (electric conductivity) of the thin-film layer (bulk) is preferably 0.01 S/cm or higher. As for the measurement of the conductivity (electron conductivity), electric conductivity can be measured by the four-terminal method after producing a sample with strip shape.

(1) Conductive Filler B

The conductive filler to be contained in the thin-film layer (in view of the necessity of distinguishing it from the conductive filler used in the resin current collector described above, it is also referred to as the conductive filler B in the specification and claims of the present invention) is selected from materials which have conductivity and do not alloy with Li (also described as "lithiation resistance"). Preferably, from the viewpoint of suppressing ion permeation inside the thin-film layer, it is preferable to use a material which has no conductivity for ions. Furthermore, the materials which do not alloy with Li mean a material not allowing the same reaction as the insertion and release of Li which occur in the electrode active material of a lithium ion secondary battery.

(1a) Materials of Conductive Filler B

Specific examples of the conductive filler B include nickel (Ni) because, when the crosslinked epoxy resin impermeable to the electrolyte solution and Ni known to have lithiation resistance are used as a conductive filler, it is excellent not only in terms of constituting an electrode (negative electrode) for a lithium ion secondary battery with good durability but also having excellent corrosion resistance or the like. From the viewpoint of having excellent oxidation resistance or the like, in particular, the material is nickel. Various commercially available products can be used as nickel. For example, nickel powder (manufactured by Vale, Type 123) or the like can be used. Furthermore, the conductive filler B can be particle-based ceramic material or resin material coated with the above described Ni by plating or the like. Furthermore, as those materials for the conductive material B are excellent in that they have a very broad electric potential window, are stable at the negative electrode potential, have excellent conductivity, and do not alloy with Li.

According to the present embodiment, since the conductive filler B does not alloy with Li and Li insertion does not occur during charge and discharge (i.e., no lithiation) even in a case in which the charge and discharge potential of the negative electrode active material is close to the precipitation potential of Li, it is excellent in terms of not having any swelling and not impairing the thin-film layer (i.e., not providing an impairment on the thin-film layer). Meanwhile, other than the conductive filler B that does not alloy with Li, it is also possible to contain those capable of undergoing lithiation if it is a mixed conductive filler system having both properties (i.e., mixed system of being lithiated and not being lithiated) or a substantially problem-free state can be achieved based on the composition. With regard to a substantially problem-free state that can be achieved based on the composition, if a conductive filler capable of undergoing lithiation is not a state of long-distance linkage by direct contact inside the thin-film layer of the resin current collector, it can be said that there is a possibility of solving the problem of lithiation.

(1b) Shape of Conductive Filler B

The shape of the conductive filler B is not particularly limited as long as the shape of the thin-film layer with predetermined thickness is not impaired, and a known shape such as particle shape, powder shape, fiber shape, plate shape, bulk shape, cloth shape, or mesh shape can be suitably selected.

(1c) Average Particle Diameter of Conductive Filler B

The average particle diameter of the conductive filler B (average particle diameter of primary particle: mainly the case of particle shape, powder shape, or bulk shape) is, although not particularly limited, preferably 0.01 to 20 m, and more preferably 0.02 to 5 μm or so. Furthermore, the "particle diameter" and "average particle diameter" of the conductive filler B can be measured in the same manner as the "particle diameter" and "average particle diameter" of the conductive filler A.

In a case in which the conductive filler B has a fiber shape (plate shape, cloth shape, or mesh shape), the average fiber length (in case of plate shape, cloth shape, or mesh shape; average length of their longest side) is, although not particularly limited, preferably 1 to 500 μm. The "average fiber length (average length of longest side)" of the conductive filler B can be measured in the same manner as "average fiber length (average length of longest side)" of the conductive filler A. Furthermore, when the conductive filler B has a fiber shape (plate shape, cloth shape, or mesh shape), the average diameter is preferably 0.01 to 30 μm, although not particularly limited thereto.

(1d) Content of Conductive Filler B

Furthermore, the content of the conductive filler B in the thin-film layer is not particularly limited, as long as it is within a range in which the current collecting performance is effectively exhibited and the impermeability of the crosslinked resin against the electrolyte solution is not impaired. From those points of view, the content of the conductive filler B is preferably 5 to 90% by mass, and more preferably 50 to 80% by mass relative to the total amount (100% by mass) of the thin-film layer. By adding this amount of the conductive filler B to the crosslinked resin which has impermeability to the electrolyte solution, the thin-film layer can be provided with sufficient conductivity while an increase in mass of thin-film layer is suppressed.

(2) Crosslinked Resin which has Impermeability to Electrolyte Solution

According to the present embodiment, a crosslinked resin which has impermeability to the electrolyte solution is contained in the thin-film layer. By using a crosslinked resin which has impermeability to the electrolyte solution in the thin-film layer, the effect of the present embodiment can be effectively exhibited, and, by having a three-dimensionally crosslinked structure, the crosslinked resin has impermeability to the electrolyte solution. As a result, it becomes difficult for ions to permeate the thin-film layer and reach the surface of the resin current collector.

For the crosslinked resin which has impermeability to the electrolyte solution, a single kind or a mixture of 2 or more kinds thereof can be used, and any one of a commercially available product or a synthesized product can be used for the crosslinked resin which has impermeability to the electrolyte solution, a prepolymer before crosslinked networking of the crosslinked resin (i.e., epoxy resin or the like), a curing agent, or the like.

(2a) Crosslinked Resin which has Impermeability to Electrolyte Solution

As for the crosslinked resin which has impermeability to the electrolyte solution, any resin can be used without limitation as long as it is a resin which does not absorb the electrolyte solution and has a crosslinked structure. A resin with crosslinked structure is known to have high chemical resistance as it hardly allows infiltration of chemicals into molecular chains as polymer chains are fixed to each other based on the crosslinked structure. As such, a resin with crosslinked structure shows low permeability for chemicals containing an organic solvent like electrolyte solution. Furthermore, in the present invention, the impermeability to the electrolyte solution can be obtained by adjusting the crosslinking level (also described as crosslinking density) of the crosslinked resin, composition and crystallinity of the resin depending on the type of an electrolyte solution to be used. Furthermore, as the crosslinking density increases, the permeability to the electrolyte solution decreases, and as the resin composition has higher hydrophobicity and the resin has higher crystallinity, the permeability to the electrolyte solution decreases. The impermeability to the electrolyte solution can be obtained by adjusting them.

Preferred examples of the crosslinked resin which has impermeability to the electrolyte solution include a crosslinked epoxy resin, a (co)polymer of (meth)acrylate with functionality of 3 or higher, a crosslinked polyimide resin and/or a mixture of them. Those materials are preferable in that they have excellent impermeability and durability to the electrolyte solution to be used. Furthermore, the crosslinked resin can be obtained by reacting a precursor which forms a three-dimensionally crosslinked structure after the reaction (polyfunctional monomer, polyfunctional oligomer, polyfunctional polymer compound, or the like).

In the present invention, the crosslinked epoxy resin means a three-dimensionally crosslinked resin which is a product of an epoxy resin as a precursor of the crosslinked epoxy resin (i.e., oligomer having glycidyl group or polymer compound having glycidyl group), and the crosslinked polyimide resin means a polyimide resin having three-dimensionally crosslinked structure, and the precursor thereof is a polyamine compound having any one of the below-described with valence of 3 or higher and a tetrabasic acid anhydride.

Among them, from the viewpoint of the reduction resistance and solvent blocking property, the crosslinked epoxy resin is preferable. The epoxy resin as a precursor of the crosslinked epoxy resin is an oligomer or a polymer compound having plural glycidyl groups bonded to a hydrocarbon group constituting the main skeleton (aromatic ring, aliphatic group, or the like), and as the glycidyl group is bonded, the hydrophobic hydrocarbon group forms a three-dimensionally crosslinked structure, and thus a crosslinked resin having impermeability to the electrolyte solution can be formed. Because the crosslinked epoxy resin limits a free movement of the molecular chain as it has not only a three-dimensionally crosslinked stiff molecular chain formed of a hydrophobic group but also an intermolecular hydrogen bond between hydroxyl groups that are generated by the crosslinking reaction, there is no occurrence of gaps between the molecular chains. Accordingly, chemicals cannot permeate the crosslinked resin so that the impermeability to the electrolyte solution can be obtained.

(2b) Crosslinked Epoxy Resin as Suitable Crosslinked Resin

The epoxy resin to form the crosslinked epoxy resin is not particularly limited, and known various epoxy resins can be used. Examples of the epoxy resin include a product obtained by reacting (curing) a resin composition A containing an epoxy resin which is in liquid phase at room temperature (15 to 25° C.) (hereinbelow, described as a liquid phase epoxy resin) and/or crystalline polyfunctional epoxy resin. Among them, a liquid phase epoxy resin or a crystalline polyfunctional epoxy resin such as bisphenol A type epoxy resin, bisphenol F type epoxy resin, cresol novolac type epoxy resin, phenol novolac type epoxy resin, cyclic aliphatic type epoxy resin, long chain aliphatic type epoxy resin, glycidyl ester type epoxy resin, glycidyl amine type epoxy resin, flame-resistant epoxy resin, hydantoin epoxy resin, and isocyanurate epoxy resin can be preferably used.

As for the liquid phase epoxy resin, bisphenol A type epoxy resin ["jER828EL", "YL980" or the like manufactured by Mitsubishi Chemical Corporation], bisphenol F type epoxy resin ["jER806H", "YL983U" or the like manufactured by Mitsubishi Chemical Corporation], hydrogenated bisphenol A type epoxy resin ["RXE21" or the like manufactured by Mitsubishi Chemical Corporation], glycidyl ester type epoxy resin ["871", "191P" or the like manufactured by Mitsubishi Chemical Corporation], glycidylamine type epoxy resin ["604", "630LSD" or the like manufactured by Mitsubishi Chemical Corporation], naphthalene type bifunctional epoxy resin ["HP4032", "HP4032D" or the like manufactured by DIC Corporation], epoxy resin with butadiene structure ["PB-3600" or the like manufactured by Daicel Chemical Industries, Ltd.], alicyclic epoxy resin [CELLOXIDE "2021P", "2081", "3000" manufactured by Daicel Chemical Industries], and cyclohexane dimethanol type epoxy resin [Ltd., and "ZX-1658" or the like manufactured by Tohto Kasei Co., Ltd.] can be obtained from the market. Furthermore, the liquid phase epoxy resin which can be obtained from the market is used, in applications like electronics field, paint, adhesives, or the like in which chemical permeation needs to be prevented, as a material for forming a cured product with chemical resistance. By using any liquid phase epoxy resin, the crosslinked epoxy resin which has impermeability to the electrolyte solution can be obtained.

Examples of the crystalline polyfunctional epoxy resin include biphenyl type epoxy resin rich product ["NC3100" or the like manufactured by Nippon Kayaku Co., Ltd.], biphenyl type epoxy resin ["YX4000H", "YL6121" or the like manufactured by Mitsubishi Chemical Corporation], anthracene skeleton-containing type epoxy resin ["YX8800" or the like manufactured by Mitsubishi Chemical Corporation], hydroquinone type epoxy resin ["YDC-1312" or the like manufactured by Nippon Steel and Sumikin Chemical Co., Ltd.], bisphenol type epoxy resin ["YSLV-80XY" or the like manufactured by Nippon Steel and Sumikin Chemical Co., Ltd.], thioether type epoxy resin ["YSLV-120TE" or the like manufactured by Nippon Steel and Sumikin Chemical Co., Ltd.], and copolymer of styrene and/or alkyl (meth) acrylate and glycidyl methacrylate ["MARPROOF G-010SSA", "MARPROOF G-0130SP", "MARPROOF G-0150M", "MARPROOF G-0250SP", "MARPROOF G-1005S", "MARPROOF G-100SSA", "MARPROOF G-1010S", "MARPROOF G-2050M", "MARPROOF G-01100" and "MARPROOF G-017581" manufactured by NOF Corporation]. Among them, from the viewpoint of lowering the dielectric tangent, it is preferable to use a copolymer of styrene and/or alkyl (meth)acrylate and glycidyl methacrylate. Furthermore, the crystalline polyfunctional epoxy resin which can be obtained from the market is used, in applications like electronics field, paint, adhesives, or the like in which chemical permeation needs to be prevented, as a material for forming a cured product with chemical resistance. Thus, by using any crystalline polyfunctional epoxy resin, the crosslinked epoxy resin which has impermeability to the electrolyte solution can be obtained.

As the concentration of the glycidyl group (i.e., epoxy equivalent) increases, higher crosslinking density of a crosslinked epoxy resin to be obtained is yielded, and thus the crosslinked resin which has impermeability to the electrolyte solution is obtained. In particular, as for the epoxy resin, an epoxy resin having epoxy equivalents of 80 g/eq to 600 g/eq is preferably used. The crosslinked epoxy resin in which an epoxy resin with epoxy equivalent in that range is three-dimensionally crosslinked has favorable resin reactivity or the like so that a more favorable impermeability to the electrolyte solution is obtained. Accordingly, more favorable charge and discharge cycle characteristics are obtained, and thus desirable.

In the case of using a product which is obtained by a reaction and curing (hereinbelow, simply referred to as "reaction") of a liquid phase epoxy resin and/or a crystalline polyfunctional epoxy resin as a crosslinked epoxy resin, the crosslinked epoxy resin can be obtained by performing a polymerization reaction according to heating of a resin composition A containing the liquid phase epoxy resin and/or crystalline polyfunctional epoxy resin. The total content of the liquid phase epoxy resin and crystalline polyfunctional epoxy resin to be contained in the resin composition A is, although not particularly limited, preferably 10 to 99% by mass, and more preferably 20 to 95% by mass relative to 100% by mass of the non-volatiles in the resin composition A.

(2b-1) Curing Agent for Epoxy Resin (Also Referred to as Polymerization Initiator or Crosslinking Agent)

In a case in which those obtained by reacting the liquid phase epoxy resin and/or crystalline polyfunctional epoxy resin are used, from the viewpoint of the impermeability to the electrolyte solution or the like, it is preferable to contain a curing agent for the epoxy resin in the resin composition A. The curing agent is not particularly limited, and conventionally known various curing agents can be suitably used. Examples thereof include a thermal cation polymerization initiator ["SANAID SI-60" or the like manufactured by Sanshin Chemical Industry Co., Ltd., "ADEKAOPTOMER-CP-66" or the like manufactured by ADEKA Corporation], and photocation polymerization initiator ["SANAID SI-80", "SANAID SI-100", "SANAID SI-60L", "SANAID SI-80L", "SANAID SI-100L", "SANAID SI-150L" or the like manufactured by Sanshin Chemical Industry Co., Ltd., "CPI-100P", "CPI-110P", "CPI-101A" or the like manufactured by San-Apro Ltd., "ADEKAOPTOMER-SP-150", "ADEKAOPTOMER-SP-152", "ADEKAOPTOMER-SP-170", "ADEKAOPTOMER-SP-172" or the like manufactured by ADEKA Corporation, and "CI-2064", "CI-2639", "CI-2624", "CI-2481" or the like manufactured by Nippon Soda Co., Ltd.

Furthermore, when a curing agent for the epoxy resin is contained, mixing of the liquid phase epoxy resin and crystalline polyfunctional epoxy resin, and curing agent for epoxy resin is preferably carried out immediately before reacting the resin composition A. As the mixing is carried out immediately before reacting the resin composition A, favorable adhesion between the thin-film layer and resin current collector is obtained, and thus desirable.

By additionally containing a well-known high-strength thermoplastic resin or the like that is known as engineering plastics in the resin composition A, mechanical strength of a cured product of the composition can be increased. As for the high-strength thermoplastic resin, a phenoxy resin, a polyvinylacetal resin, a thermoplastic polyimide resin, a polyamide imide resin, a polyether imide resin, a polysulfone resin, a polyether sulfone resin, a polyphenylene ether resin, a polycarbonate resin, a polyether ether ketone resin or the like can be mentioned. They may be used either singly or in combination of two or more types thereof. Among them, a phenoxy resin and a polyvinylacetal resin are preferable, and a phenoxy resin is more preferable. Furthermore, if the mechanical strength can be increased without impairing other performances such as the impermeability to the electrolyte solution, a thermoplastic resin such as polyester resin or the like can be used instead of a high-strength thermoplastic resin.

Examples of the phenoxy resin include a resin having at least one skeleton selected from bisphenol A skeleton, bisphenol F skeleton, bisphenol S skeleton, bisphenol AF skeleton, bisphenol acetophenone skeleton, novolac skeleton, biphenyl skeleton, fluorene skeleton, dicyclopentadiene skeleton, norbornene skeleton, naphthalene skeleton, anthracene skeleton, adamantan skeleton, terpene skeleton, trimethylcyclohexane skeleton, and skeleton of styrene and glycidyl methacrylate copolymer. Among them, from the viewpoint of lowering the dielectric tangent to lower the linear expansion coefficient, a phenoxy resin having bisphenol AF skeleton is preferable. They may be used either singly or in combination of two or more types thereof. The terminal of a phenoxy resin can be any functional group of a phenolic hydroxyl group, an epoxy group and the like. Examples of a commercially available product thereof include YL7383, YL7384 (bisphenol AF skeleton-containing phenoxy resin) manufactured by Mitsubishi Chemical Corporation, 1256, 4250 (bisphenol A skeleton-containing phenoxy resin) manufactured by Mitsubishi Chemical Corporation, YX8100 (bisphenol S skeleton-containing phenoxy resin) manufactured by Mitsubishi Chemical Corporation, YL6954 (bisphenol acetophenone skeleton-containing phenoxy resin) manufactured by Mitsubishi Chemical Corporation, FX280, FX293 manufactured by Totoh Kasei Co., Ltd., and YL7553, YL6794, YL7213, YL7290, and YL7482 manufactured by Mitsubishi Chemical Corporation.

Specific examples of the polyvinylacetal resin include Denka Butyral 4000-2, 5000-A, 6000-C, and 6000-EP manufactured by Denki Kagaku Kogyo K.K., and S-LEC BH series, BX series, KS series, BL series, and BM series manufactured by Sekisui Chemical Co., Ltd. They may be used either singly or in combination of two or more types thereof.

Specific examples of the polyimide resin include polyimide "RIKA COAT SN20" and "RIKA COAT PN20" manufactured by New Japan Chemical Co., Ltd. Further examples thereof include modified polyimide such as linear polyamide obtained by reacting bifunctional polybutadiene with hydroxyl terminal group, a diisocyanate compound, and tetrabasic acid anhydride (i.e., those described in JP 2006-37083 A) and polysiloxane skeleton-containing polyimide (those described in JP 2002-12667 A and JP 2000-319386 A). Specific examples of the polyamide imide resin include polyamide imide "VYLOMAX HR11NN" and "VYLOMAX HR16NN" manufactured by Toyo Boseki K.K. Further examples thereof include modified polyamide imide such as polysiloxane skeleton-containing polyamide imide "KS9100", "KS9300" manufactured by Hitachi Chemical Co., Ltd. Specific examples of the polyether sulfone resin include polyether sulfone "PES5003P" manufactured by Sumitomo Chemical Company. Specific examples of the polysulfone resin include polysulfone "P1700", "P3500" manufactured by Solvay Advanced Polymers. They may be used either singly or in combination of two or more types thereof.

In a case in which a high-strength thermoplastic resin is blended in the resin composition A, content of the high-strength thermoplastic resin is not particularly limited as long as it is the content not inhibiting the impermeability of the crosslinked resin to the electrolyte solution. However, relative to 100% by mass of the non-volatiles in the resin composition, the content is preferably 0.1 to 10% by mass, and more preferably 0.5 to 5% by mass.

As for the crosslinked resin which has impermeability to the electrolyte solution that is used in the present invention, the crosslinked epoxy resin obtained by reacting the above epoxy resin is preferable, and specifically, use of a crosslinked resin obtained by reacting the above epoxy resin as a resin matrix (polymer material) for forming a three-dimensionally crosslinked network is preferable from the viewpoint of obtaining effectively the effect of the present invention.

By having the crosslinked resin which has impermeability to the electrolyte solution as the aforementioned crosslinked epoxy resin, the effect of the present invention can be more effectively exhibited. Namely, as a thin-film layer for suppressing the deterioration reaction and also for maintaining smoothly the electronic contact between the resin current collector and active material layer is achieved, the effect of the present invention can be effectively exhibited.

(2b) Content of Crosslinked Resin

The content of the crosslinked resin in the thin-film layer is not particularly limited as long as it can provide light weight, durability, solvent resistance or the like within a range in which the impermeability of the thin-film layer to the electrolyte solution is effectively exhibited and the conductive performance of the thin-film layer is not impaired. From this point of view, the content of the crosslinked resin is preferably in a range of 10 to 50% by mass relative to the total amount of the thin-film layer (100% by mass).

(3) Components Other than Crosslinked Resin which has Impermeability to Electrolyte Solution In the thin-film layer, a resin other than the crosslinked resin, and a well-known additive for resin (coloring agent, UV absorbing agent, plasticizing agent for universal use) and the like may be also contained as long as it is within a range in which the impermeability to the electrolyte solution is not impaired.

(4) Thickness of Thin-Film Layer

Thickness of the thin-film layer is preferably 3 to 30 μm, and more preferably 5 to 20 μm. When the thickness of the thin-film layer is 3 μm or more, it is preferable from the viewpoint of the impermeability to the electrolyte solution. When the thickness of the thin-film layer is 30 μm or less, it is preferable from the viewpoint of the energy density of a battery.

(5) Method for Producing Thin-Film Layer

The method for forming a thin-film layer on top of the resin current collector on the negative electrode side (or intermediate layer) is as follows, although it is not particularly limited thereto: (a) on top of the resin current collector on the negative electrode side, slurry [A] for thin-film layer containing the conductive filler B that does not alloy with Li and a precursor of the crosslinked resin is coated, and drying and reaction of the precursor of the crosslinked resin are carried out to obtain a thin-film layer which has conductivity and has impermeability to the electrolyte solution; (b) a thin-film layer produced separately from the resin current collector on the negative electrode side is transferred onto the resin current collector on the negative electrode side, and; (c) a thin-film layer produced separately from the resin current collector on the negative electrode side and a current collector are adhered by a thin-film layer; or the like.

(a) Method of Obtaining Thin-Film Layer by Coating Slurry on Top of Resin Current Collector on Negative Electrode Side According to this method, on top of the resin current collector on the negative electrode side (or intermediate layer on top of the resin current collector), slurry [A] for thin-film layer containing the conductive filler B that does not alloy with Li and a precursor of the crosslinked resin is coated, dried, and reacted so that a thin-film layer which has conductivity and has impermeability to the electrolyte solution can be obtained on top of the current collector on the negative electrode side (or intermediate layer on top of the resin current collector). According to this method, the adhesion strength is increased and the electric contact between the conductive filler A (or carbon-based conductive filler) and the conductive filler B is more effectively performed, and thus the contact resistance can be further reduced.

In the followings, explanations are given for a method (mode) in which a corona treatment is performed on a to-be-coated surface of the resin current collector on the negative electrode side, and slurry [B] for intermediate layer is coated on top of the resin current collector on the negative electrode side followed by drying and reaction to form the intermediate layer, and on top of the obtained intermediate layer, slurry [A] for thin-film layer containing the conductive filler B that does not alloy with Li and a precursor of the crosslinked resin is coated, dried, and reacted so that a thin-film layer which has conductivity and has impermeability to the electrolyte solution is formed on top of the intermediate layer, and after that, on a surface having no thin-film layer formed thereon, slurry [C] for forming the epoxy resin layer B is coated, dried, and reacted so as to form the epoxy resin layer B.

(Production of Resin Current Collector)

As for the resin current collector, according to melt-kneading of polyolefin resin materials containing the dispersing agent (A) for resin current collector and the conductive filler A at predetermined temperature, rotation speed, and retention time using a biaxial extruder, for example, materials for the resin current collector can be obtained. According to extrusion molding of the obtained materials for the resin current collector, the resin current collector can be obtained.

Herein, the polyolefin resin material, the conductive filler A, and their content can be suitably adjusted such that they are the same as the polyolefin resin material, the conductive filler A, and their content which have been explained in the section of "resin current collector" above.

The polyolefin resin material is desirably selected from the aforementioned materials having excellent durability to the electrolyte solution, and polypropylene or the like can be used, for example. As for the polyolefin resin material, various commercially available products can be suitably used [for example, polypropylelene, trade name of "SunAllomer PL500A", manufactured by SunAllomer Ltd.]. Furthermore, the conductive filler A is suitably selected from the aforementioned carbon materials from the viewpoint of not having high contact resistance between fillers, and acetylene black (AB) or the like can be used, for example. Various commercially available products can be suitably used as the conductive filler A (for example, acetylene black, manufactured by Denka Co., Ltd., Denka Black NH-100). The dispersing agent (A) for resin current collector is suitably selected from the aforementioned materials. Various commercially available products can be suitably used as the dispersing agent (A) for resin current collector (for example, UMEX 1001 or the like manufactured by Sanyo Chemical Industries, Ltd.).

Conditions for the melt-kneading are preferably the temperature of 150 to 270° C., rotation speed of 50 to 150 rpm, and retention time of 1 to 15 minutes during the melt-kneading, but not limited to this range.

Furthermore, the thickness of the resin current collector can be preferably adjusted such that it is the same as the thickness of the resin current collector which has been explained in the section of "resin current collector" above.

(Preparation of Slurry [B] for Intermediate Layer)

Method for preparing the slurry [B] for intermediate layer having conductivity (electric conductivity) is not particularly limited, but it preferably includes a carbon-based conductive filler and an epoxy resin. For example, a carbon-based conductive filler, an epoxy resin, a curing agent for epoxy resin, and a solvent are added to a suitable container (for example, metal container). After that, according to stirring and dispersing using a suitable device for stirring and dispersing (for example, high speed shear type disperser), the slurry [B] for intermediate layer can be prepared. Materials for forming the intermediate layer in the slurry [B]

for intermediate layer include an epoxy resin, a carbon-based conductive filler, and each component of various additives that can be additionally added, if necessary. As for the epoxy resin, the material for forming the crosslinked resin (in particular, crosslinked epoxy resin) of the thin-film layer which has impermeability to the electrolyte solution can be used (i.e., resin composition A described above).

From the viewpoint of the coating performance, viscosity of the slurry [B] for intermediate layer in that case is preferably in the range of 15 to 20 mPa·s when it is measured by a B type viscometer (temperature: 25° C. and rotor: M3).

The carbon-based conductive filler, epoxy resin, and curing agent for the epoxy resin, that are used for the slurry [B] for intermediate layer, and their content can be suitably adjusted such that they are the same as the carbon-based conductive filler, epoxy resin, and curing agent for the epoxy resin, and their content which will be explained in the section of "intermediate layer" below (it is also acceptable to make a reference to the conductive filler B, crosslinked resin, and the content of the crosslinking agent for the thin-film layer).

As for the carbon-based conductive filler, the carbon material of the conductive filler A can be used, and acetylene black (AB) can be used, for example. Various commercially available products can be suitably used as the carbon-based conductive filler (for example, acetylene black, manufactured by Denka Co., Ltd., Denka Black NH-100).

Furthermore, as for the epoxy resin, the epoxy resin which is the same as the epoxy resin as explained before to be suitable for the crosslinked resin which has impermeability to the electrolyte solution to constitute the thin-film layer can be used, and a liquid phase epoxy resin and a polyfunctional epoxy resin can be used, for example. For the liquid phase epoxy resin, various commercially available products that are described above can be used (for example, alicyclic epoxy resin; manufactured by Daicel Corporation, CELLOXIDE 2021P or the like). Furthermore, for the polyfunctional epoxy resin, various commercially available products that are described above can be used (for example, copolymer of styrene and/or alkyl (meth)acrylate and glycidyl methacrylate; manufactured by NOF Corporation, MARPROOF G-2050M or the like). For the curing agent for the above epoxy resin, the curing agent which is the same as the curing agent for the epoxy resin as explained before to be suitable for the crosslinked resin which has impermeability to the electrolyte solution to constitute the thin-film layer can be used. As for the curing agent for the epoxy resin, various commercially available products that are exemplified in the section of "thin-film layer" above can be suitably used (for example, cation polymerization initiator; manufactured by Sanshin Chemical Industry Co., Ltd., SANAID SI-60 or the like).

As for the solvent used for slurry [B] for the intermediate layer, ketones such as acetone or ethyl methyl ketone, aromatic hydrocarbon solvent such as toluene or xylene, a polar solvent such as N-methyl-2-pyrrolidone (NMP), dimethyl formamide (DMF), dimethyl acetamide (DMAc), dimethyl sulfoxide (DMSO), tetrahydrofuran (THF), acetonitrile, or the like can be used. They may be used either singly or in combination of two or more types thereof.

(Preparation of Slurry [A] for Thin-Film Layer)

The method for producing the slurry [A] for thin-film layer which contains the conductive filler B, that does not alloy with Li, and a precursor of the crosslinked resin is not particularly limited. For example, the conductive filler B that does not alloy with Li, a precursor of the crosslinked resin, a curing agent therefor, and a solvent are added to a suitable container (for example, metal container). After that, according to stirring and dispersing using a suitable device for stirring and dispersing (for example, high speed shear type disperser), the slurry [A] for thin-film layer can be prepared. Materials for forming the thin-film layer in the slurry [A] for thin-film layer include materials for forming the crosslinked resin which has impermeability to the electrolyte solution (the above resin compositions A, B, and the like), the conductive filler B, and each component of various additives that can be additionally added, if necessary.

From the viewpoint of the coating performance, viscosity of the slurry [A] for thin-film layer in that case is preferably in the range of 5000 to 10000 mPa·s when it is measured by a B type viscometer (temperature: 25° C. and rotor: M3).

The conductive filler B, precursor of the crosslinked resin, curing agent for the resin, which are used for the slurry [A] for thin-film layer, and their content can be suitably adjusted such that they are the same as the conductive filler B, precursor of the crosslinked resin, curing agent for the resin, and their content which have been in the section of "thin-film layer" above.

As for the Ni filler as the conductive filler B that does not alloy with Li, nickel powder is preferable as it has excellent oxidation resistance or the like, and various commercially available products can be suitably used as the nickel powder (for example, nickel powder, manufactured by vale, Type 123 (particle diameter: Fischer value based on Fischer method; 3.0 to 7.0 µm)).

Furthermore, as the precursor of the crosslinked resin, an epoxy resin is preferable from the viewpoint of the oxidation resistance and solution blocking property, and a liquid phase epoxy resin and a polyfunctional epoxy resin can be used, for example. As for the liquid phase epoxy resin, various commercially available products can be suitably used (for example, alicyclic epoxy resin; manufactured by Daicel Corporation, CELLOXIDE 2021P or the like). Furthermore, for the polyfunctional epoxy resin, various commercially available products can be used (for example, copolymer of styrene and/or alkyl (meth)acrylate and glycidyl methacrylate; manufactured by NOF Corporation, MARPROOF G-2050M or the like).

For the curing agent for the above epoxy resin, the curing agent for the epoxy resin can be used if the precursor of the crosslinked resin is an epoxy resin. As for the curing agent for epoxy resin, various commercially available products which have been described above can be suitably used (for example, cation polymerization initiator; manufactured by Sanshin Chemical Industry Co., Ltd., SANAID SI-60 or the like).

As for the solvent used for slurry [A] for the thin-film layer, ketones such as acetone or ethyl methyl ketone, aromatic hydrocarbon solvent such as toluene or xylene, a polar solvent such as N-methyl-2-pyrrolidone (NMP), dimethyl formamide (DMF), dimethyl acetamide (DMAc), dimethyl sulfoxide (DMSO), tetrahydrofuran (THF), acetonitrile, or the like can be used. They may be used either singly or in combination of two or more types thereof.

(Preparation of Slurry [C] for Epoxy Resin Layer B)

The method for producing the slurry [C] for the epoxy resin layer B is not particularly limited, but it preferably includes carbon-based conductive filler and an epoxy resin. For example, a carbon-based conductive filler, an epoxy resin, a curing agent for the epoxy resin, and a solvent are added to a suitable container (for example, metal container) in the same manner as the slurry [B] for intermediate layer. After that, according to stirring and dispersing using a suitable device for stirring and dispersing (for example, high speed shear type disperser), the slurry [B] for intermediate layer can be prepared. Materials for forming the intermediate layer in the slurry [C] for forming the epoxy resin layer B include an epoxy resin, a carbon-based conductive filler, and each component of various additives that can be additionally added, if necessary. As an epoxy resin, the materials for forming the crosslinked resin (in particular, crosslinked epoxy resin) of thin-film layer which has impermeability to the electrolyte solution can be used (i.e., the above resin compositions A and B).

From the viewpoint of the coating performance, viscosity of the slurry [C] for forming the epoxy resin layer B in that case is preferably in the range of 15 to 20 mPa·s when it is measured by a B type viscometer (temperature: 25° C. and rotor: M3).

The carbon-based conductive filler, epoxy resin, curing agent for the epoxy resin, which are used for the slurry [C] for forming the epoxy resin layer B, and their content can be suitably adjusted such that they are the same as the carbon-based conductive filler, epoxy resin, curing agent for the epoxy resin, and their content which will be described in the section of "epoxy resin layer B" below (it is also possible to make a reference to the conductive filler B of the thin-film layer, precursor of the crosslinked resin, and the content of the curing agent).

As for the carbon-based conductive filler, the carbon material of the conductive filler A can be used, and acetylene black (AB) can be used, for example. Various commercially available products of carbon-based conductive filler can be used [for example, acetylene black, manufactured by Denka Co., Ltd., Denka Black NH-100].

Furthermore, as the epoxy resin, an epoxy resin which is the same as the crosslinked epoxy resin which has been explained suitable for the crosslinked resin having impermeability to the electrolyte solution for constituting thin-film layer can be used, and for example, a crosslinked epoxy resin using a liquid phase epoxy resin and/or a polyfunctional epoxy resin or the like can be used, for example. As for the liquid phase epoxy resin, various commercially available products can be suitably used (for example, alicyclic epoxy resin; manufactured by Daicel Corporation, CEL-LOXIDE 2021P or the like). Furthermore, for the polyfunctional epoxy resin, various commercially available products can be used (for example, copolymer of styrene and/or alkyl (meth)acrylate and glycidyl methacrylate; manufactured by NOF Corporation, MARPROOF G-2050M or the like). As for the curing agent for epoxy resin, a curing agent for epoxy resin which is the same as the curing agent for epoxy resin which has been explained to be suitable for the crosslinked resin having impermeability to the electrolyte solution for constituting thin-film layer can be used. Various commercially available products exemplified above in the section of "thin-film layer" above can be suitably used as the curing agent for epoxy resin [for example, cation polymerization initiator (curing agent or crosslinking agent); manufactured by Sanshin Chemical Industry Co., Ltd., SANAID SI-60 or the like].

As for the solvent used for slurry [C] for forming the epoxy resin layer B, ketones such as acetone or ethyl methyl ketone, aromatic hydrocarbon solvent such as toluene or xylene, a polar solvent such as N-methyl-2-pyrrolidone (NMP), dimethyl formamide (DMF), dimethyl acetamide (DMAc), dimethyl sulfoxide (DMSO), tetrahydrofuran (THF), acetonitrile, or the like can be used. They may be used either singly or in combination of two or more types thereof.

[Production of Intermediate Layer (Application of Slurry for Forming Intermediate Layer or the Like)]

The corona treatment described below is preferably carried out for the resin current collector. After that, by using a coating device (for example, micro bar coater) set with suitable gap (corresponding to the coating thickness of intermediate layer), the slurry [B] for intermediate layer is applied (coated). After that, it is passed through the inside of a dryer with predetermined drying (curing) temperature over predetermined drying (curing) time to dry the solvent and to cure the epoxy resin, and thus an intermediate layer can be produced.

Furthermore, before coating (applying) the slurry [B] for intermediate layer, it is preferable to carry out a corona treatment with predetermined discharge power on a to-be coated (with intermediate layer) surface of the resin current collector on the negative electrode side, in order to improve the interface adhesiveness by providing functional groups. Accordingly, the surface wet tension of the resin current collector can be greatly enhanced, and thus desirable. Namely, an oxygen-containing functional group is formed on the surface by a corona treatment to yield improved adhesiveness to the intermediate layer (epoxy resin layer). Herein, it is preferable to carry out the corona treatment while winding the resin current collector at a rate of 3 to 10 m/minutes. At that time, the discharge power for corona treatment is preferably in a range of 0.5 to 3 kW from the viewpoint that the interface adhesiveness is improved by providing the functional groups (i.e., oxygen-containing functional group or the like) to a to-be coated surface of the resin current collector on the negative electrode side which is conveyed at the above winding rate. Furthermore, even for a case in which the thin-film layer is formed without disposing an intermediate layer, it is preferable to carry out a corona treatment for a (thin-film layer) to-be-coated surface of the resin current collector with predetermined discharge power similar to above. That it because, by doing so, favorable adhesiveness to thin-film layer can be obtained.

The method for coating the slurry [B] for intermediate layer is not particularly limited, and examples thereof include brush coating, bar coating, spray coating, screen printing, and inkjet method.

The suitable coating amount of the slurry [B] for intermediate layer is not particularly limited, and it can be suitably adjusted so as to have a desired thickness of the thin-film layer to be obtained.

The dryer is not particularly limited, and an IR heating dryer, a hot air heating dryer, and a heating dryer using both IR and hot air can be used.

The temperature for the drying (curing) and time for the drying (curing) are not particularly limited if drying of the solvent and curing of the epoxy resin can be sufficiently carried out. However, they are suitably determined within a range in which the material deterioration does not occur depending on the type of the solvent and epoxy resin to be used. From this point of view, the temperature for the drying (curing) is preferably in a range of 80 to 150° C. Time for the drying (curing) is preferably in a range of 1 to 10 minutes.

The thickness of the intermediate layer obtained by the above production method can be adjusted to a desired thickness by suitably setting the aforementioned gap. Accordingly, it can be suitably adjusted such that it falls within the thickness range of the intermediate layer to be explained in the section of "intermediate layer" below. Furthermore, when heat press described below is carried out, the gap and conditions for heat press can be suitably adjusted such that thickness of the intermediate layer after heat press is within the thickness range of the intermediate layer to be explained in the section of "intermediate layer" below.

[Production of Thin-Film Layer (Application of Slurry for Forming Thin-Film Layer or the Like)]

By using a coating device (for example, micro bar coater) set with suitable gap (corresponding to the coating thickness of thin-film layer), the slurry [A] for thin-film layer is applied (coated) on a surface of the intermediate layer of the resin current collector having an intermediate layer formed on the negative electrode side. After that, it was passed through the inside of a dryer with predetermined drying (curing) temperature over predetermined drying (curing) time to dry the solvent A and to cure the precursor of the crosslinked resin, and thus a thin-film layer can be produced.

The method for coating the slurry [A] for thin-film layer is not particularly limited, and examples thereof include brush coating, bar coating, spray coating, screen printing, and inkjet method.

The suitable coating amount of the slurry [A] for thin-film layer is not particularly limited, and it can be suitably adjusted so as to have a desired thickness of the thin-film layer to be obtained.

The dryer is not particularly limited, and an IR heating dryer, a hot air heating dryer, and a heating dryer using both IR and hot air can be used.

Temperature for the drying (curing) and time for the drying (curing) are not particularly limited if drying of the solvent and curing of the crosslinked resin can be sufficiently carried out. However, they are suitably determined within a range in which the material deterioration does not occur depending on the type of the solvent and crosslinked resin to be used. From this point of view, temperature for the drying (curing) is preferably in a range of 80 to 150° C. Time for the drying (curing) is preferably in a range of 1 to 10 minutes.

The thickness of the thin-film layer obtained by the above production method can be adjusted to a desired thickness by suitably setting the aforementioned gap. Accordingly, it can be suitably adjusted such that it falls within the thickness range of the thin-film layer explained in the section of "thin-film layer" above. Furthermore, when heat press described below is carried out, the gap and conditions for heat press can be suitably adjusted such that thickness of the thin-film layer after heat press is within the thickness range of the thin-film layer explained in the section of "thin-film layer" above.

[Production of Epoxy Resin Layer B (Application of [C] for Forming Epoxy Resin Layer B or the Like)]

After carrying out the corona treatment described below for the resin current collector having thin-film layer formed on the negative electrode side, preferably for a surface not having a thin-film layer formed thereon (i.e., to-be-coated surface), by using a coating device (for example, micro bar coater) set with suitable gap (corresponding to the coating thickness of the epoxy resin layer B), the slurry [C] for forming the epoxy resin layer B is applied (coated) on a surface not having a thin-film layer formed thereon. After that, it was passed through the inside of a dryer with predetermined drying (curing) temperature over predetermined drying (curing) time to dry the solvent and to cure the epoxy resin.

Furthermore, before coating (applying) the slurry [C] for forming the epoxy resin layer B, it is preferable to carry out a corona treatment with predetermined discharge power on a to-be-coated surface on the side of the surface of the resin current collector on the negative electrode side, in which a thin-film layer is not formed, in order to improve the interface adhesiveness by providing functional groups. Accordingly, the surface wet tension of the resin current collector can be greatly enhanced, and thus desirable. Namely, an oxygen-containing functional group is formed on the surface by a corona treatment to yield improved adhesiveness to the epoxy resin layer B. Herein, it is preferable to carry out the corona treatment while winding the resin current collector at a rate of 3 to 10 m/minutes. At that time, the discharge power for corona treatment is preferably in a range of 0.5 to 3 kW from the viewpoint that the interface adhesiveness is improved by providing the functional groups (i.e., oxygen-containing functional group or the like) to a to-be coated surface of the resin current collector on the negative electrode side which is conveyed at the above winding rate.

The method for coating the slurry [C] for forming the epoxy resin layer B is not particularly limited, and examples thereof include brush coating, bar coating, spray coating, screen printing, and inkjet method.

The suitable coating amount of the slurry [C] for forming the epoxy resin layer B is not particularly limited, and it can be suitably adjusted so as to have a desired thickness of the epoxy resin layer B to be obtained.

The dryer is not particularly limited, and an IR heating dryer, a hot air heating dryer, and a heating dryer using both IR and hot air can be used.

Temperature for the drying (curing) and time for the drying (curing) are not particularly limited if drying of the solvent and curing of the epoxy resin can be sufficiently carried out. However, they are suitably determined within a range in which the material deterioration does not occur, depending on the type of the solvent and epoxy resin to be used. From this point of view, temperature for the drying (curing) is preferably in a range of 80 to 150° C. Time for the drying (curing) is preferably in a range of 1 to 10 minutes.

The thickness of the epoxy resin layer B obtained by the above production method can be adjusted to a desired thickness by suitably setting the aforementioned gap. Accordingly, it can be suitably adjusted such that it falls within the thickness range of the epoxy resin layer B to be explained in the section of "epoxy resin layer B" below. Furthermore, when heat press described below is carried out, the gap and conditions for heat press can be suitably adjusted such that thickness of the epoxy resin layer B after heat press is within the thickness range of the intermediate layer explained in the section of "epoxy resin layer B" below.

(b) Method for Transferring Thin-Film Layer onto Current Collector (or Intermediate Layer on the Resin Current Collector)

According to this method, a thin-film layer which has been separately produced from the resin current collector on the negative electrode side is transferred on top of the resin current collector on the negative electrode side (or intermediate layer on the same resin current collector)

As a method for producing a thin-film layer separately from the resin current collector on the negative electrode side, a method of coating the slurry [A] for thin-film layer, which has been produced in the same method as (a) above, on a heat resistance film like polyimide film or the like, followed by drying and reaction can be mentioned. The materials for forming a thin-film layer in the slurry [A] are the same as described in (a) above. Alternatively, it can be a method in which the materials for forming a thin-film layer are melt-mixed at a temperature not higher than their curing temperature, and molten mixture is reacted while being roll-pressed using a heat press machine. It is also possible to carry out, in the same manner as above (a), a corona treatment for a to-be-coated surface before coating (applying) the slurry [A]. Accordingly, the surface wet tension of the resin current collector (or intermediate layer) is greatly enhanced, and thus desirable. Namely, an oxygen-containing functional group is formed on the surface by a corona treatment, and thus a favorable adhesion property to a crosslinked epoxy resin layer (intermediate layer, thin-film layer, the epoxy resin layer B) can be obtained.

Various solvents used for the slurry [A], concentration of the materials for forming a thin-film layer in the slurry [A] (viscosity of the slurry [A]), coating method, drying conditions, or the like are the same as those described in (a) above.

Next, as a method for transferring the obtained thin-film layer or a thin-film layer, which has been obtained by melt-kneading and roll-pressing, onto the resin current collector on the negative electrode side (or intermediate layer on the resin current collector), a heat press method and the like which uses a known heat roll device, heat press device or the like can be mentioned.

In a case in which the thin-film layer is prepared on top of a heat resistant film, by peeling of the heat resistant film after the transfer, the thin-film layer can be formed on top of the resin current collector on the negative electrode side (or intermediate layer on the resin current collector).

(c) Method for Adhering Thin-Film Layer and Resin Current Collector on Negative Electrode Side (or Intermediate Layer on Resin Current Collector)

According to this method, a thin-film layer prepared separately from the resin current collector on the negative electrode side (or intermediate layer on the resin current collector) is adhered on top of the resin current collector (or intermediate layer on the resin current collector) by using a conductive adhesion member. A method for producing a thin-film layer separately from the resin current collector on the negative electrode side (or intermediate layer on the resin current collector) is the same as those explained in (b) above.

The conductive adhesion member includes a monomer or an oligomer which has at least two thermally polymerizable groups in one molecule, a conductive material, a polymerization initiator, or the like.

Examples of the monomer or oligomer include bifunctional (meth)acrylate such as ethylene glycol di(meth)acrylate, diethylene glycol di(meth)acrylate, triethylene glycol di(meth)acrylate, tetraethylene glycol di(meth)acrylate, propylene glycol di(meth)acrylate, dipropylene glycol di(meth)acrylate, tripropylene glycol di(meth)acrylate, 1,3-butanediol di(meth)acrylate, 1,4-butanediol di(meth)acrylate, or 1,6-hexanediol di(meth)acrylate, trifunctional (meth)acrylate such as trimethylol propane tri(meth)acrylate, pentaerythritol tri(meth)acrylate, and tetrafunctional (meth)acrylate such as ditrimethylol propane tetra(meth)acrylate or pentaerythritol tetra(meth)acrylate. Other than those described above, a monomer like urethane (meth)acrylate, a copolymer oligomer thereof, or a copolymer oligomer with acrylonitrile can be mentioned, but it is not limited thereto. Furthermore, as described herein, the term "(meth)acrylate" indicates methacrylate and acrylate.

Furthermore, examples of the conductive material include a carbon material such as acetylene black, Ketjen black, carbon black, graphite, gas phase-grown carbon fiber, or carbon nanotube, and metal powder such as gold, silver, copper, aluminum, nickel, or magnesium. Examples of the polymerization initiator include dicumyl peroxide, di-t-butyl peroxide, t-butyl peroxy benzoyl, t-butyl hydroperoxide, benzoyl peroxide, and cumene hydroperoxide.

Each of the above monomer or oligomer, conductive material, and polymerization initiator can be used either singly or in combination of two or more kinds thereof.

According to this production method, in-plane irregularities of contact resistance are reduced.

Among the methods (a) to (c), the method (a) is preferable. Namely, the production method of this embodiment is preferably a method in which the slurry [A] for thin-film layer is coated and dried on the resin current collector on the negative electrode side (or intermediate layer on the resin current collector) to obtain a thin-film layer which has conductivity and has impermeability to the electrolyte solution. It is preferable to have a step of forming a thick-film active material layer described later on top of the thin-film layer obtained as above. That is because, electric contact between the conductive filler A (and also carbon-based conductive filler of intermediate layer) in the resin current collector on the negative electrode side and the conductive filler B is efficiently and also stably formed so that the contact resistance is further reduced and durability is further improved.

In a case in which the thin-film layer has a laminate structure with two or more layers, a resin material of each thin-film layer preferably has the same kind. By having the resin material of the same kind, adhesiveness between thin-film layers is increased, yielding lower contact resistance. Furthermore, for the thin-film layer with 2 or more layers, it is preferable that plural thin-film layers that are different from one another are laminated by coating and drying each of plural slurries [A] for thin-film layer of the above (a) having different composition, for example. Other than that, it is also possible to have the adhesion by using a conductive adhesion member, for example. By carrying out the adhesion by using a conductive adhesion member, in-plane irregularities of contact resistance can be reduced. As for the conductive adhesion member to be for that case, those that are the same as those explained in (c) above are used, and not particularly limited.

(6) Layer Constitution of Thin-Film Layer

Furthermore, the thin-film layer may have a single layer structure or a laminate structure in which layers using materials for forming a thin-film layer (which may be the same or different from each other) are suitably combined.

[III] Intermediate Layer

According to the electrode of this embodiment, an electron conductive intermediate layer is preferably included between the resin current collector and thin-film layer as illustrated in FIGS. 4 and 5. Having this constitution is excellent in that the interface contact (connection) resistance between the thin-film layer represented by an Ni epoxy resin layer and the resin current collector represented by acetylene black-containing polypropylene current collector can be mentioned. It can be said that, by arranging as an intermediate layer an epoxy resin layer containing carbon-based conductive filler like high concentration acetylene black, which does not create voids or the like, contact possibility between conductive fillers increases at both interfaces so that the interface resistance can be reduced. The intermediate layer is not particularly limited as long as it has electric conductivity, but it is preferably a crosslinked epoxy resin layer containing carbon-based conductive filler. Having this constitution is excellent in that, as light weight is obtained and carbon filler (acetylene black) is further dispersed at high density due to the epoxy resin (thin-film layer) as a dense crosslinked resin having no pin hole, the exposure area of the carbon-based conductive filler (acetylene black or the like) on layer surface increases, and consequently the contact resistance at both interfaces can be reduced (get smaller). In this regard, in the speciation and claims of the present invention, to distinguish it from the crosslinked epoxy resin layer which is used for the surface of the resin current collector opposite to the negative electrode side described below, it is described as the epoxy resin layer A. Hereinbelow, explanations are given by having the epoxy resin layer A containing a carbon-based conductive filler as a suitable intermediate layer, as an example.

The conductivity (electric conductivity) of the intermediate layer (bulk) is preferably 0.01 S/cm or higher. As for the measurement of the conductivity (electric conductivity), the electric conductivity can be measured by the four-terminal method after producing a sample with strip shape.

(1) Carbon-Based Conductive Filler

The carbon-based conductive filler (also simply referred to as a carbon filler) to be contained in the epoxy resin layer A as a suitable intermediate layer is selected from materials having electron conductivity (i.e., conductivity). Preferably, from the viewpoint of suppressing ion permeation in the epoxy resin layer A, it is preferable to use a material which has no conductivity for ions. Furthermore, because the conductive filler B in the thin-film layer does not alloy with Li and the thin-film layer (for example, Ni filler-containing epoxy resin layer) has a good property of blocking the electrolyte solution, the electrolyte solution (Li$^+$) cannot reach the intermediate layer, and thus the carbon filler of the intermediate layer can effectively function without being lithiated. Furthermore, using carbon filler as conductive filler of the intermediate layer (and also the epoxy resin layer B) is excellent in that not only light weight can be achieved but also adhesiveness to the thin-film layer represented by the outermost Ni filler-containing epoxy resin is improved.

(1a) Materials of Carbon-Based Conductive Filler

As for the carbon filler to be included in the epoxy resin layer A, the carbon material of the conductive filler A described above can be used. Namely, examples of the carbon filler (carbon material) to be included in the intermediate layer include at least one kind selected from a group consisting of acetylene black (AB), carbon black, Vulcan, Black Pearls, carbon nanofiber, Ketjen black, furnace black, channel black, thermal lamp black, carbon nanotube, carbon nanohorn, and carbon nanoballoon, hard carbon, graphite, and fullerene. These carbon fillers (carbon materials) have a very broad potential window, are stable in a broad range against any of the positive electrode potential and negative electrode potential, and also have excellent conductivity. Furthermore, because the carbon materials have very light weight, a mass increase is kept at the minimum level. Furthermore, because the carbon fillers (carbon materials) are frequently used as a conductive aid of an electrode active material layer or the conductive filler A of a resin current collector, the contact resistance becomes very low even when they are in contact with those conductive aid or conductive filler as they are the same materials.

(1b) Shape of Carbon Filler

Shape of the carbon filler in the epoxy resin layer A as a suitable intermediate layer is not particularly limited, and a known shape such as particle shape, powder shape, fiber shape, plate shape, bulk shape, cloth shape, or mesh shape can be suitably selected. For example, when it is desired to have the conductivity over a broad range, it is preferable to use the conductive filler with particle shape. Incidentally, if it is desired to further enhance the conductivity in particular direction (for example, thickness direction or in-plane direction perpendicular to thickness reaction), it is preferable to use the carbon filler which has a constant orientation property with a shape like fiber shape, or to use it in combination with particle shape.

(1c) Average Particle Diameter of Carbon Filler

An average particle diameter (i.e., average particle diameter of primary particles; mainly, for a case of particle shape, powder shape, and bulk shape) of the carbon filler in the epoxy resin layer A (intermediate layer) is not particularly limited, but it is preferably in the range from 0.01 to 20 μm, and more preferably 0.03 to 5 μm or so. Furthermore, the "particle diameter" and "average particle diameter" of the carbon filler in the epoxy resin layer A (intermediate layer) can be also measured in the same manner as the "particle diameter" and "average particle diameter" of the conductive filler A described above.

In a case in which the carbon filler in the epoxy resin layer A (intermediate layer) has a fiber shape (plate shape, cloth shape, or mesh shape), the average fiber length (in case of plate shape, cloth shape, or mesh shape; average length of their longest side) is preferably 1 to 500 μm, although not particularly limited. Furthermore, the "average fiber length (average length of longest side)" of the carbon filler in the epoxy resin layer A (intermediate layer) can be measured in the same manner as "average fiber length (average length of longest side)" of the conductive filler A described above. Furthermore, when the carbon filler in the epoxy resin layer A (intermediate layer) has fiber shape (plate shape, cloth shape, or mesh shape), the average diameter is preferably 0.01 to 30 μm, although not particularly limited thereto.

(1d) Content of Carbon Filler

The content of the carbon filler in the epoxy resin layer A as a suitable intermediate layer is not particularly limited, as long as the electron conductivity is effectively exhibited and it falls within a range in which the performance of the epoxy resin (preferably the same performance as the epoxy resin as crosslinked resin of the thin-film layer) is not impaired. Namely, as described above, it can be said that, by arranging as an intermediate layer an epoxy resin layer containing carbon-based conductive filler like high concentration acetylene black, which does not create voids or the like, the probability of contact between conductive fillers increases at both interfaces so that the interface resistance can be reduced. From those points of view, the content of the carbon filler in the epoxy resin layer A (intermediate layer) is, to have high concentration, preferably 8 to 30 parts by mass, and more preferably 10 to 25 parts by mass relative to the total amount (100% by mass) of the epoxy resin layer A as an intermediate layer. By adding this amount of the carbon filler to the epoxy resin, the epoxy resin layer A (intermediate layer) can be provided with sufficient conductivity (electron conductivity) to reduce the interface resistance while an increase in mass of the epoxy resin layer A (intermediate layer) is suppressed.

(2) Crosslinked Epoxy Resin

According to this embodiment, a crosslinked epoxy resin is contained in the epoxy resin layer A (intermediate layer). The crosslinked epoxy resin can be used either singly or as a mixture of two or more kinds thereof. Furthermore, the crosslinked epoxy resin can be obtained as a commercially available product or by reacting a synthesized product of an epoxy resin.

(2a) Epoxy Resin

As for the crosslinked epoxy resin constituting the epoxy resin layer A, the epoxy resin which is the same as the epoxy resin product explained to be suitable for the crosslinked resin having impermeability to the electrolyte solution to constitute the thin-film layer can be used. This epoxy resin is preferable in that it has excellent impermeability and durability to the electrolyte solution to be used.

(2b) Content of Crosslinked Epoxy Resin

The content of the crosslinked epoxy resin in the epoxy resin layer A (intermediate layer) is not particularly limited as long as light weight, durability, solvent resistance or the like are provided within a range in which conductivity (electron conductivity) of the epoxy resin layer A (intermediate layer) is not impaired.

(3) Resins Other than Crosslinked Epoxy Resin

In the epoxy resin layer A (intermediate layer), a resin other than the epoxy resin may be contained within a range in which conductivity (electron conductivity) is not impaired, and both a polymer having no conductivity for universal use and a conductive polymer can be contained.

(4) Other Additives in Epoxy Resin Layer a (Intermediate Layer)

Other additives may be contained in the epoxy resin layer A (intermediate layer) as long as the properties of the epoxy resin layer A (intermediate layer) are not impaired.

(5) Thickness of Intermediate Layer (Epoxy Resin Layer A)

Thickness of intermediate layer (epoxy resin layer A) is preferably 2 to 20 μm, and more preferably 3 to 10 μm. When thickness of the intermediate layer (epoxy resin layer A) is 2 μm or more, it is preferable in terms of the role played by the intermediate layer in contact resistance (i.e., reducing contact resistance). When thickness of the intermediate layer (epoxy resin layer A) is 20 μm or less, it is preferable in terms of the energy density of a battery.

(6) Method for Producing Intermediate Layer (Epoxy Resin Layer A)

The method for producing an intermediate layer (epoxy resin layer A) is not particularly limited, and it can be formed in the same manner as the method for producing a thin-film layer described above.

(7) Layer Constitution of Intermediate Layer (Epoxy Resin Layer A)

Furthermore, the intermediate layer (epoxy resin layer A) may have a single layer structure or a laminate structure in which layers using materials for forming an intermediate layer (epoxy resin layer A) (which may be the same or different from each other) are suitably combined.

[IV] Epoxy Resin Layer B

According to the electrode of this embodiment, for each pseudo bipolar type electrode 23a of a pseudo bipolar type laminate battery as illustrated in FIG. 5, the epoxy resin layer B 18 is disposed on an opposite surface of the resin current collector 11b on the negative electrode side which constitutes the resin current collector (pseudo bipolar type current collector) 11. When a thin-film layer or an intermediate layer (epoxy resin layer A) is disposed on only a single surface of the resin current collector, curling is yielded. However, by having the above constitution, such curling can be effectively prevented, and thus it is excellent (see, comparison of the presence or absence of the curling and constitution of Examples 1 and 3, and Example 2 of Table 1). By having conductivity (electron conductivity) and allowing obtainment of light weight, the epoxy resin layer B is an epoxy resin layer containing carbon-based conductive filler. Because the thermal expansion coefficient of the resin current collector is higher than the thermal expansion coefficient of the epoxy resin layer (thin-film layer or intermediate layer), when a flat film is produced by curing the epoxy resin at a temperature higher than 100° C. and cooled at room temperature, bending (i.e., curling) is caused by a difference in the thermal expansion coefficient. As such, by arranging an epoxy resin layer, which has the same thermal expansion coefficient as that of the thin-film layer or intermediate layer, also on the opposite side of the resin current collector, balance is obtained based on working of similar shrinking forces in opposite direction from two surfaces, and thus the curling can be effectively prevented. Herein, in the speciation and claims of the present invention, to distinguish it from the aforementioned epoxy resin layer A as a suitable intermediate layer, it is described as the epoxy resin layer B.

The conductivity (electric conductivity) of the epoxy resin layer B (bulk) is preferably 0.01 S/cm or higher. As for the measurement of the conductivity (electric conductivity), the electric conductivity can be measured by the four-terminal method after producing a sample with strip shape. Furthermore, as for the epoxy resin and conductive filler material used for the epoxy resin layer B, those that are the same as the epoxy resin layer A (intermediate layer) can be used.

(1) Thickness of Epoxy Resin Layer B

Thickness of the epoxy resin layer B is preferably set such that it is not excessively high under the condition that curling is not caused by forming of the thin-film layer and intermediate layer on the opposite side.

(2) Method for Producing Epoxy Resin Layer B

The method for producing the epoxy resin layer B is not particularly limited, and it can be formed in the same manner as the method for producing a thin-film layer described above.

(3) Layer Constitution of Epoxy Resin Layer B

Furthermore, the epoxy resin layer B may have a single layer structure or a laminate structure in which layers using materials for forming the epoxy resin layer B (which may be the same or different from each other) are suitably combined.

[V] Positive Electrode Active Material Layer and Negative Electrode Active Material Layer In the present embodiment, explanations are given separately for each active material layer of a pseudo bipolar type electrode for which a thick-film electrode can be used, and for each active material of a bipolar type electrode in which a common electrode is used.

(1) Each Active Material Layer (Thick-Film Active Material Layer) of Pseudo Bipolar Type Electrode According to this embodiment, at least one (preferably, both) of the positive electrode active material layer and negative electrode active material layer contains a conductive member and an active material (particle) consisting of electron conductive materials. According to this embodiment, at least part of the active material (particle) is coated with a coating agent containing a coating resin and a conductive aid. Furthermore, each active material layer has one surface in contact with the electrolyte layer side (described as a first surface) and the other surface in contact with the resin current collector side (thin-film layer on the negative electrode side) (described as a second surface). In addition, at least part of the conductive member forms a conductive path which connects electrically one surface (first surface) to the other surface (second surface) of each active material layer.

The embodiment of the present invention includes an exemplary case in which the conductive member is a conductive fiber consisting part of non-woven fabric, an exemplary case in which the conductive member is a conductive fiber consisting part of woven or knitted fabric, an exemplary case in which the conductive member is a conductive fiber dispersed between the first surface and the second surface, and an exemplary case in which the conductive member is a conduction-treated resin consisting part of a foamed resin.

First, by using a drawing, explanations are given for an example in which the conductive member is a conductive fiber consisting part of non-woven fabric.

FIG. 6 is a schematic cross-sectional view which illustrates enlarged partial constitution of a single battery layer constituting the pseudo bipolar type laminate battery of FIG. 1, in particular, a partial schematic cross-sectional view which illustrates more specifically the internal constitution of the active material layer.

The single battery layer 19 illustrated in FIG. 6 has a structure in which the internal structure of the single battery layer 19 (i.e., structure in which the positive electrode active material layer 13, the electrolyte layer 17, the negative electrode active material layer 15, and the thin-film layer 14 are arranged in the order) is sandwiched by the resin current collector 11a on the positive electrode side and the counter-facing resin current collector 11b on the negative electrode side. If necessary, in the internal structure of the single battery layer 19, it is preferable that the intermediate layer 16 or the epoxy resin layer B18 is additionally disposed as illustrated in FIGS. 4 and 5. Furthermore, the outer periphery part of the single battery layer 19 is omitted in FIG. 6. Due to this reason, the sealing part (insulating layer) 31 obtained by being arranged on the outer periphery part is not illustrated, either.

The positive electrode active material layer 13 has a sheet shape with pre-determined thickness of t1, and it is provided with a first surface 111 disposed on the electrolyte layer 17 side and a second surface 121 disposed on the resin current collector 11a on the positive electrode side. The positive electrode active material 13a is included in the positive electrode active material layer 13. In this embodiment, the positive electrode active material 13a is coated with a coating agent, and explanations therefor will be given later.

Similar to the above, the negative electrode active material layer 15 has a sheet shape with pre-determined thickness of t2, and it is provided with a first surface 211 disposed on the electrolyte layer 17 side and a second surface 221 disposed on the resin current collector 11b on the negative electrode side. The negative electrode active material 15a is included in the negative electrode active material layer 15. In this embodiment, the negative electrode active material 15a is coated with a coating agent, and explanations therefor will be given later.

Since the thickness t1 of the positive electrode active material layer 13 and the thickness t2 of the negative electrode active material layer 15 are preferably thickened, they are preferably 150 to 1500 μm, respectively. When the electrode (in particular, each active material layer) is thick like that, a large amount of the active material (particle) can be included in a battery, a battery with high capacity can be prepared, and it is effective for increasing the energy density. The thickness t1 is more preferably 200 to 950 μm, and even more preferably 250 to 900 μm. The thickness t2 is more preferably 200 to 950 μm, and even more preferably 250 to 900 μm. According to the characteristic structure of the single cell layer 19 characteristic of the pseudo bipolar type laminate battery of the present invention, an electrode with such thickness can be achieved, and it is effective for increasing the energy density.

Figure 7:
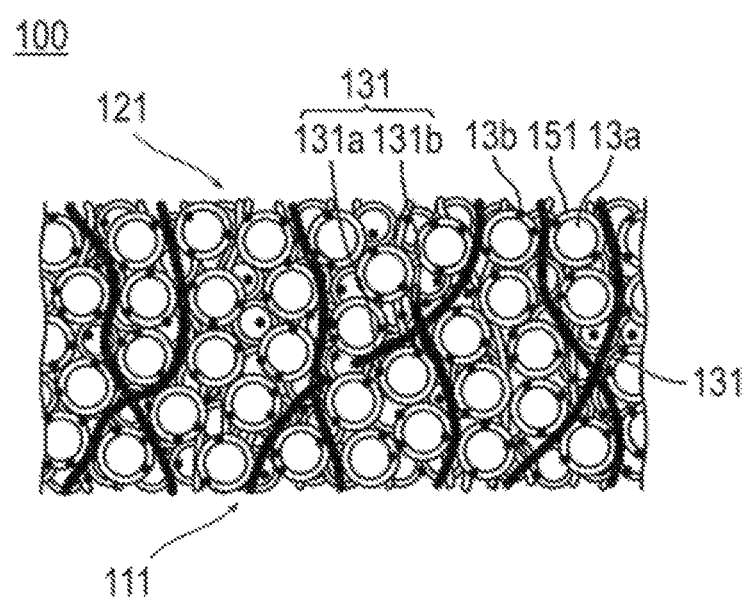
FIG. 7 is a cross-sectional view which diagrammatically illustrates only the positive electrode active material layer of FIG. 6.

FIG. 7 is a cross-sectional view schematically illustrating only a positive electrode active material layer illustrated in FIG. 6.

As illustrated in FIG. 7, a positive electrode active material layer 100 is provided with the first surface 111 and the second surface 121 (see FIG. 6). Furthermore, between the first surface 111 and the second surface 121, a conductive fiber 131 as a conductive member and a positive electrode active material 13a as an active material are included.

According to the embodiment illustrated in FIG. 7, the conductive member is a conductive fiber 131.

In the conductive fiber 131, an end part on one side of part of the fiber reaches the first surface 111 and an end on the other side reaches the second surface 121. Consequently, at least a part of the conductive fiber 131 forms a conductive path which electrically connects the first surface 111 to the second surface 121.

Furthermore, between the first surface 111 and the second surface 121, many conductive fiber 131 are present in entangled state. However, even for a case in which the plural conductive fiber 131 are in contact with one another to yield continuous connection from the first surface 111 to the second surface 121, it can be said that the conductive fiber forms a conductive path which electrically connects the first surface 111 to the second surface 121.

In FIG. 7, an example of the conductive fiber 131 which corresponds to a conductive path electrically connecting the first surface 111 to the second surface 121 is illustrated. The fiber represented by the conductive fiber 131a is an example in which one conductive fiber serves as a conductive path while the two fibers represented by the conductive fiber 131b are an example in which two conductive fibers serve as a conductive path as they are in contact with each other.

Examples of the conductive fiber include carbon fiber such as PAN carbon fiber and pitch carbon fiber, conductive fiber containing a highly conductive metal or graphite uniformly dispersed in synthetic fiber, metal fiber obtained by converting metals such as stainless steel into fiber, conductive fiber containing organic fiber whose surface is coated with a metal, and conductive fiber containing organic fiber whose surface is coated with a resin containing a conductive substance. Among these conductive fibers, carbon fiber is preferred.

In the present embodiment, the conductive member preferably has an electrical conductivity of 50 mS/cm or more. The electrical conductivity can be determined by measuring the volume resistivity in accordance with JIS R 7609 (2007) "Carbon fiber—Method for determination of volume resistivity" and calculating the reciprocal of the volume resistivity. As the electrical conductivity is 50 mS/cm or more, the conductive paths that are formed of the conductive fiber and connect the first surface 111 to the second surface 121 have small electrical resistance and allow smooth transfer of electrons from the active material far from the current collector, and therefore desirable.

The conductive fiber preferably has an average fiber diameter of 0.1 to 20 μm. The fiber diameter of the conductive fiber is measured by SEM observation. The average fiber diameter of the conductive fiber is determined as follows. Ten conductive fibers are randomly selected in a 30 μm-square field of view. The diameter at or near the middle of each of the ten fiber is measured. This measurement is performed at three fields of view. The average of the diameters of a total of 30 fibers is taken as the measured value.

In the present embodiment, the active material is a coated active material in which part of the surface of the material is coated with a coating agent 151 that includes a coating resin and a conduction assisting agent 13b. Details will be described later.

The conductive paths formed of the conductive fiber 131 are in contact with the positive electrode active material 13a around the conductive paths. Such contact of the conductive paths with the positive electrode active material allows the electrons generated from the positive electrode active material particles to quickly reach the conductive paths and flow through the conductive paths to the current collector. Since the conductive paths are formed of the conductive member that is an electron conductive material, electrons can smoothly reach the current collector. In the present embodiment, the active material is a coated active material. However, even in a case in which the coating agent is in contact with a conductive path, the conductive path can be regarded as being in contact with the active material.

In an active material layer without such a conductive path, electrons have to pass through an active material, which is not highly electronically conductive, and thus they are less likely to smoothly reach the current collector. Furthermore, in a case in which electrons are conducted via a conduction assisting agent consisting of particulates, there is electrical resistance between the particles. Thus, since the particles of the conduction assisting agent are not continuously joined to one another, electrons unavoidably pass through regions with high electrical resistance. Electrons are thus less likely to smoothly reach the current collector.

The conduction assisting agent 13b is selected from materials with conductivity. Details of the conduction assisting agent will be described later. Further, in the present embodiment, the conduction assisting agent 13b is contained in the coating agent 151, but it may be in contact with the positive electrode active material 13a. If the conduction assisting agent 13b is contained in the coating agent 151 or in contact with the positive electrode active material 13a, electron conductivity from the positive electrode active material 13a to arrival at the conductive path can be further enhanced.

Regarding the embodiment of FIG. 7, explanations are given by having a positive electrode as an example. However, in the case of a negative electrode, a negative electrode active material 15a may be used as an active material instead of a positive electrode active material 13a. Details of the negative electrode active material 15a will be also described later.

Also in the negative electrode, the conductive path is in contact with negative electrode active material 15a around the conductive path. As in the case of the positive electrode, electrons (e⁻) generated from the negative electrode active material 15a quickly reach the conductive path, flow through the conductive path, and smoothly flow through the thin film-layer 14 (and optionally further intermediate layer) to the resin current collector 11b on the negative electrode side.

Figure 8:
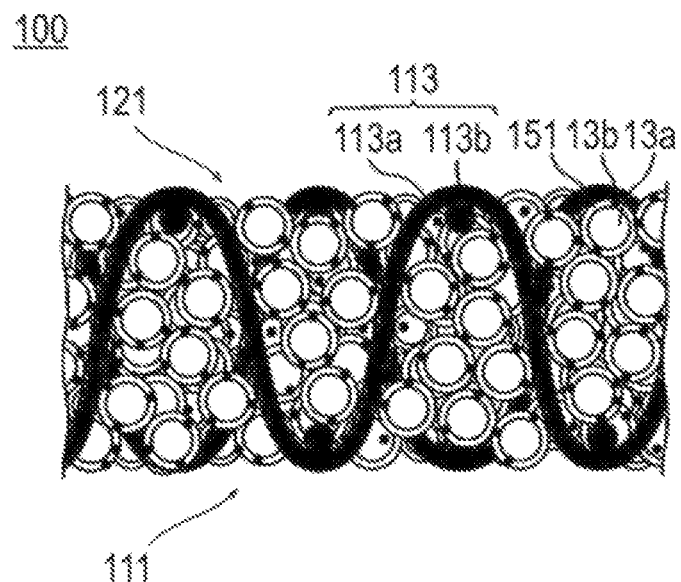
FIG. 8 is a cross-sectional view which diagrammatically illustrates an example of another embodiment of the positive electrode active material layer.

FIG. 8 is a cross-sectional view schematically illustrating other exemplary embodiment of the positive electrode active material layer.

In the positive electrode active material layer 100 of the embodiment illustrated in FIG. 8, the conductive member is a conductive fiber 113 which constitutes part of a woven fabric. The woven fabric is composed of warp yarns 113a and weft yarns 113b formed of the conductive fiber.

Furthermore, at least a part of the conductive fiber 113 has a portion extending to the first surface 111 and another portion extending to the second surface 121. Thus, at least a part of the conductive fiber 113 forms a conductive path that electrically connects the first surface 111 and the second surface 121.

Other constitutions including type of preferred conductive fiber and type of preferred active material are the same as those of the embodiment illustrated in FIG. 6, and thus the detailed explanation therefor is omitted here. Furthermore, by having a negative electrode active material as the active material, a negative electrode can be prepared.

Figure 9:
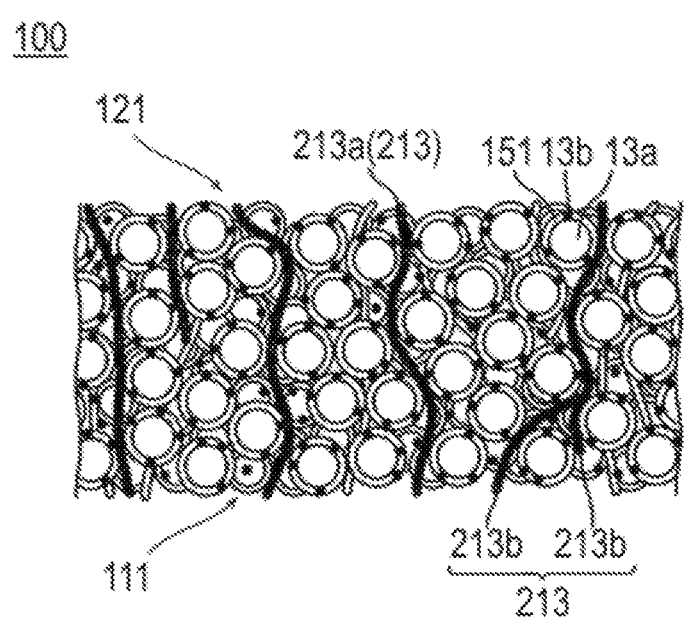
FIG. 9 is a cross-sectional view which diagrammatically illustrates an example of another embodiment of the positive electrode active material layer.

FIG. 9 is a cross-sectional view schematically illustrating other exemplary embodiment of the positive electrode active material layer.

In a positive electrode active material layer 100 having the mode illustrated in FIG. 9, the conductive member is a conductive fiber 213 which is dispersively present between a first surface 111 and a second surface 121. The conductive fiber 213 is not part of a structural body consisting of a conductive fiber like non-woven fabric, woven fabric, or knitted fabric illustrated in FIG. 7 and FIG. 8. It can be said that the mode illustrated in FIG. 9 is more favorable than the mode of a structural body consisting of a conductive fiber like non-woven fabric, woven fabric, or knitted fabric illustrated in FIG. 7 and FIG. 8. Namely, more favorable and more practical existence form of the conductive film in a thick-film electrode is, instead of a non-woven fabric or a knitted fabric, a state in which several conductive fibers are connected to one another so that the electron path reaches both surfaces. The method for producing the positive electrode active material layer illustrated in FIG. 9 will be described later in detail. However, it can be said that, according to this mode, production is made by using an active material composition for coating containing conductive fiber and active material for coating, and conductive fiber is dispersively present in the active material layer. In this regard, it is not required to fill voids among fibers with an active material for coating.

At least part of the conductive fiber 213 has a portion extending to the first surface 111 and another portion extending to the second surface 121. In other words, at least a part of the conductive fiber 213 forms a conductive path that electrically connects the first surface 111 to the second surface 121.

In FIG. 9, the fiber represented by the conductive fiber 213a is an example in which one conductive fiber serves as a conductive path while the two fibers represented by the conductive fiber 213b are an example in which two conductive fibers serve as a conductive path as they are in contact with each other.

Other constitutions including type of preferred conductive fiber and type of preferred active material are the same as those of the embodiment illustrated in FIGS. 6 and 7, and thus the detailed explanation therefor is omitted here. Furthermore, by having a negative electrode active material as the active material, a negative electrode can be prepared.

In the embodiment illustrated in FIG. 9, the conductive fiber as the conductive member and the coated active material may be fixed onto a film such that the fixed shape can be retained loosely to the extent that they do not flow. If the film is made of a material having high conductivity (conductive material), the film can be used as a resin current collector 11a (or 11b). In addition, the conductivity is not inhibited even if the film contacts with a resin current collector 11a (or 11b), and therefore desirable. It is noted that the film is not illustrated in FIG. 9. The production method in which the conductive fiber as the conductive member and the coated active material are fixed onto the film will be described later in detail.

In another separate embodiment, the conductive fiber as the conductive member and the coated active material may be fixed by a resin to keep the conductive fiber dispersed in the active material in a lithium ion battery (pseudo bipolar type laminate battery).

Figure 10:
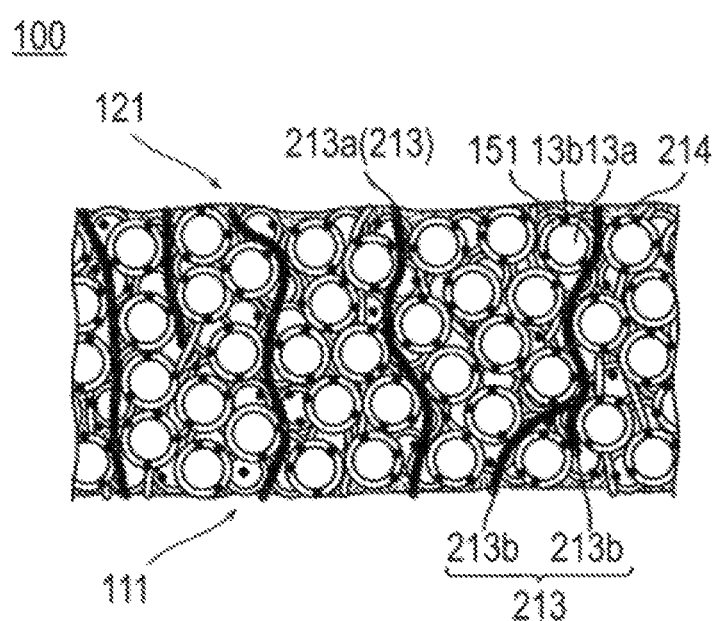
FIG. 10 is a cross-sectional view which diagrammatically illustrates an example of another embodiment of the positive electrode active material layer.

FIG. 10 is a cross-sectional view schematically illustrating other exemplary embodiment of the positive electrode active material layer.

The positive electrode active material layer 100 of the embodiment illustrated in FIG. 10 has the same constitution as that according to the embodiment illustrated in FIG. 9 except that the conductive fiber 213 as the conductive member and positive electrode active material 13a as the active material are fixed by a resin 214.

Examples of the resin 214 for fixing the conductive fiber and the coating active material include a vinyl resin, a urethane resin, a polyester resin, a polyamide resin, and the like.

Figure 11:
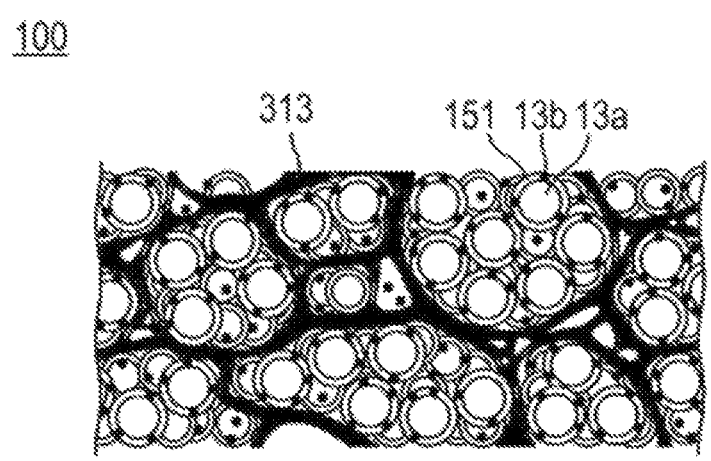
FIG. 11 is a cross-sectional view which diagrammatically illustrates an example of another embodiment of the positive electrode active material layer.

FIG. 11 is a cross-sectional view schematically illustrating other exemplary embodiment of the positive electrode active material layer.

In the embodiment illustrated in FIG. 11, the resin 313 provided with conductivity is continuous from the first surface 111 to the second surface 121. The resin 313 provided with conductivity forms a conductive path that electrically connects the first surface 111 to the second surface 121.

The resin prepared by conduction treatment may be, for example, a resin provided with conductivity obtained by forming a conductive thin film on the surface of a resin, or a resin provided with conductivity obtained by mixing a resin with a conductive filler such as a metal or carbon fiber. The resin itself may be a conductive polymer or a resin in which the conductive polymer is further provided with conductivity.

Examples of a method for forming a conductive thin film on the surface of a resin include metal plating, a deposition treatment, or a sputtering treatment.

In the positive electrode active material according to a preferred embodiment of the present invention, including the embodiments illustrated in FIGS. 7 to 11, the proportion by volume of the conductive member is preferably 0.1 to 15% by volume based on the volume of the positive electrode active material layer. In other words, the volume of the conductive member in the positive electrode active material layer is preferably relatively small. A small volume of the conductive member indicates that voids not occupied by the conductive member can be filled with a large number of coated active materials. By filling the voids with a large number of coated active materials, an electrode with high capacity can be obtained.

Furthermore, in a preferred embodiment of the present invention, the proportion by volume of the coated active material is preferably 30 to 80% by volume based on the volume of the active material layer. As the proportion of the coated active material is large, the electrode can have high capacity.

Explanations are further given regarding the method for manufacturing a pseudo bipolar type laminate battery according to a preferred embodiment of the present invention.

The method for manufacturing a pseudo bipolar type laminate battery according to a preferred embodiment of the present invention is a method for manufacturing a pseudo bipolar type laminate battery having a power generating element including two electrodes having different polarity and formed by forming active material layers on a resin current collector on the positive electrode side and on a resin current collector on the negative electrode side; and an electrolyte layer placed between the electrodes, in which at least one (preferably both) of the active material layers of the two electrodes having different polarity contains an active material and a conductive member made from an electron conducting material, and the active material layer has a first surface which comes into contact with the electrolyte layer side, and a second surface which comes into contact with the current collector side, at least a part of the conductive member forms a conductive path electrically connecting the first surface to the second surface, and the conductive path is in contact with the active material in the periphery of the conductive path, at least a part of the surface of the active material is coated with a coating agent that includes a coating resin and a conduction assisting agent, and the electrolyte solution is contained in the two electrodes having different polarity or the electrolyte layer.

Regarding the method for manufacturing a pseudo bipolar type laminate battery according to this embodiment, explanations are given first for the method for producing an electrode (active material layer) based on several separate modes.

One mode of the producing an electrode (active material layer) of the pseudo bipolar type laminate battery of the present invention includes a step of preparing a structural body which includes a conductive member, has plural voids therein, and is provided with the first surface and the second surface, a step of applying the first surface or the second surface of the structural body with a slurry containing the coated active material, and a step of filling the voids of the structural body with the coated active material under increased or reduced pressure.

The production method of the above mode is suitable for producing an active material layer of a mode which has been explained in view of FIG. 7, FIG. 8, or FIG. 11.

First, a structural body containing conductive member and having plural voids therein and a first surface and a second surface is prepared (this becomes the skeleton of the first surface and the second surface of the active material layer).

The active material composition for coating containing active material composition for coating may be in slurry form containing solvent or slurry form containing electrolyte solution. Furthermore, the slurry form means a state which has fluidity of clay phase to liquid phase, and this explanation for slurry can be also applied similarly to other embodiments.

Examples of the solvent include water, propylene carbonate, 1-methyl-2-pyrrolidone (N-methyl pyrrolidone), methyl ethyl ketone, dimethyl formamide, dimethyl acetamide, N,N-dimethylaminopropylamine, and tetrahydrofuran.

Furthermore, as the electrolytic solution, an electrolyte solution used for manufacturing a lithium ion battery, in which an electrolyte is dissolved in an organic solvent, can be used. As the electrolyte, a known one used for manufacturing a lithium ion battery such as an electrolyte described later can be used. As the organic solvent, those used in known electrolytic solutions such as organic solvents described below can be used. Incidentally, each of the electrolyte and the organic solvent may be used alone, or two or more of them may be used in combination.

The coated active material composition is prepared by dispersing a coated active material, and if necessary, a conduction assisting agent to a concentration of 10 to 60% by weight based on the weight of a solvent or an electrolyte solution followed preparing them in a slurry.

The slurry containing the coated active material obtained by the above method can be applied to the first surface or the second surface of the structure by a squeegee method or an arbitrary coating device such as a bar coater, a brush or the like.

Another aspect of the present invention includes a step of applying a slurry containing the conductive member and the coated active material to a film and a step of fixing the coated active material and conductive member on a film under pressurization or depressurization.

The method according to this aspect is suitable for producing the positive electrode active material layer according to the embodiment which has been explained by using FIG. 9.

FIGS. 12(a) and 12(b) schematically illustrate a step of fixing the coated active material and conductive member onto a film.

First, the coated active material composition including the conductive members 213 (213a, 213b) and the coated active material (13a+151) is coated on the film.

As the coated active material composition, there can be mentioned a coating active material composition which is further dispersed by adding electrically conductive fibers as a conductive member.

The conductive fiber may be any of the conductive fiber described in the above. As for the shape of the conductive fiber, the conductive fiber is preferably independent from one another. They preferably do not have a three-dimensional structure such as a non-woven fabric, a woven fabric, or a knitted fabric. If conductive fibers are independent from one another, the fiber is dispersed in the coated active material composition.

In this embodiment, the coated active material composition may be a slurry containing an electrolytic solution. As the electrolytic solution, an electrolytic solution used for manufacturing a lithium ion battery can be used. Further, it may be in the form of a slurry containing a solvent.

The film 470 is preferably a film capable of separating the coated active material and the conductive member from the electrolyte solution and the solvent in the subsequent pressurization or depressurization step. In addition, when the film 470 is made of a highly conductive material (conductive material), it is preferable because the conductivity is not hindered even when the film is brought into contact with the resin current collector. As the film material, for example, a material having an electric conductivity of 100 S/cm or more can be suitably used. Examples of film materials having such characteristics include filter paper containing conductive fibers such as carbon fibers, metal meshes, and the like.

The metal mesh which may be used is preferably made of stainless steel mesh. Examples of such a metal mesh include SUS316-made twilled Dutch weave wire mesh (available from Sunnet Industrial Co., Ltd.). The metal mesh preferably has an opening size that does not allow the coated active material or the conductive member to pass through the mesh. For example, a metal mesh of 2300 mesh is preferably used.

In this embodiment, the slurry-like coated active material composition can be coated on the film 470 using a squeegee method, or an arbitrary coating apparatus such as a bar coater, a brush, or the like.

FIG. 12(a) schematically illustrates a slurry applied to a film. A slurry containing the coated active material and conductive fiber 213 is applied to a filter paper 470 as a film.

Next, the coated active material and the conductive member are fixed onto the film by pressurization or depressurization.

The pressurization or the depressurization can be performed in the same manner as in the step described above.

By the pressurization or depressurization, the electrolyte solution or the solvent is removed from the coated active material composition, and the conductive fiber as the conductive member and the coated active material are fixed onto the film such that the fixed shape is retained loosely to the extent that they do not flow.

FIG. 12(b) illustrates a positive electrode active material layer 110 in which the conductive fiber 213 as the conductive member and the coated active material are fixed on the filter paper 470.

In the positive electrode active material layer 110, since a resin current collector can not be applied as a film (it does not have a filtering function), the film may be disposed on the separator side. Further, the membrane may be used as a separator. As an example of a film made of a material having no conductivity, an aramid separator (manufactured by Japan Vilene Co., Ltd.) and the like can be mentioned.

Furthermore, in the present embodiment, if the coated active material composition is an electrolyte solution slurry containing an electrolyte solution, the film is preferably a film impermeable to the coated active material but permeable to the electrolyte solution, and the electrolyte solution is preferably allowed to pass through the film by pressurization or depressurization so as to be removed.

It is also preferable to carry out a pressing step for pressing the active material composition for coating with even stronger pressure. That is because, by doing so, the surface of the active material layer on the opposite side the film can be suitably smoothened, and, when a coating film is formed by transferring of a resin current collector (or thin-film layer for the negative electrode side) on the active material layer or by a conventional method, the adhesiveness can be greatly enhanced.

In the press step, the pressure difference is greater than that in the pressurization or depressurization in previous step in order to improve the density of the coated active material. The press step has a concept which encompasses both pressurization in a case in which depressurization is performed in previous step and pressurization at a higher pressure in a case in which pressurization is performed in previous step.

Pressure for the press step can be suitably set, but it is preferably 1 to 5 $kg/cm^2$ or so, for example.

Furthermore, a step for transferring the active material for coating, which is fixed on a film, onto a surface of the resin current collector (or thin-film layer for the negative electrode side) or separator (on top of the active material layer or thin-film layer, coating film may be formed by a conventional method) is carried out, and an electrode is formed in which the first surface of the active material layer is arranged on the surface of the separator, or the second surface of the active material layer is arranged on the surface of the resin current collector (or thin-film layer for the negative electrode side).

For the transfer step, the transfer is preferably carried out by contacting a surface opposite to film 470 (first or second surface) with the surface of the resin current collector (or thin-film layer for the negative electrode side) or separator.

According to this embodiment, since the film 470 cannot be applied to a resin current collector, it is preferable to perform a step of peeling the film after the transfer is carried out by contacting with a surface of a separator, for example. After that, on a surface of the active material layer from which the film is peeled off, a resin current collector (or thin-film layer for the negative electrode side) is preferably formed by a conventional method. Furthermore, when a film is used as a separator, it is preferable to perform the step of peeling the film without performing the transfer (step). After that, the resin current collector (or thin-film layer for the negative electrode side) is favorably formed as a coating film on the surface of the active material layer from which the film is peeled off. In addition, if the active material layer from which the film is peeled off has high surface roughness, it is preferable to carry out suitably pressing. That is because, by doing so, the surface of the active material layer can be suitably smoothened, and, when a coating film is formed by transferring of a resin current collector (or thin-film layer for the negative electrode side) on the active material layer or by a conventional method, the adhesiveness can be greatly enhanced.

Next, another aspect of the present embodiment includes a step of coating an active material composition for coating containing conductive member, active material for coating, and resin on a film followed by pressurization or depressurization, and a step of fixing (binding) the active material for coating and conductive member using the resin and setting the active material for coating and conductive member on the film.

The production method of the above embodiment is suitable for producing the positive electrode active material layer of the embodiment which has been explained using FIG. 10.

Figure 13:
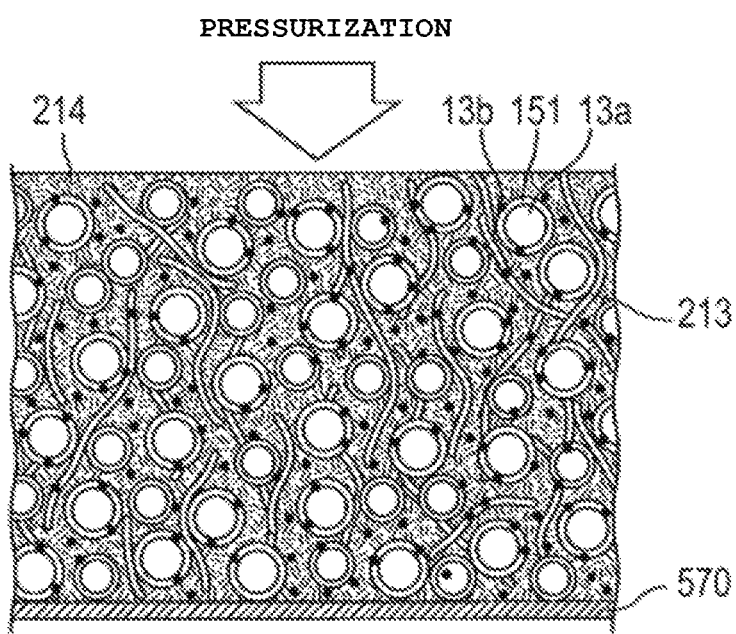
FIG. 13(a) and FIG. 13(b) are process flow charts which diagrammatically illustrate a process for fixing an active material for coating and a conductive member using a resin.
Figure 13:
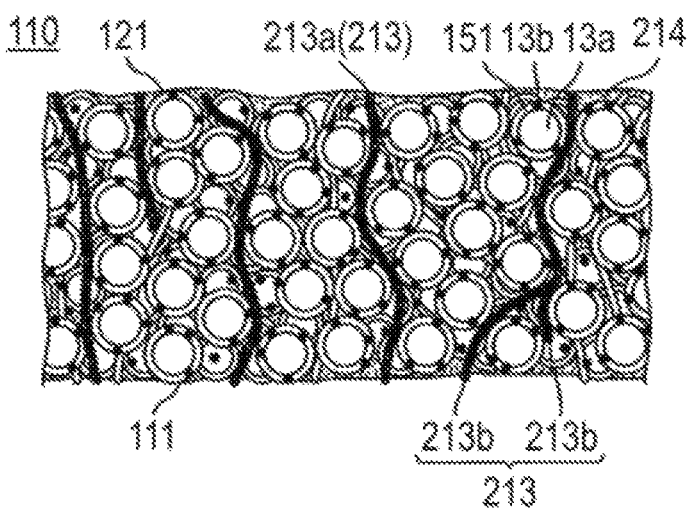

FIG. 13(a) and FIG. 13(b) are process flow charts which diagrammatically illustrate a process for fixing the active material for coating and conductive member (conductive fiber) using a resin having binder function and setting the active material for coating and conductive member on the film.

Figure 12:
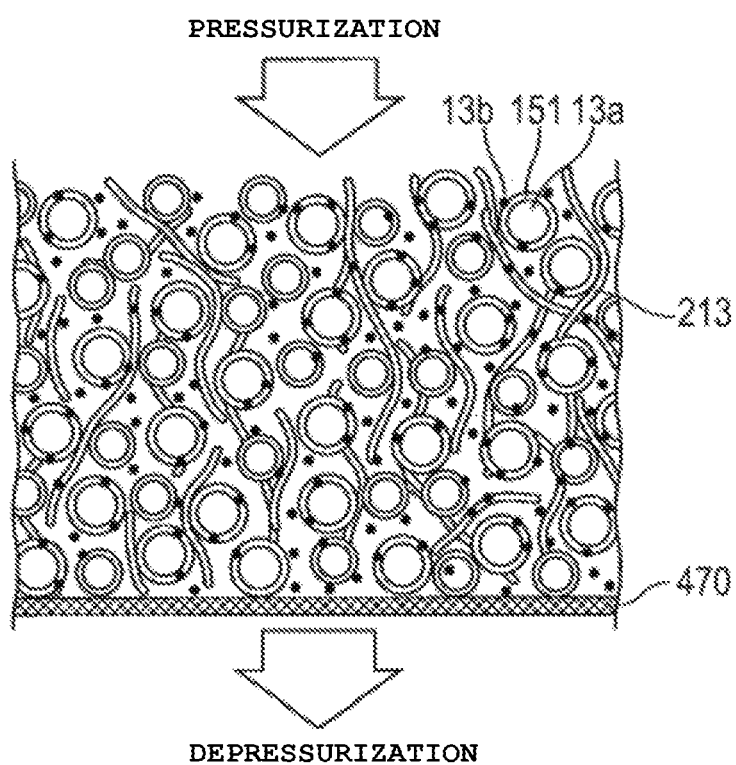
FIG. 12(a) and FIG. 12(b) are process flow charts which diagrammatically illustrate the process for fixing an active material for coating and a conductive member on top of a film.
Figure 12:
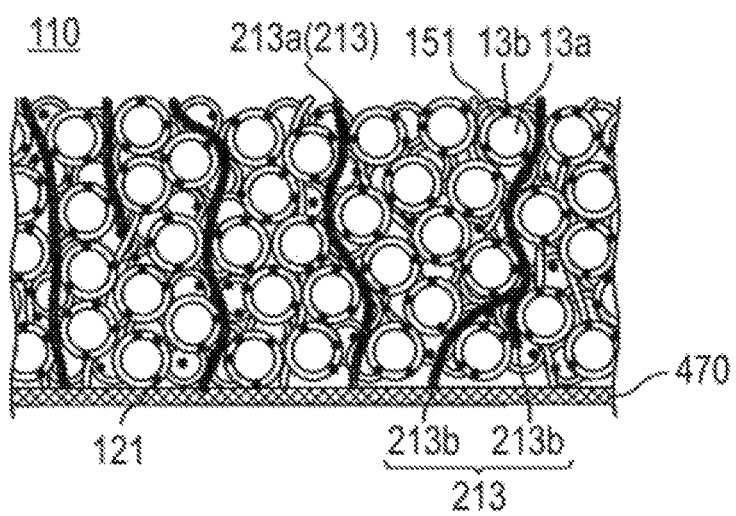

According to this embodiment, a resin having binder function is additionally added to the composition for active material of the embodiment illustrated in FIG. 12. Except that this active material composition for coating is coated on a film 570 and the active material for coating and conductive member (conductive fiber) are fixed using a resin having binder, the active material for coating (13a+151) and conductive member 213 (213a, 213b) are fixed on top of the film 570 in the same manner as the embodiment explained using FIG. 12(a) and FIG. 12(b) to form a coating film.

First, a composition for an active material containing a conductive member 213 (213a, 213b), a coating active material (13a+151), and a resin 214 having a binder function is prepared.

As for the conductive member, similar to the embodiment which has been explained in view of FIGS. 12(a) and 12(b), it is preferable to use the conductive fiber (213a, 213b) having a shape in which each fiber is independent from one another.

Preferred examples of the resin 214 having a binder function include vinyl resins, urethane resins, polyester resins, and polyamide resins. These resins are preferred from the viewpoint of moldability.

In the active material composition, the resin having a binder function may be present in the form of a resin solution dissolved in a solvent, or even in the form of a solid such as pellets fluidized by heating. When the resin having binder function is present in solid form like pellets that are fluidized by heating or the like, by using a resin which has a binder function under heating and pressurizing during the pressurization illustrated in FIG. 13(a), the active material for coating and conductive member (conductive fiber) can be fixed.

Furthermore, as the resin having binder function, a resin which is the same as the resin for coating contained in a coating agent 151 can be also used.

Coating of the composition for active material can be carried out by squeegee method or using any application device such as bar coater, brush, or the like. Furthermore, the pressing can be carried out by using a known press device.

At the time of producing a positive electrode active material layer according to the embodiment explained by using FIG. 7 to FIG. 11, it is preferable that a positive electrode active material layer with desired thickness is formed by coating the positive electrode active material composition by squeeze method. The squeegee method is a method in which, for the purpose of producing a coating film with predetermined shape and constant thickness, an active material composition is wiped on a surface of a mask, from top of a thin plate mask, which has been cut out to have predetermined shape, by using a rectangular thin plate (blade of applicator or the like) or a bar-like squeegee to for a coating film. In Examples, the coating film (active material layer) is formed by using a bar-like squeegee with the above squeegee method. Meanwhile, various modified forms are known (considered) for the squeegee method, and it is acceptable to apply them. For example, a combination of a squeegee and an applicator can be conveniently used.

(Positive Electrode Active Material)

Examples of a positive electrode active material 13a include complex oxides of lithium and transition metals including $LiMn_2O_4$, $LiMnO_2$, $LiCoO_2$, $LiNiO_2$, $Li(Ni-Mn-Co)O_2$, and a compound in which a part of these transition metals is replaced with another element, a lithium-transition metal phosphate compound, a lithium-transition metal sulfate compound, transition metal oxides (for example, $MnO_2$ and $V_2O_5$), transition metal sulfides (for example, $MoS_2$ and $TiS_2$), and conductive polymers (for example, polyaniline, polyvinylidene fluoride, polypyrrole, polythiophene, polyacetylene, poly-p-phenylene, and polycarbazole). Depending on a case, two or more kinds of the positive electrode active material may be used in combination. From the viewpoint of capacity and output characteristics, lithium-transition metal composite oxide is preferably used as a positive electrode active material.

(Negative Electrode Active Material)

Examples of a negative electrode active material 15a include a metal such as Si or Sn and a metal alloy (for example, lithium-tin alloy, lithium-silicon alloy, lithium-aluminum alloy, Li—Pb based alloy and lithium-aluminum-manganese alloy, or the like) and metal alloy (for example, lithium-tin alloy, lithium-silicon alloy, lithium-aluminum alloy, lithium-aluminum-manganese alloy, or the like), metal oxide such as TiO, $Ti_2O_3$, $TiO_2$, $SiO_2$, SiO, or $SnO_2$, complex oxide between lithium and transition metal such as $Li_{4/3}Ti_{5/3}O_4$ or $Li_7MnN$, Li, or carbon materials such as graphite (natural graphite or synthetic graphite), carbon black, amorphous carbon, calcined products of polymer compounds (for example, products obtained by calcining and carbonizing phenolic resins and furan resins), cokes (for example, pitch cokes, needle cokes, petroleum cokes), activated carbon, carbon fiber, soft carbon or hard carbon, and conductive polymers (for example, polyacetylene, polypyrrole).

In a case in which an active material product other than the above carbon material is used (hereinbelow, also referred to as a "non-carbon-based active material product"), it is preferable to use, as an active material, the non-carbon-based active material product of which surface is coated with carbon material.

The average particle diameter of the active material is not particularly limited, but from the viewpoint of having high capacity, reactivity, and cycle durability of a battery, preferably 1 to 100 μm, and more preferably 1 to 20 μm.

The content of the materials capable of functioning as an active material in each active material layer is preferably 85 to 99.5% by mass.

(Coating Agent)

As described above, according to an embodiment of the present invention, at least one (preferably both) of the positive electrode active material layer and the negative electrode active material layer includes a conductive material composed of an electron conducting material and an active material. According to this embodiment, at least a part of the surface of the active materials (particle) is coated with a coating agent 151 including a coating resin and a conduction assisting agent 13b (for positive electrode), a conduction assisting agent 15b (for negative electrode).

(Conduction Assisting Agent)

The conductive assisting agent is an additive compounded for improving the conductivity of the active material layer. Therefore, the conduction assisting agent is selected from materials with conductivity. Specific examples thereof include, but not limited to, metals [e.g., aluminum, stainless steel (SUS), silver, gold, copper, titanium], carbon [e.g., graphite, carbon fiber, carbon blacks (acetylene black, Ketjen black, furnace black, channel black, thermal lamp black)], and mixtures thereof.

These conduction assisting agents may be used either singly or two or more thereof may be used in combination. Alloys or metal oxides thereof may be used. From the viewpoint of the electrical stability, aluminum, stainless steel, carbon, silver, gold, copper, titanium, and mixtures thereof are preferred, silver, gold, aluminum, stainless steel, and carbon are more preferred, and carbon is still more preferred. The conduction assisting agent may be a particulate ceramic material or resin material coated with a conductive material (any of the metals mentioned above as conductive materials) by plating, for example. By containing a conductive aid in the active material layer, the conductive network is effectively formed inside the active material layer, and thus it can contribute to an improvement of the output characteristics of a battery. Herein, the content of the conductive aid is not particularly limited as long as the conductive of the active material layer can be increased to a desired level. However, it is preferably 0.5 to 15% by mass, and more preferably 1 to 10% by mass relative to the total amount of the active material layer (in terms of the solid content).

Shape (form) of the conduction assisting agent is not limited to a particle form, and it may be the form other than particle form or the form like carbon tube or the like which is available as a so-called filter type conductive resin composition.

From the viewpoint of the electric characteristics of a battery, the average particle diameter of a conduction assisting agent is preferably 0.01 to 10 μm, although it is not particularly limited thereto. Furthermore, in the present specification, the "particle diameter" means the maximum distance L among the distances between any two points on a contour of a conduction assisting agent. Values of "average particle diameter" indicate the values that are determined by using an observation means like scanning type electron microscope (SEM) or a transmission type electron microscope (TEM) and calculating the average value of particle diameter of particles that are observed from several to several tens of fields of view.

(Coating Resin)

Furthermore, according to a preferred embodiment of the present invention, a polymer having a vinyl monomer as an essential constitutional monomer is also preferred as a coating resin. The polymer having a vinyl monomer as an essential constitutional monomer has flexibility, and thus it is possible to alleviate the volume change of the electrode and suppress expansion of the electrode according to coating the active material with the polymer.

The coating resin is preferably obtained by including a polymer which has a liquid absorption rate of 10% or more when immersed in an electrolyte solution and a tensile elongation at break of 10% or more in a saturated liquid absorption state, and has a vinyl monomer as an essential constitutional monomer.

In particular, it is preferable to include, as a vinyl monomer, a vinyl monomer having a carboxy group and a vinyl monomer represented by the following general formula (1)

$$CH_2=C(R^1)COOR^2 \qquad (1)$$

In the formula (1), $R^1$ is a hydrogen atom or a methyl group; and $R^2$ is a linear alkyl group having a carbon number of 1 to 4 or a branched alkyl group having a carbon number of 4 to 36.

Examples of the vinyl monomer having a carboxyl group include monocarboxylic acids having a carbon number of 3 to 15 such as (meth)acrylic acid, crotonic acid, and cinnamic acid; dicarboxylic acids having a carbon number of 4 to 24 such as maleic acid (anhydride), fumaric acid, itaconic acid (anhydride), citraconic acid, and mesaconic acid; and trivalent, tetravalent, or higher polycarboxylic acids having a carbon number of 6 to 24 such as aconitic acid. Preferred among these is (meth)acrylic acid, with methacrylic acid being particularly preferred.

In the vinyl monomer represented by the above general formula (1), $R^1$ is a hydrogen atom or a methyl group. $R^1$ is preferably a methyl group.

$R^2$ is a linear alkyl group having a carbon number of 1 to 4 or a branched alkyl group having a carbon number of 4 to 36. Specific examples of $R^2$ include a methyl group, an ethyl group, a propyl group, a 1-alkyl alkyl group (1-methylpropyl group (sec-butyl group), 1,1-dimethylethyl group (tert-butyl group), 1-methylbutyl group, a 1-ethylpropyl group, a 1,1-dimethyl propyl group, a 1-methylpentyl group, a 1-ethylbutyl group, a 1-methylhexyl group, a 1-ethyl pentyl group, a 1-methyl heptyl group, a 1-ethylhexyl group, a 1-methyl octyl group, a 1-ethyl heptyl group, a 1-methyl nonyl group, a 1-ethyl octyl group, a 1-methyldecyl group, a 1-ethyl nonyl group, a 1-butyl eicosyl group, a 1-hexyl octadecyl group, a 1-octyl hexadecyl group, a 1-decyl tetradecyl group, a 1-undecyl tridecyl group or the like), 2-alkyl alkyl group (2-methylpropyl group (iso-butyl group), 2-methylbutyl group, a 2-ethylpropyl group, a 2,2-dimethyl propyl group, a 2-methylpentyl group, a 2-ethylbutyl group, a 2-methylhexyl group, a 2-ethyl pentyl group, a 2-methyl heptyl group, a 2-ethylhexyl group, a 2-methyl octyl group, a 2-ethyl heptyl group, a 2-methyl nonyl group, a 2-ethyl octyl group, a 2-methyldecyl group, a 2-ethyl nonyl group, a 2-hexyl octadecyl group, a 2-octyl hexadecyl group, a 2-decyl tetradecyl group, a 2-undecyl tridecyl group, a 2-dodecyl hexadecyl group, a 2-tridecyl pentadecyl group, a 2-decyl octadecyl group, a 2-tetradecyl octadecyl group, a 2-hexadecyl octadecyl group, a 2-hexadecyl eicosyl group, a 2-hexadecyl eicosyl group or the like), 3 to 34-alkylalkyl groups (such as 3-alkyl alkyl group, 4-alkyl alkyl group, 5-alkyl alkyl group, 32-alkyl alkyl group, 33-alkyl alkyl group, and 34-alkyl alkyl group); mixed alkyl groups containing one or more branched alkyl groups such as residues of oxo alcohols produced corresponding to propylene oligomers (from heptamer to undecamer), ethylene/propylene (molar ratio of 16/1 to 1/11) oligomers, isobutylene oligomers (from heptamer to octamer), and α-olefin (having a carbon number of 5 to 20) oligomer (from tetramer to octamer).

Preferred among these are a methyl group, an ethyl group, and a 2-alkyl alkyl group from the viewpoint of liquid absorption of an electrolyte solution, with a 2-ethylhexyl group and a 2-decyltetradecyl group being more preferred.

In addition to a vinyl monomer and the vinyl monomer represented by the above general formula (1), the monomers constituting the polymer may also include (contain) a copolymerizable vinyl monomer (b3) free of active hydrogen.

Examples of the copolymerizable vinyl monomer (b3) free of active hydrogen include the following monomers (b31) to (b35).

(b31) Hydrocarbyl (Meth)Acrylates Formed from Monool Having Carbon Number of 1 to 20 and (Meth) Acrylic Acid Examples of the monool include (i) aliphatic monools [such as methanol, ethanol, n- or i-propyl alcohol, n-butyl alcohol, n-pentyl alcohol, n-octyl alcohol, nonyl alcohol, decyl alcohol, lauryl alcohol, tridecyl alcohol, myristyl alcohol, cetyl alcohol, and stearyl alcohol]; (ii) alicyclic monools [such as cyclohexyl alcohol]; (iii) araliphatic monools (such as benzyl alcohol]; and mixtures of two or more thereof.

(b32) Poly(n=2 to 30)oxyalkylene (having a carbon number of 2 to 4) alkyl (having a carbon number of 1 to 18) ether (meth)acrylates [such as (meth)acrylate of ethylene oxide (hereinbelow, abbreviated as "EO") (10 mol) adduct of methanol, and (meth)acrylate of propylene oxide (hereinbelow, abbreviated as "PO") (10 mol) adduct of methanol]

(b33) Nitrogen-Containing Vinyl Compounds (b33-1) Amide Group-Containing Vinyl Compounds (i) (Meth)acrylamide compounds having a carbon number of 3 to 30, e.g., N,N-dialkyl (having a carbon number of 1 to 6) or diaralkyl (having a carbon number of 7 to 15) (meth) acrylamides [such as N,N-dimethylacrylamide and N,N-dibenzylacrylamide], and diacetone acrylamide (ii) Amide group-containing vinyl compounds having a carbon number of 4 to 20 excluding the above (meth) acrylamide compounds, e.g., N-methyl-N-vinylacetamide and cyclic amides (such as pyrrolidone compounds (having a carbon number of 6 to 13, e.g., N-vinyl pyrrolidone)).

(b33-2) (Meth)Acrylate Compounds (i) Dialkyl (having a carbon number of 1 to 4) aminoalkyl (having a carbon number of 1 to 4) (meth)acrylates [such as N,N-dimethylaminoethyl (meth)acrylate, N,N-diethylaminoethyl (meth)acrylate, t-butylaminoethyl (meth)acrylate, and morpholinoethyl (meth)acrylate]

(ii) Quaternary ammonium group-containing (meth)acrylates [quaternary compounds obtained by quaternizing tertiary amino group-containing (meth)acrylates [such as N,N-dimethylaminoethyl (meth)acrylate and N,N-diethylaminoethyl (meth)acrylate] with a quaternizing agent (such as quaternary product obtained by using the quaternizing agent)]

(b33-3) Heterocyclic Ring-Containing Vinyl Compounds

Pyridine compounds (having a carbon number of 7 to 14, e.g., 2- or 4-vinyl pyridine), imidazole compounds (having a carbon number of 5 to 12, e.g., N-vinyl imidazole), pyrrole compounds (having a carbon number of 6 to 13, e.g., N-vinyl pyrrole), and pyrrolidone compounds (having a carbon number of 6 to 13, e.g., N-vinyl-2-pyrrolidone)

(b33-4) Nitrile Group-Containing Vinyl Compounds

Nitrile group-containing vinyl compounds having a carbon number of 3 to 15, e.g., (meth) acrylonitrile, cyanostyrene, and cyanoalkyl (having a carbon number of 1 to 4) acrylate (b33-5) Other Nitrogen-Containing Vinyl Compounds Nitro group-containing vinyl compounds (having a carbon number of 8 to 16, e.g., nitrostyrene)

(b34) Vinyl Hydrocarbons (b34-1) Aliphatic Vinyl Hydrocarbons

Olefins having a carbon number of 2 to 18 or more [such as ethylene, propylene, butene, isobutylene, pentene, heptene, diisobutylene, octene, dodecene, and octadecene), dienes having a carbon number of 4 to 10 or more (such as butadiene, isoprene, 1,4-pentadiene, 1,5-hexadiene, and 1,7-octadiene)

(b34-2) Alicyclic Vinyl Hydrocarbons

Cyclic unsaturated compounds having a carbon number of 4 to 18 or more, e.g., cycloalkene (e.g., cyclohexene), (di)cycloalkadiene (e.g., (di)cyclopentadiene], terpene (e.g., pinene, limonene, and indene)

(b34-3) Aromatic Vinyl Hydrocarbons

Aromatic unsaturated compounds having a carbon number of 8 to 20 or more, e.g., styrene, α-methyl styrene, vinyl toluene, 2,4-dimethyl styrene, ethyl styrene, isopropyl styrene, butyl styrene, phenyl styrene, cyclohexyl styrene, and benzyl styrene (b35-1) Vinyl Esters Aliphatic vinyl esters [having a carbon number of 4 to 15, e.g., alkenyl esters of aliphatic carboxylic acid (mono- or dicarboxylic acid) (e.g., vinyl acetate, vinyl propionate, vinyl butyrate, diallyl adipate, isopropenyl acetate, and vinyl methoxy acetate)], aromatic vinyl esters [having a carbon number of 9 to 20, e.g., alkenyl esters of aromatic carboxylic acid (mono- or dicarboxylic acid) (e.g., vinyl benzoate, diallyl phthalate, methyl-4-vinyl benzoate), and aromatic ring-containing esters of aliphatic carboxylic acid (e.g., acetoxystyrene)]

(b35-2) Vinyl Ethers

Aliphatic vinyl ethers [having a carbon number of 3 to 15, e.g., vinyl alkyl (having a carbon number of 1 to 10) ether (such as vinyl methyl ether, vinyl butyl ether, and vinyl 2-ethylhexyl ether), vinyl alkoxy (having a carbon number of 1 to 6) alkyl (having a carbon number of 1 to 4) ethers (such as vinyl-2-methoxyethyl ether, methoxybutadiene, 3,4-dihydro-1,2-pyran, 2-butoxy-2'-vinyloxy diethyl ether, and vinyl-2-ethylmercapto ethyl ether), and poly(2 to 4) (meth) allyloxyalkane (having a carbon number of 2 to 6) (such as diallyloxyethane, triallyloxyethane, tetraallyloxybutane, and tetramethallyloxyethane)], aromatic vinyl ethers (having a carbon number of 8 to 20, e.g., vinyl phenyl ether and phenoxystyrene)

(b35-3) Vinyl Ketones

Aliphatic vinyl ketones (having a carbon number of 4 to 25, e.g., vinyl methyl ketone and vinyl ethyl ketone), aromatic vinyl ketones (having a carbon number of 9 to 21, e.g., vinyl phenyl ketone)

(b35-4) Unsaturated Dicarboxylic Acid Diesters

Unsaturated dicarboxylic acid diesters having a carbon number of 4 to 34, e.g., dialkyl fumarate (two alkyl groups are each a linear, branched, or alicyclic group having a carbon number of 1 to 22) and dialkyl maleate (two alkyl groups are each a linear, branched, or alicyclic group having a carbon number of 1 to 22) Preferred among the above examples of the monomer (b3) in terms of liquid absorption of electrolyte solution and withstand voltage are the monomers (b31), (b32), and (b33), with methyl (meth)acrylate, ethyl (meth)acrylate, and butyl (meth)acrylate among the monomers (b31) being more preferred.

In the polymer, content of the vinyl monomer (b1) having a carboxyl group, the vinyl monomer (b2) represented by the above formula (1), the copolymerizable vinyl monomer (b3) free of active hydrogen is preferably as follows based on the weight of the polymer: (b1) is 0.1 to 80% by weight, (b2) is 0.1 to 99.9% by weight, and (b3) is 0 to 99.8% by weight.

As the content of these monomers are in the above ranges, a favorable liquid absorption property for an electrolyte solution is obtained.

More preferred content is 30 to 60% by weight for (b1), 5 to 60% by weight for (b2), and 5 to 80% by weight for (b3); and still more preferred amounts are 35 to 50% by weight for (b1), 15 to 45% by weight for (b2), and 20 to 60% by weight for (b3).

The lower limit of the number average molecular weight of the polymer is preferably 10,000, more preferably 15,000, particularly preferably 20,000, and most preferably 30,000. The upper limit thereof is preferably 2,000,000, more preferably 1,500,000, particularly preferably 1,000,000, and most preferably 800,000.

The number average molecular weight of the polymer can be measured by GPC (gel permeation chromatography) under the following conditions.
  Device: Alliance GPC V2000 (manufactured by Waters.)
  Solvent: ortho-dichlorobenzene
  Standard substance: polystyrene
  Sample concentration; 3 mg/ml
  Column solid phase: two PL gel 10 μm MIXED-B columns connected in series (manufactured by Polymer Laboratories Limited)
  Column temperature: 135° C.

The solubility parameter ("SP value") of the polymer is preferably 9.0 to 20.0 $(cal/cm^3)^{1/2}$. The SP value of the polymer is more preferably 9.5 to 18.0 $(cal/cm^3)^{1/2}$, still more preferably 10.0 to 14.0 $(cal/cm^3)^{1/2}$. The polymer having an SP value of 9.0 to 20.0 $(cal/cm^3)^{1/2}$ is preferred in terms of liquid absorption of the electrolyte solution.

The glass transition point [hereinbelow, abbreviated as "Tg"; measurement method: differential scanning calorimetry (DSC)] of the polymer is preferably 80° C. to 200° C., more preferably 90° C. to 190° C., and particularly preferably 100° C. to 180° C., from the viewpoint of heat resistance of the battery.

The polymer can be produced by a known polymerization method (such as bulk polymerization, solution polymerization, emulsion polymerization, or suspension polymerization).

(Method for Producing Coated Active Material)

The coated active material coated with a coating agent can be obtained as follows, for example; an active material is added to a universal mixer and stirred at 10 to 500 rpm, and in the same state, a resin solution containing a coating resin (i.e., resin solution for coating) is added dropwise and mixed over 1 to 90 minutes followed by mixing with a conduction assisting agent, the temperature is increased to 50 to 200° C. under stirring, and the pressure is lowered to 0.007 to 0.04 MPa followed by maintaining it for 10 to 150 minutes. Furthermore, as a solvent for the resin solution, alcohols such as methanol, ethanol, or isopropanol can be suitably used.

The blending ratio between the resin for coating an active material and conduction assisting agent is, although not particularly limited, preferably as follows; resin for coating an active material (resin solid weight):conduction assisting agent=1:0.2 to 3.0 in terms of weight ratio.

The blending ratio between the active material and resin for coating an active material (resin solid weight) is, although not particularly limited, preferably as follows; active material:resin for coating an active material (resin solid weight)=1:0.001 to 0.1 in terms of weight ratio.

Furthermore, although the resin solution for coating contains a coating resin and solvent, it may be prepared by mixing a coating resin and a conduction assisting agent depending on a case. By further mixing a resin solution for coating, which has been mixed in advance, with an active material, the coating resin solution adheres to the surface of the active material and the active material can be coated with a resin solution for coating.

Furthermore, it is also possible that, when using a resin solution for coating, the coating resin, active material, and conduction assisting agent can be simultaneously admixed with one another, and surface of the active material is coated with a resin solution for coating which contains the coating resin and conduction assisting agent.

Furthermore, it is also possible that, when using a resin solution for coating, the active material is admixed with the coating resin followed by mixing with a conduction assisting agent, and surface of the active material is coated with a resin solution for coating which contains the coating resin and conduction assisting agent.

As described above, regarding the coated active material, at least a part of the active material is coated with a coating agent that includes a coating resin and a conduction assisting agent. Depending on one's opinion, such mode can be found to have a core-shell structure. According to this consideration, the average particle diameter of a core part (active material) is, although not particularly limited, preferably 1 to 100 μm, and more preferably 1 to 20 μm from the viewpoint of having higher output power. The thickness of the shell part is not particularly limited, either, but as a thickness of a state in which a gel is not formed, the thickness thereof is preferably 0.01 to 5 μm, and more preferably 0.1 to 2 μm. In addition, as a thickness after the shell part is immersed in an electrolyte solution (1 M $LiPF_6$, ethylene carbonate (EC)/diethyl carbonate (DEC)=3/7 (volume ratio)) at 50° C. for 3 days, the thickness thereof is preferably 0.01 to 10 μm, and more preferably 0.1 to 5 μm.

(Electrolyte Solution)

According to this embodiment, an electrolyte solution (liquid electrolyte) is contained in the active material layer of two electrodes with different polarity. The method for having an electrolyte solution contained in the active material layer is not particularly limited, and it can be contained by wetting based on impregnation of the active material layer prepared as above in an electrolyte solution. Alternatively, it can be contained by wetting based on impregnation of an electrolyte solution in the electrolyte layer in the active material layer or the like.

The electrolyte solution (liquid electrolyte) has a function of a lithium ion carrier, and it has the form in which lithium salt as an electrolyte is dissolved in an organic solvent. Examples thereof include carbonates such as ethylene carbonate (EC), propylene carbonate (PC), dimethyl carbonate (DMC), diethyl carbonate (DEC), or ethyl methyl carbonate. Further, as a lithium salt, the compound which may be added to an active material layer of an electrode, such as $Li(CF_3SO_2)_2N$, $Li(C_2F_5SO_2)_2N$, $LiPF_6$, $LiBF_4$, $LiClO_4$, $LiAsF_6$, $LiTaF_6$, and $LiCF_3SO_3$, can be similarly employed.

The electrolytic solution (liquid electrolyte) may also contain additives other than the components that are described above. Specific examples of such compounds include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, arylethylene carbonate, vinyloxymethylethylene carbonate, aryloxymethylethylene carbonate, acryloxymethylethylene carbonate, methacryloxymethylethylene carbonate, ethynylethylene carbonate, propartylethylene carbonate, ethynyloxymethylethylene carbonate, propartyloxyethylene carbonate, methylene ethylene carbonate, and 1,1-dimethyl-2-methylene ethylene carbonate. Among them, vinylene carbonate, methylvinylene carbonate, and vinylethylene carbonate are preferable, and vinylene carbonate and vinylethylene carbonate are more preferable. Those cyclic carbonate esters may be used either singly or in combination of two or more types thereof.

Furthermore, according to this embodiment, an electrolyte solution which has been gellified by using a thermally polymerizable monomer or the like can be also used.

The blending ratio of the components that are included in an active material layer is not particularly limited. The blending ratio can be adjusted according to suitable reference to the knowledge known for a lithium ion secondary battery. The thickness of each active material layer is not particularly limited, either, and reference can be made suitably to the knowledge known for a battery.

(2) Each Active Material Layer of Bipolar Type Electrode

The active material layer of a bipolar type electrode contains an active material. Herein, the active material generates electric energy according to adsorption and desorption of ions during charge and discharge. The active material includes a positive electrode active material which has a composition for adsorbing ions during discharging and desorbing ions during charging and a negative electrode active material which has a composition for desorbing ions during discharging and adsorbing ions during charging. The active material layer of this embodiment functions as the positive electrode active material layer if a positive electrode active material is used as an active material, while it functions as a negative electrode active material layer if a negative electrode active material is used. In the present specification, the descriptions that are common to both the positive electrode active material and negative electrode active material are simply explained as an "active material."

As for the positive electrode active material, the positive electrode active material which is the same as the positive electrode active material 13a explained for each active material layer of the pseudo bipolar type electrode of above (1) can be suitably used in an appropriate amount.

Meanwhile, as for a preferred negative electrode active material, a negative electrode active material which is the same as the negative electrode active material 15a explained for each active material layer of the pseudo bipolar type electrode of above (1) can be suitably used in an appropriate amount.

The average particle diameter of the active material is not particularly limited, either. However, those in the same range as the average particle diameter of each active material layer of the pseudo bipolar type electrode of above (1) can be suitably used.

The active material layer of this embodiment contains, if necessary, other additives such as conductive aid, a binder, an electrolyte (polymer matrix, ion conductive polymer, electrolyte solution, or the like), or lithium salts for enhancing the ion conductivity. However, the content of the materials which can function as an active material is preferably 85 to 99.5% by mass in the active material layer.

As for the conductive aid, a conductive aid which is the same as the conductive aid explained for each active material layer of the pseudo bipolar type electrode of above (1) can be suitably used in an appropriate amount.

The binder has a function of maintaining and preserving the structure of active material layer or conductive network by creating binding between the active material, conductive aid, or the like. Incidentally, when an active material for coating is used as an active material, the conductive network can be maintained without using any binder, and thus it is unnecessary to fix the structure of the active material layer with a binder. Also, from the viewpoint of the durability against volume change of an electrode caused by charge and discharge or external forces like vibration, the binder is preferably not used.

The method for producing an active material layer is not particularly limited, and a conventionally known method can be directly used or after making a suitable modification. Hereinbelow, a preferred embodiment of a method for forming an active material layer on the resin current collector (or thin-film layer) is explained, but the present embodiment is not limited to the following embodiment. For example, a slurry is prepared by dispersing an active material, and if necessary, other components like a binder, in a predetermined dispersion solvent and the slurry is applied on top of a separator or a resin current collector (or thin-film layer) followed by drying. Herein, the solvent which can be used as a dispersion solvent is not particularly limited, and ketones such as acetone, aromatic hydrocarbon solvent such as toluene or xylene, a polar solvent such as N-methyl-2-pyrrolidone (NMP), dimethyl formamide (DMF), dimethyl acetamide (DMAc), dimethyl sulfoxide (DMSO), tetrahydrofuran (THF), acetonitrile, or the like can be used. They may be used either singly or in combination of two or more types thereof. Concentration of the active material in slurry is not particularly limited, and it can be suitably selected depending on the thickness of an active material layer or the like. The coating method is not particularly limited, either, and examples thereof include coating with various coaters, brush coating, bar coating, spray coating, screen printing, inkjet method, and squeegee method. The coating amount of the active material is not particularly limited. The drying temperature and drying time are not particularly limited. Furthermore, the drying can be carried out under atmospheric pressure or reduced pressure.

[VI] Method for Producing Electrode for Lithium Ion Secondary Battery

Method for producing an electrode for a lithium ion secondary battery of the present embodiment is characterized by including (1) a step of forming a resin current collector by using a composition for forming a resin current collector which contains a polyolefin resin matrix and the conductive filler A, (2) a step of forming a thin-film layer which has conductivity and has impermeability to the electrolyte solution by coating a slurry for thin-film layer containing the conductive filler B that does not alloy with Li and a crosslinked resin on top of the resin current collector on the side in contact with a negative electrode active material layer followed by drying, and (3) a step of forming an electrode active material layer by coating an electrode slurry containing an electrode active material layer on top of the thin-film layer followed by drying. According to this production method, a crosslinked resin thin-film layer which has impermeability to the electrolyte solution, in which the conductive filler not alloying with Li is dispersed, can be disposed at the interface between the resin current collector and negative electrode active material layer, and thus lithiation of the carbon-based conductive filler present in the current collector can be suppressed. Accordingly, cycle deterioration of the battery can be improved. As a result, the durability of an electrode (battery), in particular, the charge and discharge cycle durability of an electrode (battery) can be enhanced. Furthermore, the step (1) above (i.e., method for producing a resin current collector) is the same as the explanations given in the section of "resin current collector" above. Furthermore, the step (2) above (i.e., method for producing a thin-film layer) is the same as the explanations given in the section of "thin-film layer" above. Furthermore, the step (3) above (i.e., method for producing an electrode active material layer) is the same as the explanations given in the positive electrode active material layer and the negative electrode active material layer above. Furthermore, regarding the production method above, the crosslinked resin is a crosslinked epoxy resin and the conductive filler B is an Ni filler. In this regard, it is also the same as the explanations given in the section of "thin-film layer" above. Furthermore, it is preferable to have additionally (4) a step for forming an intermediate layer having conductivity between the resin current collector and the thin-film layer. The step (4) above (i.e., method for producing an intermediate layer) is the same as the explanations given in the section of "intermediate layer" above. Furthermore, regarding the production method above, it is preferable that the step for forming an intermediate layer is to form the epoxy resin layer A as an intermediate layer by coating a slurry for forming an intermediate layer, which contains a carbon-based conductive filler and an epoxy resin, on top of the resin current collector. In this regard, it is also the same as the explanations given in the section of "intermediate layer" above. Furthermore, it is preferable to have additionally (5) a step for forming the epoxy resin layer B by coating a slurry containing a carbon-based conductive filler and an epoxy resin on a surface of the resin current collector that is opposite to side in contact with the negative electrode active material layer followed by drying. The step (5) above (i.e., method for producing the epoxy resin layer B) is the same as the explanations given in the section of the "epoxy resin layer B" above.

The above corresponds to the electrode for a lithium ion secondary battery (in particular, pseudo bipolar type electrode and bipolar type electrode) of the present embodiment, and the method for producing it. Hereinbelow, explanations are given for a lithium ion secondary battery using that electrode (i.e., pseudo bipolar type laminate battery and bipolar type battery).

[VII] Electrolyte Layer

For the battery of the present embodiment (i.e., pseudo bipolar type laminate battery and bipolar type battery), explanations are given separately for an electrolyte layer in which a thick-film pseudo bipolar type electrode is used, and an electrolyte layer in which a common bipolar type electrode is used.

(1) Electrolyte Layer of Pseudo Bipolar Type Laminate Battery

According to the electrolyte layer 17 of the present embodiment (see, FIG. 1 and the like), an electrolyte solution is impregnated in a polyolefin porous film separator.

(2) Electrolyte Layer of Bipolar Type Battery

The electrolyte to be used in the electrolyte layer of the present embodiment (see, FIG. 2) is not particularly limited, but a liquid electrolyte or a gel polymer electrolyte can be used from the viewpoint of securing the ion conductivity of the active material layer described above.

The liquid electrolyte (electrolyte solution) functions as a lithium ion carrier, and it has the form in which lithium salt as an electrolyte is dissolved in an organic solvent. As for the organic solvent and lithium salt to be used, the same organic solvent and lithium salt as the components of an electrolyte solution (liquid electrolyte) to be obtained in the active material layer described above can be used.

The liquid electrolyte (electrolyte solution) may additionally contain additives other than the components described above, and, in the electrolyte solution (liquid electrolyte) to be included in the active material layer, the same additives as the additives other than the aforementioned components (organic solvent and lithium salt) can be used.

The gel polymer electrolyte has a constitution that the aforementioned liquid electrolyte is injected to a matrix polymer (host polymer) consisting of an ion conductive polymer. Using the gel polymer electrolyte as an electrolyte is favorable in that the fluidity of an electrolyte disappears and ion conductivity between layers is easily blocked. Examples of an ion conductive polymer which is used as a matrix polymer include polyethylene oxide (PEO), polypropylene oxide (PPO), polyethylene glycol (PEG), polyacrylonitrile (PAN), polyvinylidene fluoride-hexafluoropropylene (PVdF-HEP), poly methyl methacrylate (PMMA), and copolymers thereof.

Furthermore, the matrix polymer of a gel polymer electrolyte can exhibit excellent mechanical strength by forming a cross-linked structure. For forming a cross-linked structure, it is preferable to perform a polymerization treatment of a polymerizable polymer for forming a polymer electrolyte (for example, PEO and PPO), such as thermal polymerization, UV polymerization, radiation polymerization, and electron beam polymerization, by using a suitable polymerization initiator.

As a porous sheet separator composed of a polymer or a fiber, a microporous (microporous membrane) separator can be used, for example. Specific examples of the porous sheet composed of a polymer or a fiber include a microporous (microporous membrane) separator which is composed of polyolefin such as polyethylene (PE) and polypropylene (PP); a laminate in which a plurality of them are laminated (for example, a laminate with three-layer structure of PP/PE/PP), and a hydrocarbon based resin such as polyimide, aramid, or polyvinylidene fluoride-hexafluoropropylene (PVdF-HFP), or glass fiber.

The thickness of the microporous (microporous membrane) separator cannot be uniformly defined as it varies depending on use of application. For example, for an application in a secondary battery for operating a motor of an electric vehicle (EV), a hybrid electric vehicle (HEV), and a fuel cell vehicle (FCV), it is preferably 4 to 60 μm as a single layer or a multilayer. The fine pore diameter of the microporous (microporous membrane) separator is preferably 1 μm or less at most (in general, the pore diameter is about several tens of nanometers).

As a non-woven separator, conventionally known ones such as cotton, rayon, acetate, nylon, and polyester; polyolefin such as PP and PE; polyimide and aramid are used either singly or as a mixture. Further, the bulk density of the nonwoven fabric is not particularly limited as long as sufficient battery characteristics can be obtained by the impregnated polymer gel electrolyte. Furthermore, it is sufficient that the thickness of the non-woven separator is the same as that of an electrolyte layer, and the thickness thereof is preferably 5 to 200 μm, and particularly preferably 10 to 100 μm.

(VIII) Positive Electrode Current Collecting Plate and Negative Electrode Current Collecting Plate The material for forming a current collecting plate (25, 27) is not particularly limited, and a known highly conductive material which has been conventionally used for a current collecting plate for a battery can be used. Preferred examples of the material for forming a current collecting plate include metal materials such as aluminum, copper, titanium, nickel, stainless steel (SUS), and an alloy thereof. From the viewpoint of light weightiness, resistance to corrosion, and high conductivity, aluminum and copper are more preferable. Aluminum is particularly preferable. Furthermore, the same material or a different material may be used for the positive electrode current collecting plate 27 and the negative electrode current collecting plate 25.

(Positive Electrode Lead and Negative Electrode Lead)

Further, although it is not illustrated, the gap between the resin current collector and the current collector plates (25, 27) or between the resin current collector and the current collector plate and the current collector tabs It may be electrically connected. Alternatively, instead of the current collector plate, the electrode lead may be derived from a laminate film made of battery outer material. The same material used for a lithium ion secondary battery of a related art can be also used as a material for forming the positive and negative electrode leads. Furthermore, a portion led from an outer casing is preferably coated with a heat resistant and insulating thermally shrunken tube or the like so that it has no influence on a product (for example, an automobile component, in particular, an electronic device or the like) according to electric leak after contact with peripheral devices or wirings.

(Positive Electrode Tab and Negative Electrode Tab)

Further, although it is not illustrated, a positive electrode tab and a negative electrode tab may be electrically connected via the resin current collector, current collector, and if necessary, positive electrode lead. Furthermore, it is also possible to have a structure in which, instead of a current collecting plate, the electrode tab is drawn from a laminate film as a battery outer casing material. The same material used for a known lithium ion secondary battery can be also used as a material for forming the positive electrode tab and negative electrode tab. Furthermore, a portion drawn from an outer casing is preferably coated with a heat resistant and insulating thermally shrunken tube or the like so that it has no influence on a product (for example, an automobile component, in particular, an electronic device or the like) according to electric leak after contact with peripheral devices or wirings.

<Seal Part>

The seal part (insulation layer) has a function of preventing contact between the current collectors adjacent to each other and preventing a short circuit caused at the end portion of the single battery layer. The material constituting the seal part may be any materials as long as it has an insulation property, a sealing property (sealing performance) to prevent the solid electrolyte from coming of f and prevent permeation of external moisture, heat resistance under battery operation temperature and the like. Examples of the material include an acrylic resin, a urethane resin, an epoxy resin, a polyethylene resin, a polypropylene resin, a polyimide resin, and rubber (ethylene-propylene-diene rubber: EPDM). Alternatively, an isocyanate adhesive, an acrylic resin adhesive, a cyanoacrylate adhesive, or the like may be used, and a hot-melt adhesive (urethane resin, polyamide resin, polyolefin resin) may also be used. Among these, from the viewpoint of corrosion resistance, chemical resistance, ease of production (film-forming performance), economical efficiency, and the like, a polyethylene resin or a polypropylene resin is preferably used as a constituent material of the insulation layer, and a resin containing an amorphous polypropylene resin as a main component and obtained by copolymerizing ethylene, propylene, and butene is preferably used.

[IX] Battery Outer Casing

As a battery outer casing, an envelope-shaped casing capable of covering a power generating element as illustrated in FIG. 1, in which a laminate film 29 including aluminum is contained, may be used in addition to a known metal can casing. As for the laminate film, a laminate film with a three-layered structure formed by laminating PP, aluminum, and nylon in this order can be used, but is not limited thereto. From the viewpoint of having higher output power and excellent cooling performance, and of being suitably usable for a battery for a large instrument such as an EV or an HEV, a laminate film is desirable. In addition, since the group pressure applied from outside to a power generating element can be easily controlled and thus the thickness of an electrolyte solution layer can be easily controlled to a desired value, an aluminate laminate is more preferred for an outer casing.

As the electrode having the constitution of the present embodiment is used in the pseudo bipolar type laminate battery of this embodiment, lithiation of carbon filler in the resin current collector can be suppressed. By additionally forming a positive electrode active material layer or a negative electrode active material layer using the aforementioned sheet-like electrode, the stress caused by expansion and shrinkage of an active material is alleviated even when an active material having a large battery capacity is used. Based on the synergistic effect between them, the cycle characteristics of the battery can be greatly improved. Therefore, the pseudo bipolar type secondary battery of this embodiment is suitably used as a power source for operating an EV or an HEV. Furthermore, even with the bipolar type battery of this embodiment, lithiation of carbon filler in the resin current collector can be suppressed by using the electrode which has the constitution of this embodiment so that the cycle characteristics of the battery can be improved, even though the suppression is not as much as that with the pseudo bipolar type laminate battery. Accordingly, even the bipolar type battery of this embodiment is suitably used as a power source for operating an EV or an HEV.

Figure 14:
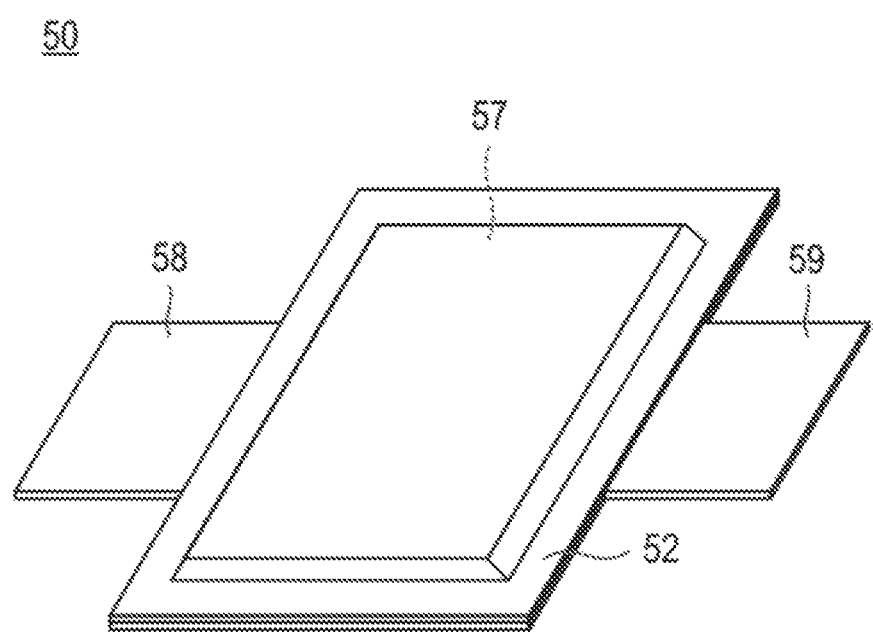
FIG. 14 is a perspective view illustrating the appearance of a flat lithium ion secondary battery (pseudo bipolar type laminate battery or bipolar type battery) as a representative embodiment of a secondary battery.

FIG. 14 is a perspective view illustrating the appearance of a flat lithium ion secondary battery as a representative embodiment of a secondary battery (a pseudo bipolar type laminate battery or bipolar type battery).

As illustrated in FIG. 14, a flat lithium ion secondary battery 50 has a flat and rectangular shape, and from both sides, a positive electrode tab 58 and a negative electrode tab 59 are drawn to extract electric power. A power generating element 57 is covered by a battery outer casing material (laminate film 52) of the lithium ion secondary battery 50 with its periphery fused by heat. The power generating element 57 is sealed in a state in which the positive electrode tab 58 and the negative electrode tab 59 are led to the outside. Herein, the power generating element 57 corresponds to the power generating element 21 of the lithium ion secondary battery (pseudo bipolar type laminate battery) 10*a*, 10*b* illustrated in FIGS. 1 and 2 as described above. The power generating element 57 includes a positive electrode (the positive electrode active material layer 11*a*, 11', the positive active material layer 13), the electrolyte layer 17 and the negative electrode (negative electrode active material layer 15, thin-film layer 14, negative electrode side resin current collectors 11*b* and 11') are stacked in a stacked manner.

Incidentally, the lithium ion secondary battery (a pseudo bipolar type laminate battery or bipolar type battery) is not limited to a flat shape of laminate type. The winding type lithium ion secondary battery may have a barrel shape or a flat and rectangular shape obtained by modifying the barrel shape, and there is no particular limitation. As an outer casing material of the barrel shape, a laminate film may be used, or a barrel can (metal can) of a related art may be used, and thus there is no particular limitation. Preferably, the power generating element is encased with an aluminum laminate film. The weight reduction may be achieved with such form.

Further, drawing of the tabs 58 and 59 illustrated in FIG. 14 is also not particularly limited. The positive electrode tab 58 and the negative electrode tab 59 may be drawn from the same side or each of the positive electrode tab 58 and the negative electrode tab 59 may be divided into plural tabs and drawn from each side, thus there is no particular limitation on the embodiment illustrated in FIG. 14. In addition, in a winding type lithium ion battery, it is also possible to form a terminal by using, for example, a barrel can (metal can) instead of a tab.

As described above, according to the pseudo bipolar type laminate battery, an active material of which surface is coated with a conduction assisting agent and a gel matrix polymer is used. Incidentally, in a lithium ion secondary battery of a related art, a polymer compound such as starch, polyvinylidene fluoride, polyvinyl alcohol, carboxylmethyl cellulose, polyvinyl pyrrolidone, tetrafluoroethylene, styrene-butadiene rubber, polyethylene, or polypropylene is used as a binder. However, according to an embodiment of the present invention, there is a merit that a binder may not be used. Furthermore, according to gellation of an electrolyte solution of a battery in which an electrode including a conductive member like carbon fiber is used, excellent rate characteristics of a battery are obtained, a crack or the like does not occur on an electrode even with high thickness, and partial deformation of an electrode is not caused even when nonuniform pressure is applied. As such, excellent cycle durability of a battery can be obtained.

<Assembled Battery>

An assembled battery is formed by connecting plural batteries. Specifically, at least two of them are used in series, in parallel, or in series and parallel. According to arrangement in series or parallel, it is possible to freely adjust the capacity and voltage.

It is also possible to form a detachable small-size assembled battery by connecting plural batteries in series or in parallel. Further, by connecting again plural detachable small-size assembled batteries in series or parallel, an assembled battery having high capacity and high output, which is suitable for a power source or an auxiliary power source for operating a vehicle requiring a high volume energy density and a high volume output density, can be formed. The number of the connected batteries for producing an assembled battery or the number of the stacks of a small-size assembled battery for producing an assembled battery with high capacity may be determined depending on the capacity or output of a battery of a vehicle (electric vehicle) on which the battery is mounted.

<Vehicle>

The lithium ion secondary battery (a pseudo bipolar type laminate battery or bipolar type battery) of the present invention can maintain discharge capacity even when it is used for a long period of time, and thus has good cycle characteristics. Further, the non-aqueous electrolyte secondary battery has a high volume energy density. For use in a vehicle such as an electric vehicle, a hybrid electric vehicle, a fuel cell electric vehicle, or a hybrid fuel cell electric vehicle, a long service life is required as well as high capacity and large size compared to use for an electric and mobile electronic device. Therefore, the lithium ion secondary battery (a pseudo bipolar type laminate battery or bipolar type battery) described above can be preferably used as a power source for a vehicle, for example, as a power source for operating a vehicle or as an auxiliary power source for operating a vehicle. Specifically, for the present embodiment, it is preferable to use a power source which is characterized in that plural single battery layers having the pseudo bipolar type electrode (in particular, negative electrode) of the pseudo bipolar type battery illustrated in FIGS. 1 and 6 are laminated. Accordingly, for the pseudo bipolar type battery, performance can be checked for each single battery layer (single cell) which is laminated in plurality as illustrated in FIG. 6, and thus it is excellent in that a compact bipolar type battery provided with single battery performance can be obtained with high yield.

Specifically, the battery or an assembled battery formed by combining plural batteries can be mounted on a vehicle. According to the present invention, a battery with excellent long term reliability and output characteristics, and a long service life can be formed, and thus, by mounting this battery, a plug-in hybrid electric vehicle with a long EV driving distance or an electric vehicle with a long single-charge driving distance can be achieved. This is because, when the battery or an assembled battery formed by combining plural batteries is used for, for example, an automobile such as a hybrid car, a fuel cell electric car, and an electric car (including a two-wheel vehicle (motor bike) or a three-wheel vehicle in addition to all four-wheel vehicles (an automobile, a truck, a commercial vehicle such as a bus, a compact car, or the like)), an automobile with a long service life and high reliability can be provided. However, the use is not limited to an automobile, and it can be applied to various power sources of other transportation means, for example, a moving object such as an electric train, and it can be also used as a power source for loading such as an UPS device.

EXAMPLES

Hereinbelow, the embodiments of the present invention are explained in greater detail by using the examples and comparative examples. However, the technical scope of the embodiments of the present invention is not limited to the following examples. Furthermore, unless specifically described otherwise, the operations are performed at room temperature (within a range of 25° C.±3° C.).

[Production of Resin Current Collector]

By using a biaxial extruder, 75% by mass of polypropylene [trade name of "SunAllomer PL500A", manufactured by SunAllomer] (B-1), 20% by mass of acetylene black (AB) (Denka Black NH-100), and 5% by mass of modified polyolefin resin (manufactured by Sanyo Chemical Industries, UMEX 1001) as a dispersing agent (A) for resin current collector were melt-kneaded at conditions including 180° C., 100 rpm, and retention time of 10 minutes to obtain a material for a resin current collector. The obtained material for a resin current collector was subjected to extrusion molding, and thus a resin current collector (20% AB-PP) with film thickness of 90 μm was obtained.

[Production of Acetylene Black Slurry]

4.5 Parts by mass of a liquid phase epoxy resin [CELLOXIDE 2021P (alicyclic epoxy resin; manufactured by Daicel Chemical Industries)], 17.5 parts by mass of polyfunctional epoxy resin [MARPROOF G2050M (manufactured by NOF Corporation)], 74.7 parts by mass of methyl ethyl ketone, 3.3 parts by mass of acetylene black, and 0.05 part by mass of a curing agent [SANAID SI-60 (manufactured by Sanshin Chemical Industry Co., Ltd.)] were added to a metal container, and stirred with a high speed shear type disperser. The resultant was referred to as acetylene black slurry (or AB slurry). In this regard, the viscosity was 15 to 20 mPa·s when it is measured by a B type viscometer (temperature: 25° C. and rotor: M3].

[Production of Nickel Slurry]

4 Parts by mass of a liquid phase epoxy resin [CELLOXIDE 2021P (alicyclic epoxy resin; manufactured by Daicel Chemical Industries)], 16 parts by mass of polyfunctional epoxy resin [MARPROOF G2050M (manufactured by NOF Corporation)], 33 parts by mass of methyl ethyl ketone, 47 parts by mass of nickel powder (manufactured by Vale, Type 123), and 0.05 part by mass of a curing agent ([SANAID SI-60 (manufactured by Sanshin Chemical Industry Co., Ltd.)] were added to a metal container, and stirred with a high speed shear type disperser. The resultant was referred to as nickel slurry (or Ni slurry). In this regard, the viscosity was 6,000 to 8,000 mPa·s when it is measured by a B type viscometer (temperature: 25° C. and rotor: M3).

By using a film applicator, the nickel slurry was applied on a Teflon (registered trademark) sheet to have film thickness of 120 μm and additionally cured by heating at 120° C. to obtain a resin film consisting of a nickel filler and a crosslinked epoxy resin. The obtained resin film was cut to a size of 1×1 cm, and then impregnated for 12 hours in an electrolyte solution which has been prepared by dissolving $LiPF_6$ at a ratio of 1 mol/L in a mixture solvent of ethylene carbonate (EC) and diethyl carbonate (DEC) (volume ratio of 3:7) under the environment of 23° C. After removing the electrolyte solution on the surface, the weight was measured. The change in the weight before and after the impregnation was 0.7% by weight relative to the weight before the impregnation in electrolyte solution.

[Application 1 of Acetylene Black Slurry (AB Slurry)]

The resin current collector (20% AB-PP) wound in roll shape was unwound at a rate of 5 m/minute. With a discharge power of 1 kW, a corona treatment was carried out for a to-be-coated surface, and the AB slurry was applied thereto using a micro bar coater with a gap set at 20 μm. After that, it was passed through a dryer at 110° C. over 3 minutes approximately to dry methyl ethyl ketone and cure the epoxy resin followed by winding in roll shape. It was confirmed that, as a result performing the corona treatment, the surface wet tension of the resin current collector has increased from 22 mN/m to 40 mN/m. At that time, the coating film of the AB slurry was formed with thickness of 5 μm on the resin current collector. This layer (i.e., intermediate layer having conductivity (electron conductivity)) is referred to as 5 μm-thick acetylene black epoxy resin layer A (AB epoxy resin layer A or 13% AB epoxy resin layer A). Herein, 13% AB epoxy resin layer A means the epoxy resin A which is obtained by containing 13% by weight of AB (acetylene black) relative to the total amount of the 13% AB epoxy resin layer A.

[Application of Nickel Slurry (Ni Slurry)]

The resin current collector wound in roll shape in which the 5 μm-thick AB epoxy resin layer A (intermediate layer) is formed was unwound at a rate of 5 m/minute. Then, on a surface of the 5 μm-thick AB epoxy resin layer A (intermediate layer), the Ni slurry was applied thereto using a micro bar coater with a gap set at 30 μm. After that, it was passed through a dryer at 110° C. over 3 minutes approximately to dry methyl ethyl ketone and cure the epoxy resin followed by winding in roll shape. At that time, the coating film of the Ni slurry was formed with thickness of 15 μm on the resin current collector having the 5 μm-thick AB epoxy resin layer A formed thereon. This layer is referred to as 15 μm-thick Ni epoxy resin layer (or 70% Ni epoxy resin thin-film layer). Herein, 70% Ni epoxy resin thin-film layer means the epoxy resin thin-film layer which is obtained by containing 70% by weight of nickel (Ni) relative to the total amount of the epoxy resin thin-film layer.

[Application 2 of Acetylene Black Slurry (AB Slurry)]

The resin current collector wound in roll shape having the 15 μm-thick Ni epoxy resin layer (thin-film layer) formed thereon was unwound at a rate of 5 m/minute. With a discharge power of 1 kW, a corona treatment was carried out for a surface on which the Ni epoxy resin layer (thin-film layer) is not formed, and the AB slurry was applied to the surface with the discharge treatment using a micro bar coater with a gap set at 160 μm. After that, it was passed through a dryer at 110° C. over 3 minutes approximately to dry methyl ethyl ketone and cure the epoxy resin followed by winding in roll shape. At that time, the coating film of acetylene black slurry was formed with thickness of 40 μm on the resin current collector. This layer is referred to as 40 μm-thick acetylene black epoxy resin layer (AB epoxy resin layer B or 13% AB epoxy resin layer B). Herein, 13% AB epoxy resin layer B means the epoxy resin B which is obtained by containing 13% by weight of AB (acetylene black) relative to the total amount of the 13% AB epoxy resin layer B.

[Production of Coated Resin Current Collector (Resin Current Collector Provided with Thin-Film Layer or the Like)]

Example 1: Production of Coated Resin Current Collector on Negative Electrode Side On the resin current collector (20% AB-PP), 5 μm-thick 13% AB epoxy resin layer A (intermediate layer) was prepared according to the Application 1 of AB slurry described above, and then 10 μm-thick 70% Ni epoxy resin thin-film layer was formed on top of it according to the Application of Ni slurry described above. In addition, on the opposite side of the resin current collector (i.e., surface having no thin-film layer or the like formed thereon), 40 μm-thick 13% AB epoxy resin layer B was prepared according to the Application 2 of AB slurry described above, thus producing a coated resin current collector on the negative electrode side of Example 1.

(Production of Coated Resin Current Collector on Negative Electrode Side of Example 2)

According to the same process as the production of the coated resin current collector of Example 1, but except that 13% AB epoxy resin layer B is not formed on the opposite side of the resin current collector, the coated resin current collector on negative electrode side of Example 2 was produced in the same manner as Example 1.

Furthermore, when the reaction is carried out by using a curing agent, molecular weight between crosslinkings was about 300 in Example 1 and Example 2 based on the epoxy equivalents (i.e., molecular weight per epoxy group) of the polyfunctional epoxy resin (epoxy equivalents: 340 g/eq) and liquid phase epoxy resin (epoxy equivalents: 135 g/eq) which have been used for the production of acetylene black slurry and production of nickel slurry.

(Production of Coated Resin Current Collector on Negative Electrode Side of Example 3)

According to the same process as the production of the coated resin current collector of Example 1, but except that 13% AB epoxy resin layer A (intermediate layer) is not formed between the resin current collector and 70% Ni epoxy resin thin-film layer, the coated resin current collector on negative electrode side of Example 3 was produced in the same manner as Example 1.

(Production of Coated Resin Current Collector on Negative Electrode Side of Comparative Example 1)

According to the same process as the production of the coated resin current collector of Example 1, but except that 10 μm-thick 70% Ni epoxy resin thin-film layer is not formed and 5 μm-thick 13% AB epoxy resin layer B is formed instead of 40 μm-thick 13% AB epoxy resin layer B, the coated resin current collector on negative electrode side of Comparative Example 1 was produced in the same manner as Example 1.

(Production of Coated Resin Current Collector on Negative Electrode Side of Comparative Example 2)

Instead of the coated resin current collector of Example 1, the resin current collector used in Example 1 (i.e., (20% AB-PP) was used as the resin current collector on the negative electrode side of Comparative Example 2.

[Preparation of Resin Solution for Coating]

To a four-necked flask equipped with a stirrer, a thermometer, a ref lux condenser, a dropping funnel, and a nitrogen gas introducing tube, 83 parts by mass of isopropanol were added, and the temperature was raised to 68° C. Subsequently, a monomer blend solution obtained by blending 242.8 parts by mass of methacrylic acid, 97.1 parts by mass of methyl methacrylate, 242.8 parts by mass of 2-ethylhexyl methacrylate, and 52.1 parts by mass of isopropanol, and an initiator solution obtained by dissolving 0.263 part by mass of 2,2'-azobis(2,4-dimethylvaleronitrile) in 34.2 parts by mass of isopropanol were continuously added dropwise to the four-necked flask with a dropping funnel while blowing nitrogen thereinto, under stirring over 4 hours, to perform radical polymerization. After completion of dropwise addition, an initiator solution obtained by dissolving 0.583 part by mass of 2,2'-azobis(2,4-dimethylvaleronitrile) in 26 parts by mass of ethyl acetate was continuously added over 2 hours by using a dropping funnel. Furthermore, the polymerization was continued at a boiling point for 4 hours. The solvent was removed, and 582 parts by mass of a resin were obtained, then 1,360 parts by mass of isopropanol were added to obtain a resin solution for coating consisting of a vinyl resin with a resin concentration of 30% by weight.

[Preparation of Coated Positive Electrode Active Material Particles and Positive Electrode]

96 Parts by weight of $LiCoO_2$ powder [manufactured by Nippon Chemical Industrial Co., Ltd., CELLSEED C-8G; average particle diameter of 8 μm] were added to a universal mixer. After stirring at 150 rpm at room temperature, the resin solution for coating (resin solid concentration of 30% by weight) was added dropwise over 60 minutes to have the resin solid concentration of 2 parts by weight followed by further stirring for 30 minutes. Subsequently, in a stirring state, 2 parts by mass of acetylene black [manufactured by Denka Company Limited, Denka Black (registered trademark)] was mixed in three divided times while stirring, and the temperature was raised to 70° C. while keeping stirring for 30 minutes, then the pressure was reduced to 100 mmHg and held for 30 minutes. According to this operation, coated positive electrode active material particles were obtained.

Carbon fiber [manufactured by Osaka Gas Chemicals Co., Ltd., DONACARBO Milled S-243, average fiber length: 500 μm, average fiber diameter: 13 μm, electrical conductivity: 200 mS/cm] was prepared as a conductive member. 1.75 Parts by weight of the above carbon fiber and 98.25 parts by weight of the coated positive electrode active material particles were mixed with an electrolyte solution to prepare a positive electrode slurry. On top of an aluminum foil with thickness of 20 μm, the positive electrode slurry was applied by a squeegee method while having a mask with diameter of 15 mm and electrode shape placed on the foil to form a positive electrode active material layer with film thickness of 500 μm. Accordingly, the positive electrode was obtained. As for the electrolyte solution, a solution which has been prepared by dissolving $LiPF_4$ at a ratio of 1 mol/L in a mixture solvent of ethylene carbonate (EC) and diethyl carbonate (DEC) (volume ratio of 3:7) was used.

[Preparation of Coated Negative Electrode Active Material Particles and Negative Electrode]

According to the same process as the coated positive electrode active material particles described above, coated negative electrode active material particles, i.e., 84 parts by weight of microparticles of hard carbon (HC) (manufactured by Kureha Chemical Industries: average particle diameter of 20 μm) are coated with 12 parts by weight of Denka Black by using the resin solution for coating (resin solid content: 30% by mass) (4 parts by weight in terms of resin solid matter), were obtained.

Carbon fiber (DONACARBO Milled S-243) was prepared as a conductive member. 1.75 Parts by weight of the above carbon fiber and 98.25 parts by weight of the coated negative electrode active material particles were mixed with an electrolyte solution to prepare a negative electrode slurry. On top of each coated resin current collector or resin current collector, the negative electrode slurry was applied by a squeegee method while having a mask with diameter of 16 mm and electrode shape placed on the current collector to form a negative electrode active material layer with film thickness of 700 μm. Accordingly, each negative electrode was obtained. As for the electrolyte solution, a solution which has been prepared by dissolving $LiPF_6$ at a ratio of 1 mol/L in a mixture solvent of ethylene carbonate (EC) and diethyl carbonate (DEC) (volume ratio of 3:7) was used.

[Production of Cell]

By using the positive electrode and each negative electrode produced in the above, each laminate cell was produced, and then a cycle charge and discharge test was carried out. In detail, the positive electrode and each negative electrode were allowed to face each other via a separator (PP separator manufactured by Celgard; film thickness of 25 μm), 210 μL of the electrolyte solution was injected, and vacuum lamination was carried out. About 1 atmospheric pressure was applied to the produced laminate battery in that state. Furthermore, after adding a restraining jig (plate made of SUS) from both surfaces and fixing with screws, a state of about 4 atmospheric pressure was created. Accordingly, a cell for (charge and discharge) test was produced. As for the electrolyte solution, a solution which has been prepared by dissolving $LiPF_6$ at a ratio of 1 mol/L in a mixture solvent of ethylene carbonate (EC) and diethyl carbonate (DEC) (volume ratio of 3:7) was used.

[Charge and Discharge Test or the Like]

Each laminate battery produced in the above was subjected to charge and discharge in an environment of 45° C. In detail, after charging to 4.2 V according to constant current and constant voltage mode (CCCV, current value: 1.5 mA/cm$^2$), discharge to 2.6 V was carried out according to constant current mode (CC, current value of 1.5 mA/cm$^2$). The same charge and discharge cycle was repeated thereafter. Due to the presence of irreversible capacity, the charge and discharge after the initial charge and discharge was taken as the first cycle. 50 Cycles of this charge and discharge were repeated. Based on charge retention rate obtained by dividing discharge capacity at each cycle by discharge cycle at the first cycle, and voltage drop 10 seconds after starting the discharge of the 50$^{th}$ cycle, evaluation of cell resistance was carried out, and the results are summarized in Table 1.

Furthermore, regarding Table 1, each coated resin current collector and resin current collector prepared above were sealed by heat using carboxylic acid-modified heat-melted film to prepare a bag such that the side adjacent to the negative electrode (active material layer) is in contact with the electrolyte solution. After adding the electrolyte solution to the bag, it was sealed by heat and allowed to stand for 1 day. Then, the swelling property of each coated resin current collector and resin current collector was observed. When a deformation is observed with a naked eye compared to the initial state, it was determined to have swelling. Furthermore, after the production of each coated resin current collector and resin current collector, those having a winding (i.e., curling) as observed with a naked eye were determined to have curling.

and discharge cycle durability) can be enhanced, and also the cell resistance 10 seconds after 50 cycles of the cell can be reduced.

Compared to Comparative Example 2, in Examples 1 to 3 of the present invention (and Comparative Example 1), at least one of 70% Ni epoxy resin thin-film layer and 13% AB epoxy resin layer A (intermediate layer) is included on a side to be formed with a negative electrode active material layer. It was found that, by having this constitution, Examples 1 to 3 of the present invention (and Comparative Example 1) have no occurrence of swelling of the coated resin current collector by an electrolyte solution when compared to Comparative Example 2. Based on this, it was recognized that, by disposing an epoxy resin layer (i.e., thin-film layer or intermediate layer) which is a crosslinked resin impermeable to an electrolyte solution on a side to be formed with a negative electrode active material layer, infiltration of the electrolyte solution to the resin current collector can be effectively prevented.

Furthermore, when comparison is made for Examples 1 to 3 of the present invention, it was recognized that by having a 13% AB epoxy resin layer B, Examples 1 and 3 can effectively prevent the curling of the resin current collector when compared to Example 2.

Furthermore, Comparative Example 2 has a constitution of having only the resin current collector, in which 13% AB epoxy resin layer B is not provided, but neither 70% Ni epoxy resin thin-film layer nor 13% AB epoxy resin layer A (intermediate layer) is provided on the other side. Due to such reasons, it can be said that, as there is no stress present between the thin-film layer or intermediate layer and the resin current collector, stress does not occur between the

TABLE 1

| Resin current collector | Constitution of coated resin current collector for negative electrode | Capacity retention rate (%) after 50 cell cycles | Cell resistance (Ω · cm$^2$) at 10 seconds after 50 cell cycles | Presence or absence of curling of coated resin current collector | Swelling property of coated resin current collector by electrolyte solution |
|---|---|---|---|---|---|
| Example 1 | 70% Ni epoxy resin thin-film layer 15 μm/ 13% AB epoxy resin layer A (intermediate layer) 5 μm/ 20% AB-PP resin current collector 90 μm/ 13% AB epoxy resin layer B 40 μm | 75 | 11.2 | Absent | Absent |
| Example 2 | 70% Ni epoxy resin thin-film layer 15 μm/ 13% AB epoxy resin layer A (intermediate layer) 5 μm/ 20% AB-PP resin current collector 90 μm | 69 | 12.1 | Present | Absent |
| Example 3 | 70% Ni epoxy resin thin-film layer 15 μm/ 20% AB-PP resin current collector 90 μm/ 13% AB epoxy resin layer B 40 μm | 48 | 19.8 | Absent | Absent |
| Comparative Example 1 | 13% AB epoxy resin layer A 5 μm/ 20% AB-PP resin current collector 90 μm/ 13% AB epoxy resin layer B 5 μm/ | 12 | 27.2 | Absent | Absent |
| Comparative Example 2 | 20% AB-PP resin current collector 90 μm | 5 | 32.5 | Absent | Present |

With regard to Table 1 above, Examples 1 to 3 of the present invention have a 70% Ni epoxy resin thin-film layer (i.e., crosslinked resin thin-film layer which has impermeability to the electrolyte solution, dispersed with a conductive filler that does not alloy with Li, and present at an interface of the resin current collector on the negative electrode side and the active material layer) when compared to Comparative Examples 1 and 2. By having this constitution, lithiation of the carbon-based conductive filler (AB) in the resin current collector is suppressed in Examples 1 to 3 of the present invention compared to Comparative Examples 1 and 2. It is found that, due to such reasons, the charge retention rate after 50 cycles of the cell (i.e., charge epoxy resin layer B and resin current collector, and thus yielding no curling. In other words, in Examples 1 and 3, the occurrence of curling caused by the stress present between the thin-film layer or intermediate layer and the resin current collector is offset by the stress present between the epoxy resin layer B and resin current collector that are disposed on the opposite side, and thus the occurrence of curling is effectively prevented.

Furthermore, when comparison is made for Examples 1 to 3 of the present invention, it was recognized that, by using the resin current collector on the negative electrode side which is arranged with a thin-film layer, an intermediate layer, and the epoxy resin layer B like Example 1, the charge retention rate after 50 cycles of the cell (i.e., charge and discharge cycle durability) can be enhanced and also the cell resistance 10 seconds after 50 cycles of the cell can be reduced compared to Examples 2 and 3.

Furthermore, when comparison is made for Examples 2 and 3 of the present invention, it was recognized that, by having the intermediate layer together with thin-film layer like Example 2, the charge retention rate after 50 cycles of the cell (i.e., charge and discharge cycle durability) can be enhanced and also the cell resistance 10 seconds after 50 cycles of the cell can be reduced compared to Example 3 in which the intermediate layer is not included. The present application is based on Japanese Patent Application No. 2016-033622 filed on Feb. 24, 2016, and its enclosure is entirely incorporated herein by reference.

REFERENCE SIGNS LIST 10a, 10b Lithium ion secondary battery (pseudo bipolar type laminate battery, bipolar type battery)
11a Resin current collector on positive electrode side
11b Resin current collector on negative electrode side
11' Resin current collector
11a' Resin current collector as outermost layer on positive electrode side
11b' Resin current collector as outermost layer on negative electrode side
13 Positive electrode active material layer
13a Positive electrode active material
13b (15b) Conductive aid
14 Thin-film layer
15 Negative electrode active material layer
15a Negative electrode active material
16 Intermediate layer (epoxy resin layer A)
17 Electrolyte layer
18 Epoxy resin layer B
19 Single battery layer
21, 57 Power generating element
23a Pseudo bipolar type electrode
23b Bipolar type electrode
25 Positive electrode current collecting plate
27 Negative electrode current collecting plate
29, 52 Battery outer casing material
31 Sealing part
50 Flat lithium ion secondary battery
58 Positive electrode tab
59 Negative electrode tab
100, 110 Positive electrode active material layer
111 First surface of positive electrode active material layer
121 Second surface of positive electrode active material layer
211 First surface of negative electrode active material layer
221 Second surface of negative electrode active material layer
131 Conductive fiber
151 Coating agent
213 Conductive fiber
214, 313 Resin
313 Filter paper
470, 570 Film (filter paper, resin)

The invention claimed is:

1. An electrode for a lithium ion secondary battery comprising:
a resin current collector including a polyolefin resin matrix and a conductive filler A;
a negative electrode active material layer provided on the resin current collector,
a crosslinked resin thin-film layer, which contains an Ni filler as a conductive filler B that does not alloy with Li and which has impermeability to an electrolyte solution, arranged between the resin current collector and the negative electrode active material layer; and
an intermediate layer having an electric conductivity arranged between the resin current collector and the thin-film layer,
wherein a content of the Ni filler is from 50 to 90% by mass relative to 100% by mass of a total amount of the thin-film layer.

2. The electrode for a lithium ion secondary battery according to claim 1, wherein the thin-film layer contains a crosslinked epoxy resin as the crosslinked resin, and the conductive filler B.

3. The electrode for a lithium ion secondary battery according to claim 1, wherein the intermediate layer is an epoxy resin layer A containing a carbon-based conductive filler.

4. The electrode for a lithium ion secondary battery according to claim 1, wherein an epoxy resin layer B containing a carbon-based conductive filler is arranged on a resin current collector surface that is opposite to the surface on which the negative electrode active material layer is formed.

5. A power source obtained by laminating a plurality of single battery layers having the electrode for a lithium ion secondary battery according to claim 1.

6. A method for producing an electrode for a lithium ion secondary battery comprising:
a step of forming a resin current collector by using a composition for forming a resin current collector which contains a polyolefin resin matrix and a conductive filler A,
a step of forming an intermediate layer by coating a slurry for intermediate layer containing a conductive filler on top of the resin current collector on the side proximate to a negative electrode active material layer followed by drying,
a step of forming a thin-film layer which has conductivity and has impermeability to an electrolyte solution by coating a slurry for thin-film layer containing an Ni filler as a conductive filler B that does not alloy with Li and a crosslinked resin on top of the intermediate layer followed by drying, wherein a content of the Ni filler is from 50 to 90% by mass relative to 100% by mass of a total amount of the thin-film layer, and
a step of forming an electrode active material layer by coating an electrode slurry containing an electrode active material on top of the thin-film layer followed by drying.

7. The method for producing an electrode for a lithium ion secondary battery according to claim 6, wherein the crosslinked resin is an epoxy resin.

8. The method for producing an electrode for a lithium ion secondary battery according to claim 6, wherein the step of forming the intermediate layer is to form an epoxy resin layer A as the intermediate layer, and the slurry contains a carbon-based conductive filler and an epoxy resin followed by drying.

9. The method for producing an electrode for a lithium ion secondary battery according to claim 6, further comprising a step of forming an epoxy resin layer B by coating, on a surface side of the resin current collector that is opposite to the side proximate to the negative electrode active material layer, a slurry containing a carbon-based conductive filler and an epoxy resin followed by drying.

* * * * *